United States Patent
Xin et al.

(10) Patent No.: US 11,586,063 B2
(45) Date of Patent: Feb. 21, 2023

(54) PRIVACY DISPLAY MODULE COMPRISING A LIGHT-ADJUSTING COMPONENT, METHOD FOR DRIVING THE SAME, DISPLAY APPARATUS, AND VEHICLE COMPRISING THE SAME

(71) Applicant: Shanghai Tianma Micro-Electronics Co., Ltd., Shanghai (CN)

(72) Inventors: Longcai Xin, Shanghai (CN); Zhiyuan Zhang, Shanghai (CN); Fan Tian, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/591,581

(22) Filed: Feb. 2, 2022

(65) Prior Publication Data

US 2022/0155631 A1 May 19, 2022

(30) Foreign Application Priority Data

Sep. 30, 2021 (CN) .......................... 202111157466.9

(51) Int. Cl.
*G02F 1/13* (2006.01)
*G02F 1/1335* (2006.01)
(Continued)

(52) U.S. Cl.
CPC .......... *G02F 1/1323* (2013.01); *G02F 1/1337* (2013.01); *G02F 1/13439* (2013.01); *G02F 1/133531* (2021.01); *G02F 1/133606* (2013.01)

(58) Field of Classification Search
CPC ............. G02F 1/13476; G02F 2203/01; G02F 2203/24; G02F 1/13756
See application file for complete search history.

(56) References Cited

U.S. PATENT DOCUMENTS

2008/0084471 A1* 4/2008 Yabuta ................ G02F 1/13471
348/42
2019/0348585 A1* 11/2019 Woodgate ........... H01L 25/0753
(Continued)

FOREIGN PATENT DOCUMENTS

CN 101916014 A 12/2010
CN 106125189 A 11/2016
(Continued)

OTHER PUBLICATIONS

European Search Report dated Nov. 18, 2022, issued in corresponding European Application No. 22175455.9, 45 pages.
(Continued)

*Primary Examiner* — Paul C Lee
(74) *Attorney, Agent, or Firm* — Christensen O'Connor Johnson Kindness PLLC

(57) ABSTRACT

A display module and a method for driving the same, a display apparatus, and a vehicle are provided. The display module includes a backlight component, and a display component and a light-adjusting component that are located at a side of the backlight component facing toward a light-emitting direction of the display module. The backlight component includes a first light guide structure and a light regulating structure. The light-adjusting component includes first and second electrodes, and a first liquid crystal. The display module has a sharing mode and an anti-peeping mode. In the sharing mode, the first electrode and the second electrode are not energized, and the first liquid crystal is in a wide viewing angle state. In the anti-peeping mode, the first electrode and the second electrode drive the first liquid crystal to be in a narrow viewing angle state.

42 Claims, 28 Drawing Sheets

(51) Int. Cl.
    *G02F 1/13357*     (2006.01)
    *G02F 1/1337*     (2006.01)
    *G02F 1/1343*     (2006.01)

(56) References Cited

U.S. PATENT DOCUMENTS

| | | | |
|---|---|---|---|
| 2020/0218101 A1* | 7/2020 | Ihas | G02B 6/0068 |
| 2021/0271132 A1* | 9/2021 | Chiu | G02F 1/133512 |

FOREIGN PATENT DOCUMENTS

| | | | | |
|---|---|---|---|---|
| CN | 106444185 A | 2/2017 | | |
| CN | 206057756 U | 3/2017 | | |
| CN | 108508666 A | 9/2018 | | |
| CN | 110501823 A | 11/2019 | | |
| CN | 110824740 A | 2/2020 | | |
| CN | 211554556 U | 9/2020 | | |
| CN | 111796438 A | 10/2020 | | |
| CN | 111812897 A | 10/2020 | | |
| CN | 212255969 U | 12/2020 | | |
| CN | 112305788 A | 2/2021 | | |
| JP | 2007256330 A | * | 10/2007 | G02F 1/133509 |
| JP | 2008310271 A | * | 12/2008 | G02F 1/1323 |
| JP | 4968656 B2 | 7/2012 | | |

OTHER PUBLICATIONS

First Chinese Office Action dated Dec. 20, 2022, issued in corresponding Chinese Application No. 2021111574669, dated Sep. 30, 2021, and its English translation thereof, 15 pages.

* cited by examiner

K1 — In a sharing mode, de-energizing a first electrode and a second electrode in such a manner that first liquid crystal is in a wide viewing angle state K2 — In an anti-peeping mode, driving the first liquid crystal by the first electrode and the second electrode to be in a narrow viewing angle state, $V=5.095-1.479\times((\ln(\Delta\varepsilon)-\ln(d1)+1))$, where V denotes a difference between a voltage of the first electrode and a voltage of the second electrode, $\Delta\varepsilon$ denotes a difference between a dielectric constant $\varepsilon//$ and a dielectric constant $\varepsilon\perp$, and d1 denotes a cell gap of the first liquid crystal in a direction perpendicular to a plane of the display module

FIG. 57

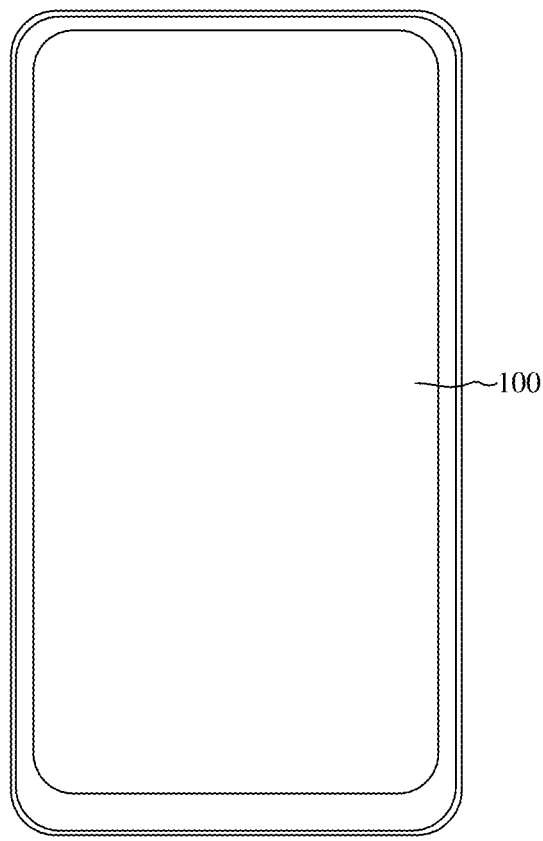

FIG. 58

PRIVACY DISPLAY MODULE COMPRISING A LIGHT-ADJUSTING COMPONENT, METHOD FOR DRIVING THE SAME, DISPLAY APPARATUS, AND VEHICLE COMPRISING THE SAME

CROSS-REFERENCE TO RELATED APPLICATION

The present application claims priority to Chinese Patent Application No. 202111157466.9, filed on Sep. 30, 2021, the content of which is incorporated herein by reference in its entirety.

TECHNICAL FIELD

The present disclosure relates to the field of display technologies, and, particularly, relates to a display module, a method for driving the display module, a display apparatus, and a vehicle.

BACKGROUND

With the continuous development of display technologies, a viewing angle of a display panel has been expanded to more than 160°. However, it is liable to cause the leakage of personal privacy while enjoying the visual experience brought by the large viewing angle. For example, when a user uses a display apparatus in public to access bank accounts, pay bills, or enter personal information, there is a risk of identity theft and privacy violations.

SUMMARY

In a first aspect of the present disclosure, a display module is provided. The display module includes a backlight component, a display component located on a side of the backlight component facing toward a light-emitting direction of the display module, and a light-adjusting component located on the side of the backlight component facing toward the light-emitting direction of the display module. The backlight component comprises a first light guide structure and a light regulating structure, the first light guide structure comprises a first light source and a first light guide plate, and the light regulating structure is located on a side of the first light guide plate facing toward the display component and is configured to regulate a transmission direction of light emitted from the first light guide plate. The light-adjusting component comprises a first electrode, a first liquid crystal located on a side of the first electrode facing away from the backlight component, and a second electrode located at a side of the first liquid crystal facing away from the backlight component; and the light-adjusting component and the light regulating structure are configured to regulate light to a same direction. The display module has a sharing mode and an anti-peeping mode, wherein in the sharing mode, the first electrode and the second electrode are not energized, and the first liquid crystal is in a wide viewing angle state; and in the anti-peeping mode, the first electrode and the second electrode drive the first liquid crystals to be in a narrow viewing angle state.

In a second aspect of the present disclosure, a method for driving the display module provided in the first aspect is provided. The method for driving the display module includes: in the sharing mode, de-energizing the first electrode and the second electrode in such a manner that the first liquid crystal is in a wide viewing angle state; and in the anti-peeping mode, driving the first liquid crystal by the first electrode and the second electrode to be in a narrow viewing angle state.

In a third aspect of the present disclosure, a display apparatus is provided. The display apparatus includes: a liquid crystal display component, and a light-adjusting component located at a side of the liquid crystal display component facing toward a light-emitting direction of the display module. The light-adjusting component comprises a first electrode, a first liquid crystal located at a side of the first electrode facing away from the liquid crystal display component, and a second electrode located at a side of the first liquid crystal facing away from the display component. The display module has a sharing mode and an anti-peeping mode. In the sharing mode, the first electrode and the second electrode are not energized, and the first liquid crystal is in a wide viewing angle state. In the anti-peeping mode, the first electrode and the second electrode drive the first liquid crystal to be in a narrow viewing angle state. $V=5.095-1.479\times((\ln(\Delta\varepsilon)-\ln(d1)+1))$, where V denotes a voltage difference between the first electrode and the second electrode, $\Delta\varepsilon$ denotes a difference between a dielectric constant $\varepsilon//$ and a dielectric constant $\varepsilon\perp$, and d1 denotes a cell gap of the first liquid crystal in a direction perpendicular to a plane of the display module.

In a fourth aspect of the present disclosure, a method for driving the display module provided in the third aspect is provided. The method includes: in the sharing mode, de-energizing the first electrode and the second electrode in such a manner that the first liquid crystal is in a wide viewing angle state; and in the anti-peeping mode, driving the first liquid crystal by the first electrode and the second electrode to be in a narrow viewing angle state, wherein $V=5.095-1.479\times(\ln(\Delta\varepsilon)-\ln(d1)+1))$, where V denotes a voltage difference between the first electrode and the second electrode, $\Delta\varepsilon$ denotes a difference between a dielectric constant $\varepsilon//$ and a dielectric constant $\varepsilon\perp$, and d1 denotes a cell gap of the first liquid crystal in a direction perpendicular to a plane of the display module.

In a fifth aspect of the present disclosure, a display apparatus is provided. The display apparatus includes: the display module provided in the first aspect or the display module provided in the third aspect.

In a sixth aspect of the present disclosure, a vehicle is provided. The vehicle includes the display apparatus provided in the fifth aspect.

DESCRIPTION OF THE DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings without any creative effort.

FIG. 57 is flowchart showing a method for driving a display module according to another embodiment of the present disclosure;

FIG. 58 is a schematic diagram of a display apparatus according to an embodiment of the present disclosure;

DETAILED DESCRIPTION

In order to better understand technical solutions of the present disclosure, the embodiments of the present disclosure are described in detail with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms "a", "an", "the" and "said" in a singular form in an embodiment of the present disclosure and the attached claims are also intended to include plural forms thereof, unless noted otherwise.

It should be understood that the term "and/or" used in the context of the present disclosure is to describe a correlation relation of related objects, indicating that there can be three relations, e.g., A and/or B can indicate A alone, both A and B, and B alone. In addition, the symbol "/" in the context generally indicates that the relation between the objects in front and at the back of "/" is an "or" relationship.

It should be understood that although the terms 'first', 'second' and 'third' can be used in the present disclosure to describe polarizers, these polarizers should not be limited to these terms. These terms are used only to distinguish the polarizers from each other. For example, without departing from the scope of the embodiments of the present disclosure, a first polarizer can also be referred to as a second polarizer. Similarly, the second polarizer can also be referred to as the first polarizer.

Figure 1:
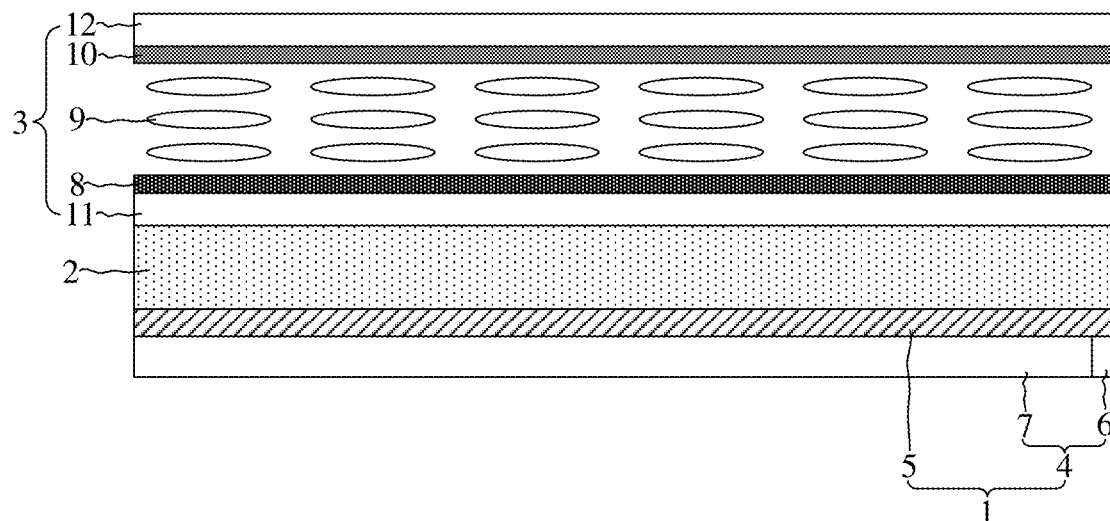
FIG. 1 is a schematic diagram of a display module in a sharing mode according to an embodiment of the present disclosure.
Figure 2:
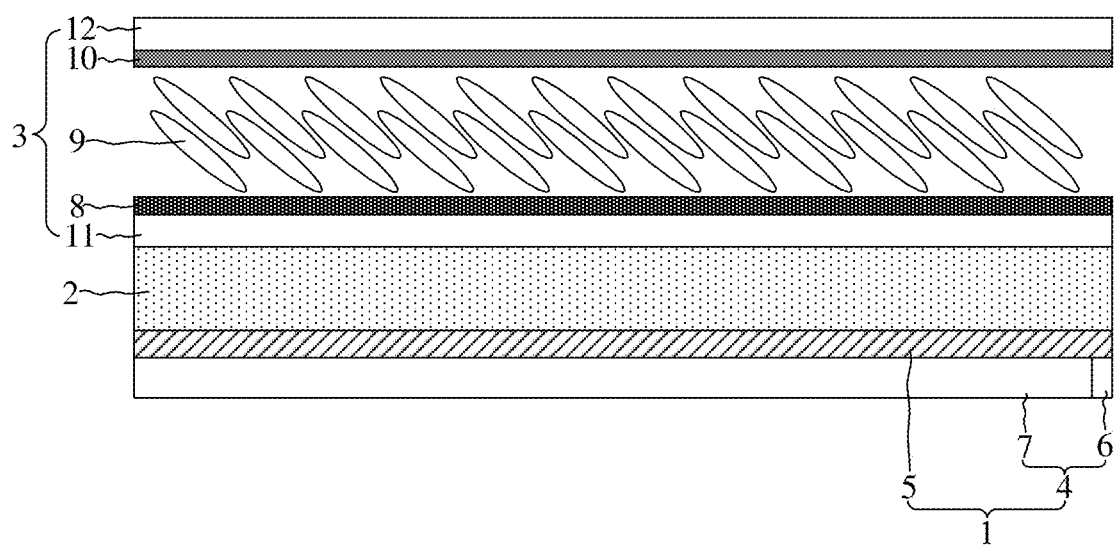
FIG. 2 is a schematic diagram of a display module in an anti-peeping mode according to an embodiment of the present disclosure.

An embodiment of the present disclosure provides a display module. FIG. 1 is a schematic diagram of a display module in a sharing mode according to an embodiment of the present disclosure, and FIG. 2 is a schematic diagram of a display module in an anti-peeping mode according to an embodiment of the present disclosure. As shown in FIG. 1 and FIG. 2, the display module includes a backlight component 1, a display component 2, and a light-adjusting component 3. The display component 2 and the light-adjusting component 3 are located at a side of the backlight component 1 facing toward a light-emitting direction of the display module.

The backlight component 1 includes a first light guide structure 4 and a light regulating structure 5. The first light guide structure 4 includes a first light source 6 and a first light guide plate 7. The first light source 6 can be a bottom-emitting light source or can be a side-emitting light source as shown in FIG. 1 and FIG. 2. The light regulating structure 5 is located at a side of the first light guide plate 7 facing toward the display component 2, and is configured to regulate the transmission direction of the light emitted from the first light guide plate 7.

Figure 3:
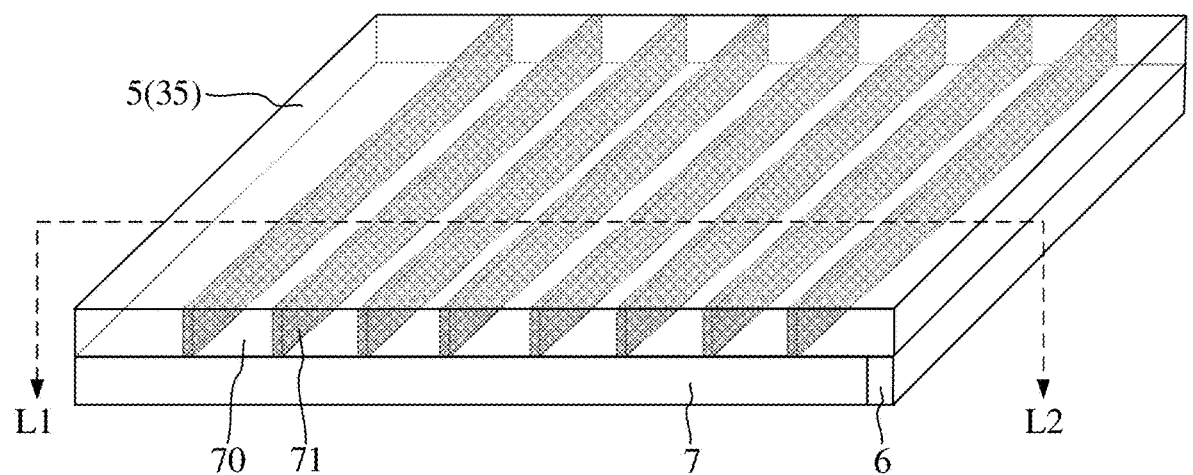
FIG. 3 is a top view of a light regulating structure according to an embodiment of the present disclosure.
Figure 4:
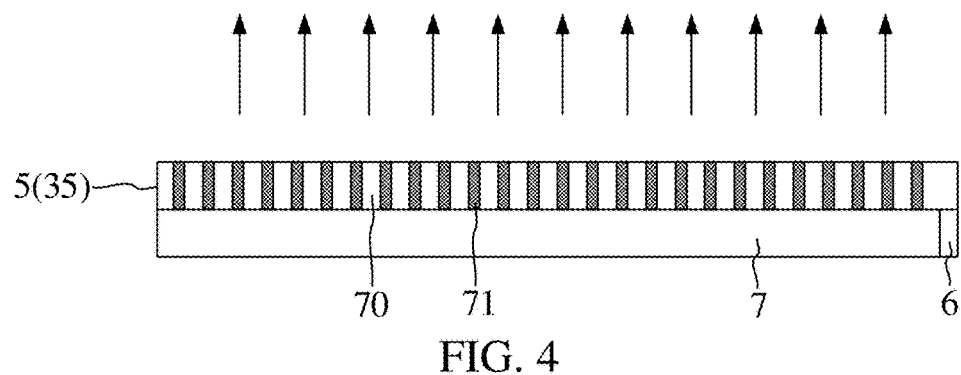
FIG. 4 is a cross-sectional view of the light regulating structure shown in FIG. 3 along line L1-L2 according to an embodiment of the present disclosure.
Figure 5:
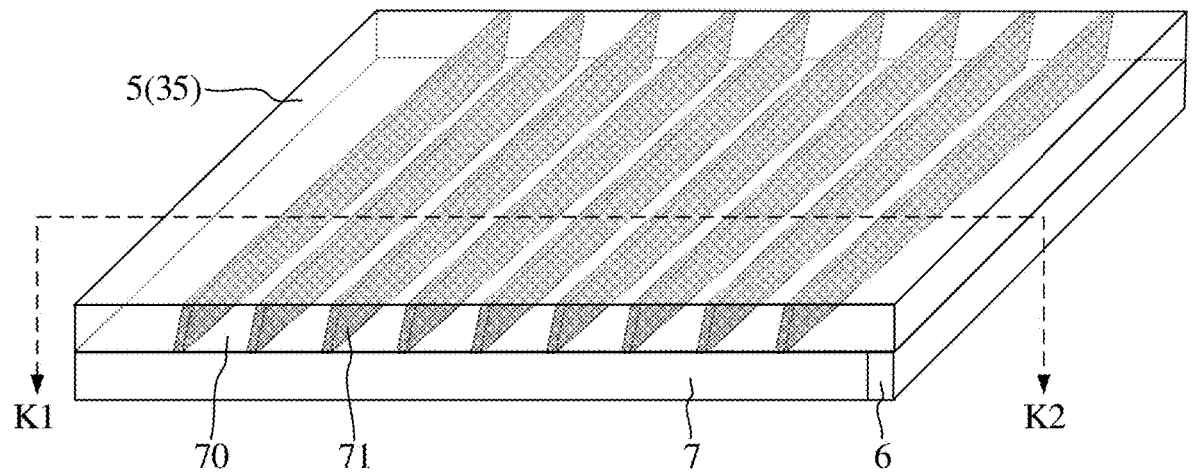
FIG. 5 is a top view of a light regulating structure according to another embodiment of the present disclosure.
Figure 6:
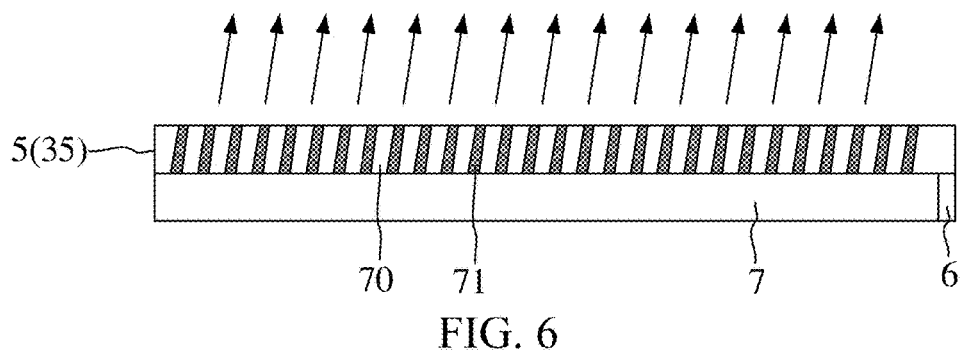
FIG. 6 is a cross-sectional view of the light regulating structure shown in FIG. 5 along line K1-K2 according to an embodiment of the present disclosure.

FIG. 3 is a top view of a light regulating structure according to an embodiment of the present disclosure, FIG. 4 is a cross-sectional view of the light regulating structure shown in FIG. 3 along an L1-L2 direction according to an embodiment of the present disclosure, FIG. 5 is a top view of a light regulating structure according to another embodiment of the present disclosure, and FIG. 6 is a cross-sectional view of the light regulating structure shown in FIG. 5 along line K1-K2 according to an embodiment of the present disclosure. In an embodiment of the present disclosure, as shown in FIG. 3 to FIG. 6, the light regulating structure 5 includes a grating 35. The grating 35 includes transparent portions and non-transparent portions, and the transparent portions and non-transparent portions are alternatively arranged. An angle formed between the non-transparent portion 71 and a normal line (the normal line is perpendicular to a plane of the display module) is controlled to regulate the transmission direction of the light emitted from the first light guide plate 7 by using the light regulating structure 5.

Exemplarily, referring to FIG. 3 and FIG. 4 again, the non-transparent portion 71 is perpendicular to the plane of the display module, that is, the non-transparent portion 71 is parallel to the normal direction, and, the light regulating structure 5 can control the light emitted from the first light guide plate 7 to emit along a direction parallel to the normal direction. In another embodiment, referring to FIG. 5 and FIG. 6 again, the non-transparent portion 71 is inclined with respect to the normal direction, and the light regulating structure 5 can control the light emitted from the first light guide plate 7 to emit along the inclination direction of the non-transparent portion 71.

The light-adjusting component 3 includes a first electrode 8, a first liquid crystal 9, and a second electrode 10. The first liquid crystal 9 is located at a side of the first electrode 8 facing away from the backlight component 1. The second electrode 10 is located at a side of the first liquid crystal 9 facing away from the backlight component 1. The light-adjusting component 3 and the light regulating structure 5 have uniformity in the regulating direction of light.

It can be understood that a side of the first liquid crystal 9 facing away from the backlight component 1 and a side of the first liquid crystal 9 facing toward the backlight component are provided with two alignment films, respectively. In an embodiment of the present disclosure, the two alignment films have a same alignment direction. When the first electrode 8 and the second electrode 10 are not energized, the first liquid crystal 9 maintains the initial state under the alignment film. When the first electrode 8 and the second electrode 10 are energized, the first liquid crystal 9 rotates a certain angle under the electric field.

The display module has a sharing mode and an anti-peeping mode. In the sharing mode, the first electrode 8 and the second electrode 10 are not energized, and the first liquid crystal 9 is in a wide viewing angle state. In the anti-peeping mode, the first electrode 8 and the second electrode 10 drives the first liquid crystal 9 to be in a narrow viewing angle state.

In an embodiment of the present disclosure, when the display module performs image display, the first light source 6 is turned on, the light emitted by the first light source 6 is transmitted in the first light guide plate 7 and emitted from the top of the first light guide plate 7, the emitted light is incident to the display component 2 and the light-adjusting component 3 after it is regulated by the light regulating structure 5.

Figure 7:
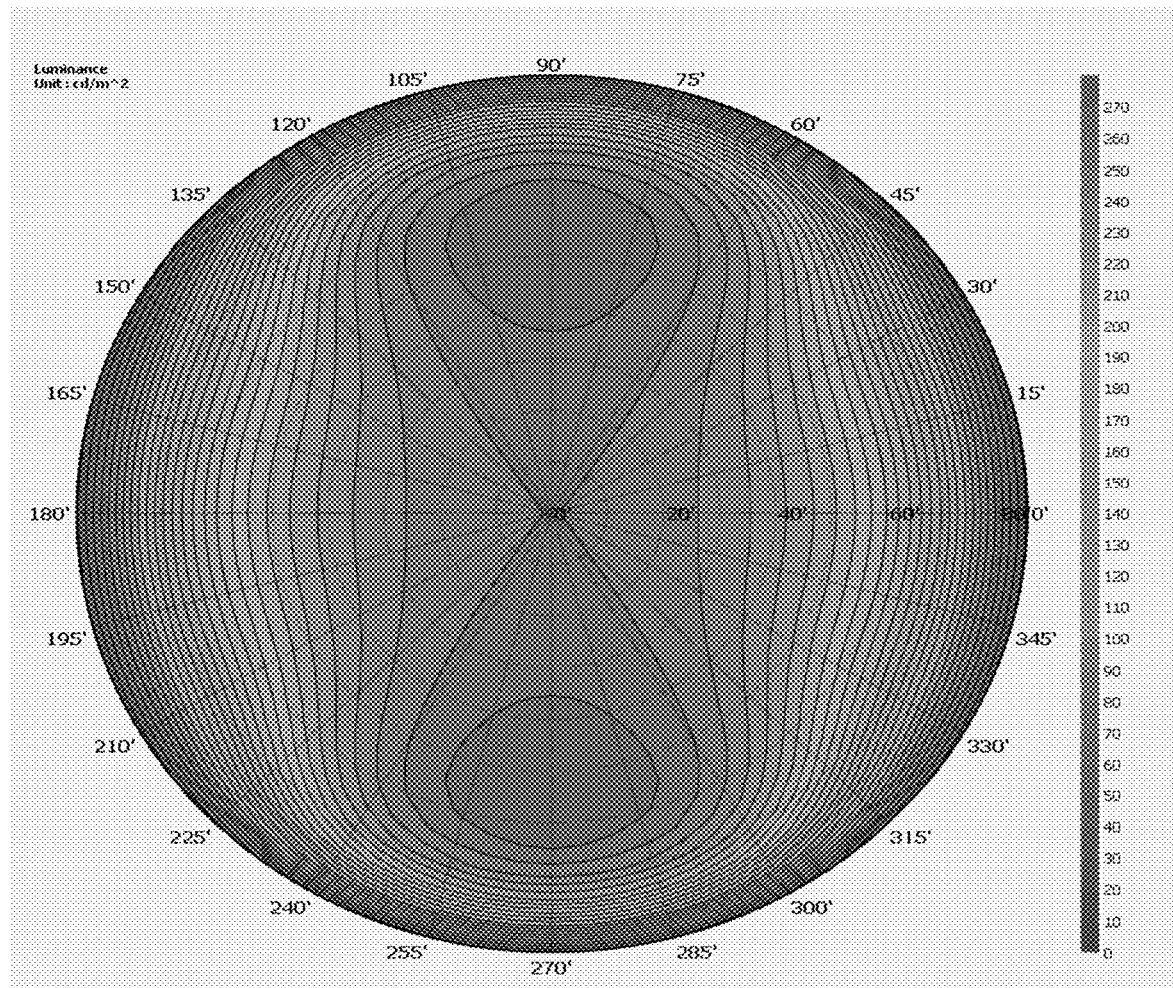
FIG. 7 is a luminance diagram at different viewing angles in a sharing mode according to an embodiment of the present disclosure.
Figure 9:
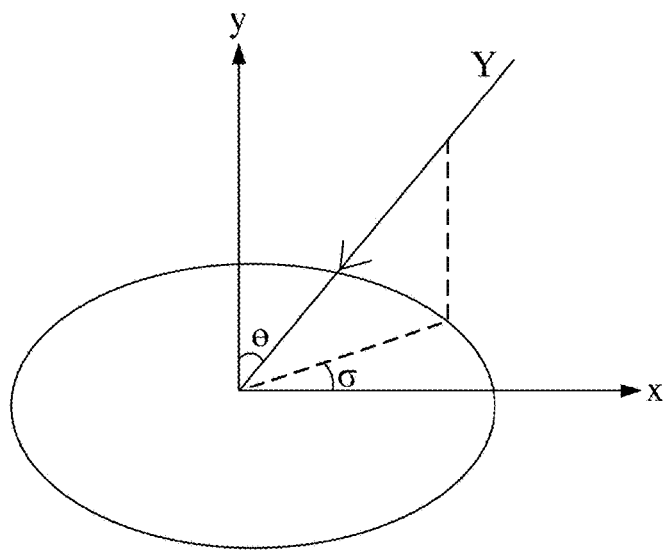
FIG. 9 is an exploded schematic diagram of a viewing angle direction according to an embodiment of the present disclosure.

Referring to FIG. 1 again, when the display module is in the sharing mode, the first electrode 8 and the second electrode 10 of the light-adjusting component 3 are not energized, so that no electric field is formed between the first electrode 8 and the second electrode 10, and the first liquid crystal 9 is in the wide viewing angle state in which the first liquid crystal 9 does not have an optical influence on the light transmitted in various viewing angle directions and the light emitting along a front viewing angle direction and the light emitting along an oblique viewing angle direction can emit from the display module. Combined with the luminance diagram at different viewing angles in the sharing mode shown in FIG. 7, the luminance distribution of the display module shown in FIG. 7 can be understood as the luminance distribution that can be viewed at various viewing angles when the user's body is directly facing toward the display module. The luminance data at various viewing angles in FIG. 7 can be referred to Table 1. With reference to FIG. 9, the angle θ in Table 1 refers to an angle formed between a certain viewing angle direction Y and y axis (the y-axis is perpendicular to the plane of the display module), and the angle σ in Table 1 refers to an angle formed between an orthographic projection of a certain viewing angle direction Y on the plane of the display module and x axis (the x-axis is parallel to the plane of the display module). The unit of various luminance data in Table 1 is nits. It can be seen from FIG. 7 and Table 1, in the sharing mode, the front viewing angle direction (directly facing toward the display module) and the oblique viewing angle direction (the direction obliquely viewing the display module on the left and right sides) each have higher luminance. Exemplarily, the luminance in the central viewing angle direction (θ=0°, σ=0°) is 260.105 nits, and the luminance in the oblique viewing angle direction (θ=45°, σ=0°) is 224.312 nits, the difference between the luminance of the light in two viewing angle direction is small. Therefore, the user can view the image normally at both the front viewing angle and the oblique viewing angle, so that the display module has a wide viewing angle range.

Table 1

TABLE 1

|  | θ = 0° | θ = 5° | θ = 15° | θ = 25° | θ = 35° | θ = 45° | θ = 55° |
| --- | --- | --- | --- | --- | --- | --- | --- |
| σ = 0° | 260.105 | 259.77 | 257.009 | 251.037 | 240.801 | 224.312 | 198.037 |
| σ = 5° | 260.105 | 259.774 | 257.044 | 251.119 | 240.91 | 224.372 | 197.993 |
| σ = 15° | 260.105 | 259.805 | 257.315 | 251.781 | 241.867 | 225.159 | 198.166 |
| σ = 25° | 260.105 | 259.864 | 257.832 | 253.118 | 244.142 | 228.095 | 201.235 |
| σ = 35° | 260.105 | 259.944 | 258.545 | 255.086 | 248.041 | 234.73 | 211.285 |
| σ = 45° | 260.105 | 260.035 | 259.375 | 257.503 | 253.309 | 244.942 | 229.165 |
| σ = 55° | 260.105 | 260.082 | 259.803 | 258.785 | 256.188 | 250.68 | 239.486 |

Figure 8:
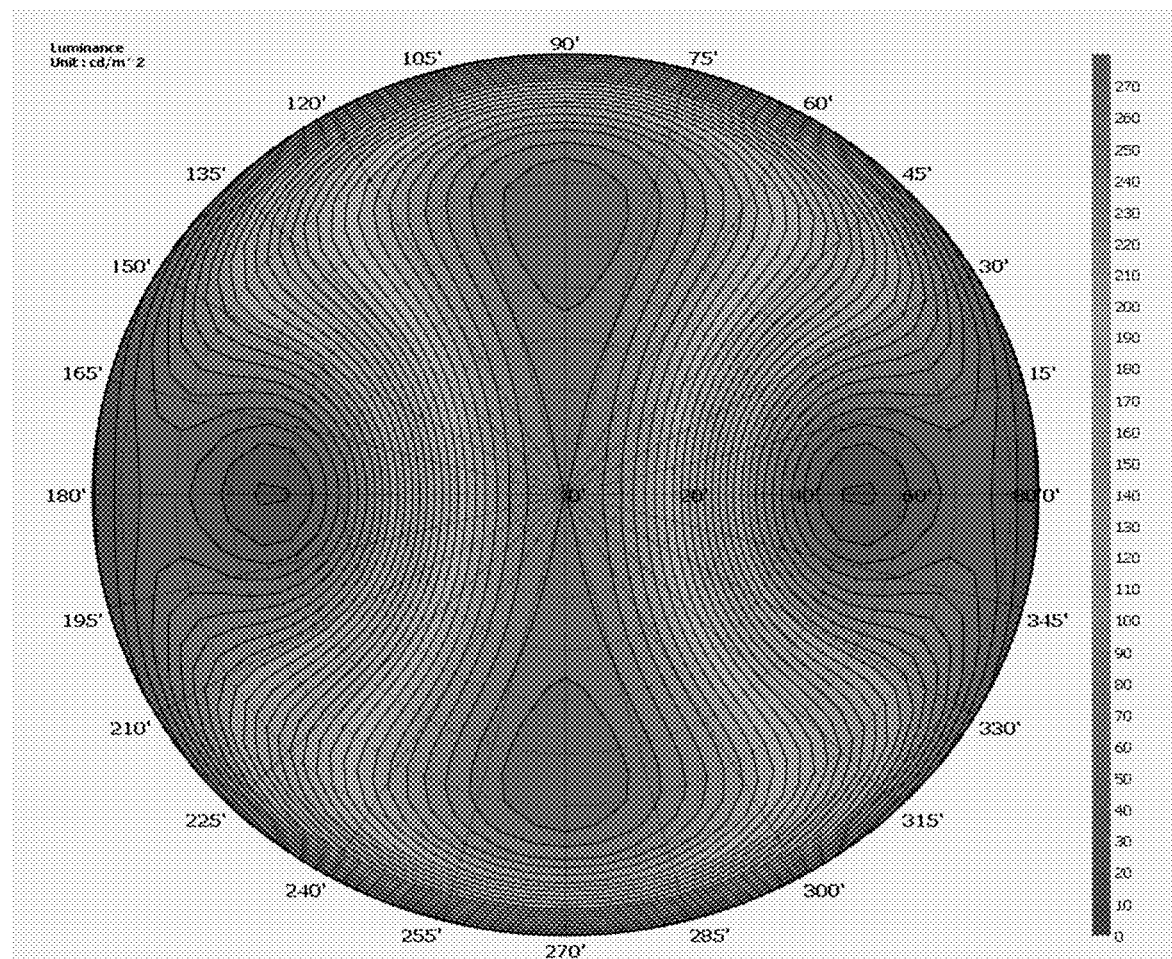
FIG. 8 is a luminance diagram at different viewing angles in an anti-peeping mode according to an embodiment of the present disclosure.

Referring to FIG. 2 again, when the display module is in the anti-peeping mode, the first electrode 8 and the second electrode 10 of the light-adjusting component 3 are energized, an electric field is formed between the first electrode 8 and the second electrode 10. The liquid crystal 9 rotates under an electric field and is in the narrow viewing angle state, and in this filtering state, the first liquid crystal 9 has an optical effect on the light in the oblique viewing angle direction to change the polarization state of the light in the oblique viewing angle direction, so that most of the light in the oblique viewing angle direction cannot be emitted from the display module, thereby reducing the luminance under the oblique viewing angle, and achieving an invisible anti-peeping effect under the oblique viewing angle. Combined with the luminance diagram under different viewing angles in the sharing mode shown in FIG. 8, the luminance data at different viewing angles shown in FIG. 8 can refer to Table 2. Combined with FIG. 9, the angle θ in Table 2 refers to an angle formed between a certain viewing angle direction Y and y axis (the y-axis is perpendicular to the plane of the display module), and the angle σ in Table 2 refers to an angle formed between an orthographic projection of a certain viewing angle direction Y on the plane of the display module and x axis (the x-axis is parallel to the plane of the display module). The unit of various luminance data in Table 2 is nits. It can be seen from FIG. 8 and Table 2, in the anti-peeping mode, the front viewing angle direction (directly facing toward the display module) has high luminance, and the oblique viewing angle direction (the direction obliquely viewing the display module on the left and right sides) has low luminance. Exemplarily, the luminance in the central viewing angle direction ($\theta=0°$, $\sigma=0°$ is 260.092 nits, and the luminance in the oblique viewing angle 45° direction ($\theta=45°$, $\sigma=0°$ is 20.5893 nits, the difference in the luminance of the light in two viewing angle direction is large. Therefore, the user can view the image normally at the front viewing angle, but cannot view the image at the oblique viewing angle, so that the display module has a narrow viewing angle range.

Table 2

TABLE 2

|  | $\theta = 0°$ | $\theta = 5°$ | $\theta = 15°$ | $\theta = 25°$ | $\theta = 35°$ | $\theta = 45°$ | $\theta = 55°$ |
|---|---|---|---|---|---|---|---|
| $\sigma = 0°$ | 260.092 | 255.116 | 216.87 | 149.585 | 74.2605 | 20.5893 | 8.84623 |
| $\sigma = 5°$ | 260.092 | 255.156 | 217.242 | 150.641 | 76.2158 | 23.2061 | 11.4201 |
| $\sigma = 15°$ | 260.092 | 255.466 | 220.125 | 158.802 | 91.2682 | 43.4241 | 31.6391 |
| $\sigma = 25°$ | 260.092 | 256.048 | 225.467 | 173.663 | 118.315 | 79.8333 | 69.0947 |
| $\sigma = 35°$ | 260.092 | 256.83 | 232.512 | 192.717 | 152.175 | 125.196 | 116.967 |
| $\sigma = 45°$ | 260.092 | 257.717 | 240.315 | 213.072 | 187.145 | 171.28 | 166.194 |
| $\sigma = 55°$ | 260.092 | 258.6 | 247.899 | 232.081 | 224.627 | 211.596 | 209.273 |

Figure 10:
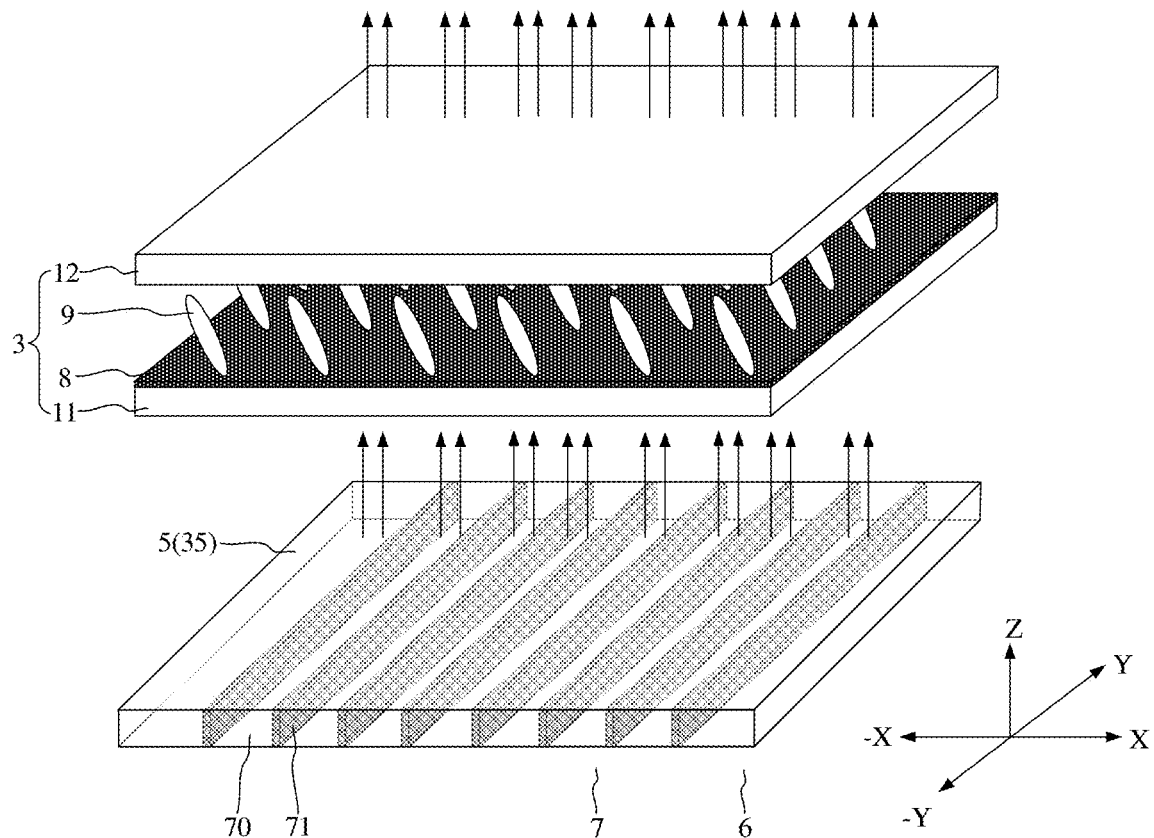
FIG. 10 is a light transmission diagram according to an embodiment of the present disclosure.

In the embodiments of the present disclosure, the light-adjusting component 3 and the light regulating structure 5 have uniformity in the regulating direction of light. Combined with the light transmission diagram shown in FIG. 10, the light regulating structure 5 can regulate the transmission direction of the light emitted from the first light guide plate 7, for example, the regulated light can be converted into light transmitted along a direction parallel to the normal direction (i.e., collimating light) or light transmitted obliquely along the normal direction, thereby narrowing the transmission direction of light. In the anti-peeping mode, the first liquid crystal 9 of the light regulating structure 5 is in the narrow viewing angle state. After the light regulating structure 5 regulates the light, the transmission direction of the light is also narrowed. The light-adjusting component 3 and the light regulating structure 5 have uniformity in the regulating direction of light, so that a better anti-peeping effect can be achieved.

That the uniformity of the regulating directions mentioned in the embodiments of the present disclosure can be expressed in the following various ways. In an embodiment of the present disclosure, referring to FIG. 10, if the non-transparent portion 71 of the light regulating structure 5 converges light emitting along the X direction and light emitting along –X direction, the light-adjusting component 3 also converges the light emitting along the X direction and the light emitting along the –X direction. However, the embodiments of the present disclosure are not limited to such a structure. In other embodiments of the present disclosure, if the non-transparent portion 71 of the light regulating structure 5 converges the light emitting along the Y direction and light emitting along –Y direction, the light-adjusting component 3 also converges the light emitting along the Y direction and the light emitting along –Y direction. In an embodiment, if the non-transparent portion 71 in the light regulating structure 5 converges the light emitting along the X direction and light emitting along –X direction while converging the light emitting along the Y direction and –Y direction, the light-adjusting component 3 also converges the light emitting along the X direction and the light emitting –X direction while converging the light emitting along the Y direction and –Y direction.

Compared with the related art, the display module provided by the embodiments of the present disclosure can increase the ratio of the luminance at the front viewing angle to the luminance at the oblique viewing angle in the anti-peeping mode, so that a better anti-peeping effect can be achieved. In an embodiment of the present disclosure, the light emitted by the light source first passes through the light regulating structure 5 and then passes through the light-adjusting component 3, the light is converged in preset directions (e.g., the X direction and the –X direction) when passing through the light regulating structure 5, so that the luminance at the oblique viewing angle is reduced by M times relative to the light source. When the light passes through the light-adjusting component 3, the luminance at the oblique viewing angle is reduced by N times relative to the light emitted from the light regulating structure 5. If the light-adjusting component 3 can also converges light in the X and –X directions, the luminance reaching the human eye under the oblique viewing angle is reduced by M*N times relative to the light source. Since the light regulating structure 5 and the light-adjusting component 3 do not have a blocking effect on the light perpendicular to the display module, the luminance reaching the human eye at the front viewing angle can be considered to be equivalent to the luminance of the light source, at this time, a ratio of the luminance at the front viewing angle to the luminance at the oblique viewing angle is M*N. If the light regulating structure 5 converges the light emitting along X direction and the light emitting along –X direction, and the light-adjusting component 3 converges the light emitting along Y direction and the light emitting along –Y direction, a ratio of the luminance at the front viewing angle to the luminance at the oblique viewing angle is M or N. The above discussion is only to illustrate the effects of the embodiments of the present disclosure without considering the absorption or blocking effect of other structures on light. In this regard, a test verification is conducted in the anti-peeping mode. Combined with FIG. 9 and Table 3, the angle $\theta$ in Table 3 refers to an angle formed between a certain viewing angle direction Y and y axis (the y axis is perpendicular to the plane of the display module). The angle $\sigma$ in Table 3 refers to an angle formed between an orthographic projection of a certain viewing angle direction Y on the plane of the display module and the x-axis (the x-axis is parallel to the plane of the display module). The luminance percentage 1 in Table 3 indicates the luminance percentage under different viewing angles when the display module only uses the backlight component 1 for dimming. The luminance percentage 2 indicates the luminance percentage under different viewing angles when the display module uses only the backlight component 1 and the light-adjusting component 3 for simultaneous dimming. The luminance percentage 3 indicates the luminance percentage under different viewing angles when the display module only uses the light-adjusting component 3 for dimming. The above luminance percentages are a ratio of the luminance under different viewing angles to the luminance at the front viewing angle corresponding to σ=0° and θ=0°. According to the test data of Table 3, taking three sets of data at θ=50°, θ=45°, and θ=40° when σ=0° as an example, the luminance percentage 2 has the lowest value, that is, the luminance percentage at an oblique viewing angle when the backlight component 1 and the light-adjusting component 3 is used for simultaneous dimming is the lowest. Therefore, based on the coordinated dimming of the backlight component 1 and the light-adjusting component 3, the luminance of the light at the oblique viewing angle is lower, and the anti-peeping effect is better.

Table 3

TABLE 3

| | θ (°) | luminance percentage 1 | luminance percentage 2 | luminance percentage 3 |
|---|---|---|---|---|
| σ = 0° | 0 | 100.00% | 100.00% | 100.0% |
| | 5 | 81.36% | 79.86% | 98.2% |
| | 10 | 51.03% | 47.33% | 92.7% |
| | 15 | 24.25% | 20.38% | 84.0% |
| | 20 | 9.49% | 6.89% | 72.6% |
| | 25 | 2.95% | 1.75% | 59.2% |
| | 30 | 1.57% | 0.71% | 44.9% |
| | 35 | 1.08% | 0.34% | 31.1% |
| | 40 | 0.76% | 0.15% | 19.3% |
| | 45 | 0.60% | 0.07% | 11.0% |
| | 50 | 0.50% | 0.03% | 7.0% |
| | 55 | 0.42% | 0.03% | 7.8% |
| | 60 | 0.34% | 0.04% | 12.9% |
| | 65 | 0.29% | 0.06% | 20.9% |
| | 70 | 0.26% | 0.08% | 30.2% |
| | 75 | 0.26% | 0.10% | 39.1% |
| | 80 | 0.34% | 0.16% | 46.2% |
| | 85 | 1.08% | 0.55% | 50.9% |

In view the above, in the embodiments of the present disclosure, by providing the light regulating structure 5 in the backlight component 1 and providing the light-adjusting component 3 at a side of the display component 2, the light regulating structure 5 can be firstly used to regulate the transmission direction of light emitted from the first light guide plate 7 so that the light is transmitted along a certain direction. The light is incident to the light-adjusting component 3 through the display component 2, and then a secondary regulation is performed on the light based on the liquid crystal birefringence principle of the light-adjusting component 3 to obtain more effectively directional control for light angle, thereby achieving viewing angle switching between the sharing mode and the anti-peeping mode. When a user is in a private place or in a public place without accessing bank accounts, paying bills and entering personal information, there is no need to perform anti-peeping. At this time, the display module can be controlled to be in the sharing mode, so that the user can enjoy the viewing experience with a large viewing angle. However, when the user is in a public place and needs to access bank accounts, pay bills and enter personal information, the display module can be controlled to be in the anti-peeping mode to achieve an invisible anti-peeping effect upon viewing obliquely, thereby effectively protecting user's privacy from leaking.

Therefore, in the display module according to the embodiments of the present disclosure, the light regulating structure 5 and the light-adjusting component 3 cooperate with each other, so that viewing angle switching in different modes is achieved, thereby optimizing the user experience.

It is understood that, referring to FIG. 1 and FIG. 2 again, the light-adjusting component 3 can include a first substrate 11 and a second substrate 12 that are opposite to each other, the first electrode 8 is located on a side of the first substrate 11 facing toward the second substrate 12, and the second electrode 10 is located on a side of the second substrate 12 facing toward the first substrate 11.

Figure 11:
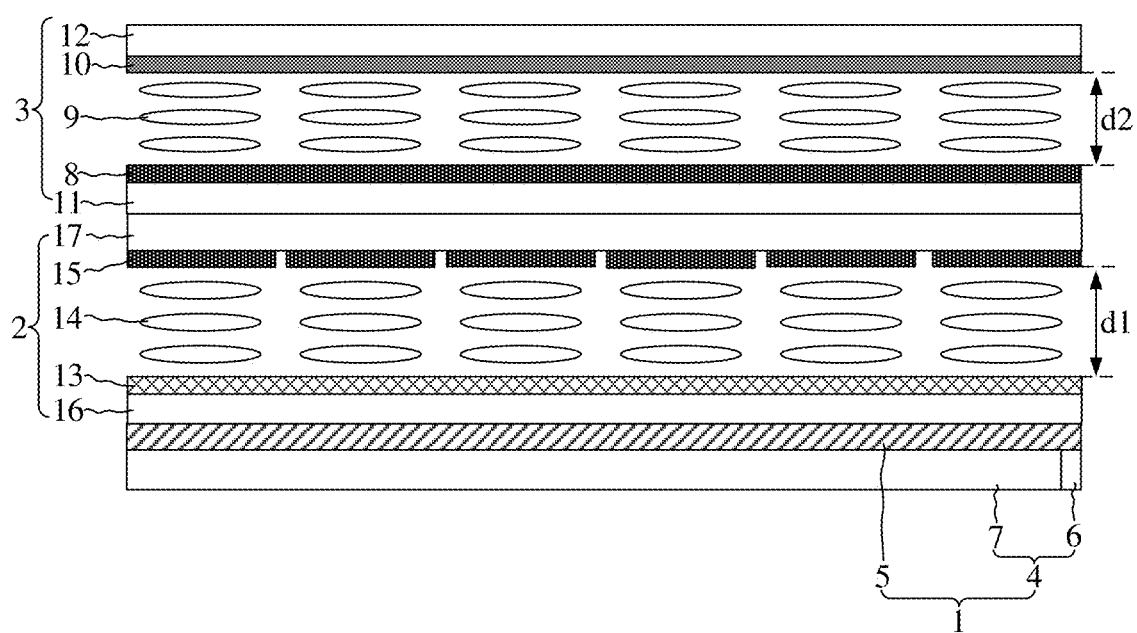
FIG. 11 is a schematic diagram of a display component according to an embodiment of the present disclosure.
Figure 12:
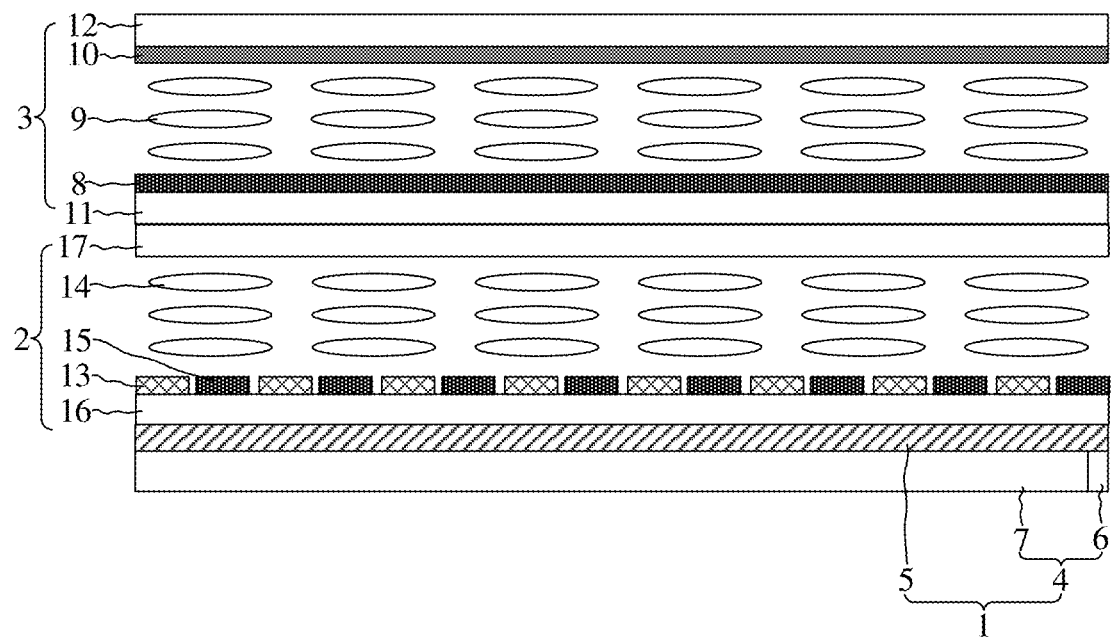
FIG. 12 is a schematic diagram of a display component according to another embodiment of the present disclosure.
Figure 13:
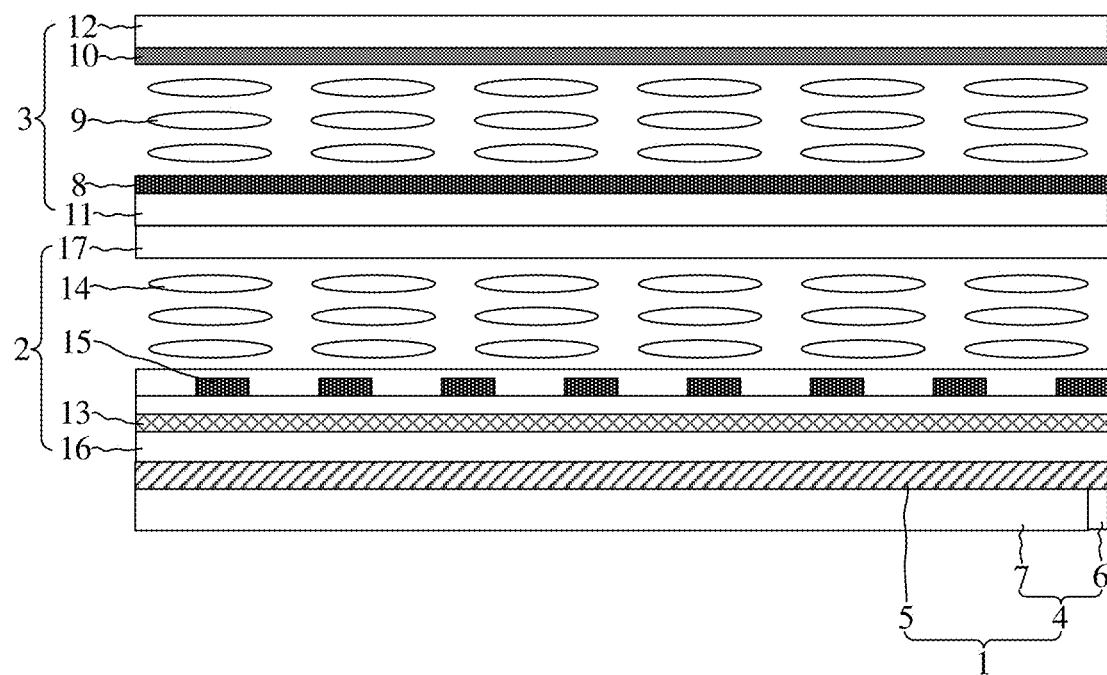
FIG. 13 is a schematic diagram of a display component according to another embodiment of the present disclosure.

FIG. 11 is a schematic diagram of a display component 2 according to an embodiment of the present disclosure, FIG. 12 is a schematic diagram of a display component 2 according to another embodiment of the present disclosure, and FIG. 13 is a schematic diagram of a display component 2 according to another embodiment of the present disclosure. In some embodiments of the present disclosure, as shown in FIG. 11 to FIG. 13, the display component 2 includes a third electrode 13, a second liquid crystal 14, and a fourth electrode 15. In an embodiment, the third electrode 13 is a common electrode, and the fourth electrode 15 is a pixel electrode. In another embodiment, the third electrode 13 is a pixel electrode, and the fourth electrode 15 is a common electrode. Referring to FIG. 11 again, the second liquid crystal 14 is located between the third electrode 13 and the fourth electrode 15. In an embodiment, referring to FIG. 12 and FIG. 13 again, the second liquid crystal 14 is located on a side of the third electrode 13 facing away from the backlight component 1 and a side of the fourth electrode 15 facing away from the backlight component 1. Exemplarily, as shown in FIG. 12, the third electrode 13 and the fourth electrode 15 can be disposed in a same layer, or as shown in FIG. 13, the third electrode 13 and the fourth electrode 15 can be disposed in different layers.

With such configuration, the display component 2 is a liquid crystal display component. When the display module performs image display, the third electrode 13 and the fourth electrode 15 are energized to form an electric field, so that the second liquid crystal 14 rotates when driven by the electric field. The magnitude of the electric field can be controlled to control the rotation angle of the second liquid crystal 14, thereby achieving the luminance of the light emitted from the display component 2.

Figure 14:
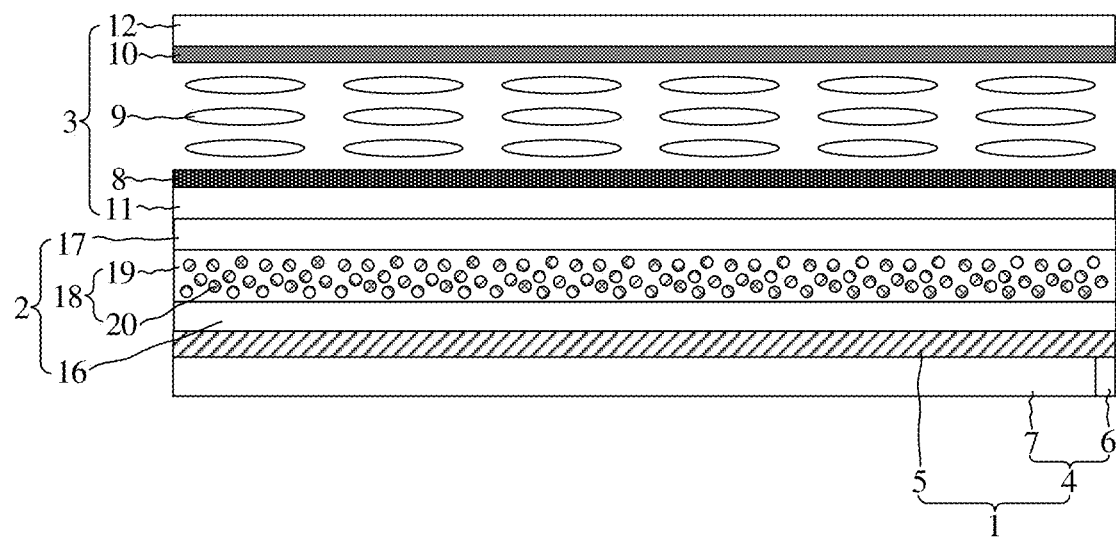
FIG. 14 is a schematic diagram of a display component according to another embodiment of the present disclosure.

FIG. 14 is a schematic diagram of a display component according to another embodiment of the present disclosure. In an embodiment of the present disclosure, as shown in FIG. 14, the display component 2 includes a quantum dot layer 18. In an embodiment of the present disclosure, the quantum dot layer 18 includes a base material 19 and quantum dots 20 located in the base material 19. The base material 19 can be made of a basic resin material such as an acrylic-based resin, a urethane-based resin, a silicone-based resin, or an epoxy resin.

With such configuration, the display component 2 is a quantum dot display component, and the quantum dots 20 in the quantum dot layer 18 will emit different colors of monochromatic light under the excitation of the light emitted from the backlight component 1, thereby achieving color display. Since quantum dot display has higher color gamut and lower energy consumption, the display module has better display performance.

It is understood that, referring to FIG. 11 to FIG. 14 again, the display component 2 can include a third substrate 16 and a fourth substrate 17 which are opposite to each other.

In an embodiment of the present disclosure, referring to FIG. 1 again, the light-adjusting component 3 is located on a side of the display component 2 facing away from the backlight component 1. At this time, the light-adjusting component 3 is located an outer side of the display module. The light emitted from the light-adjusting component 3 is directly incident to the human eye without passing through other structures such as the display component 2 and the like, so that it can preventing other structures from diverging the light, thereby improving the anti-peeping effect. In such a structure, the display component can be a liquid crystal display component as described above, or a quantum dot display component as described above.

Figure 15:
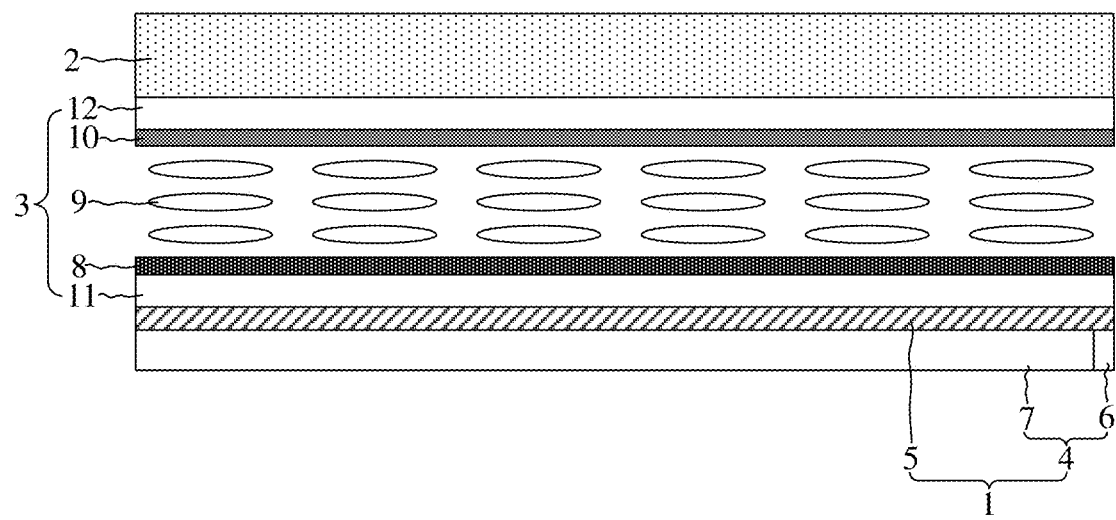
FIG. 15 is a schematic diagram of a display module according to another embodiment of the present disclosure.

FIG. 15 is a schematic diagram of a display module according to another embodiment of the present disclosure. In an embodiment of the present disclosure, as shown in FIG. 15, the display component 2 is located on a side of the light-adjusting component 3 facing away from the backlight component 1. Based on this relative positional relationship, when the display component 2 includes a touch function layer, the touch function layer is closer to the position touched by the user's finger, thereby improving the touch performance. The touch function layer can be an in-cell type and be located inside the display component 2, or can be an out-cell type and be located on a side of the display component 2 facing away from the light-adjusting component 3. In such a structure, the display component can be a liquid crystal display component as described above, or a quantum dot display component as described above.

Figure 16:
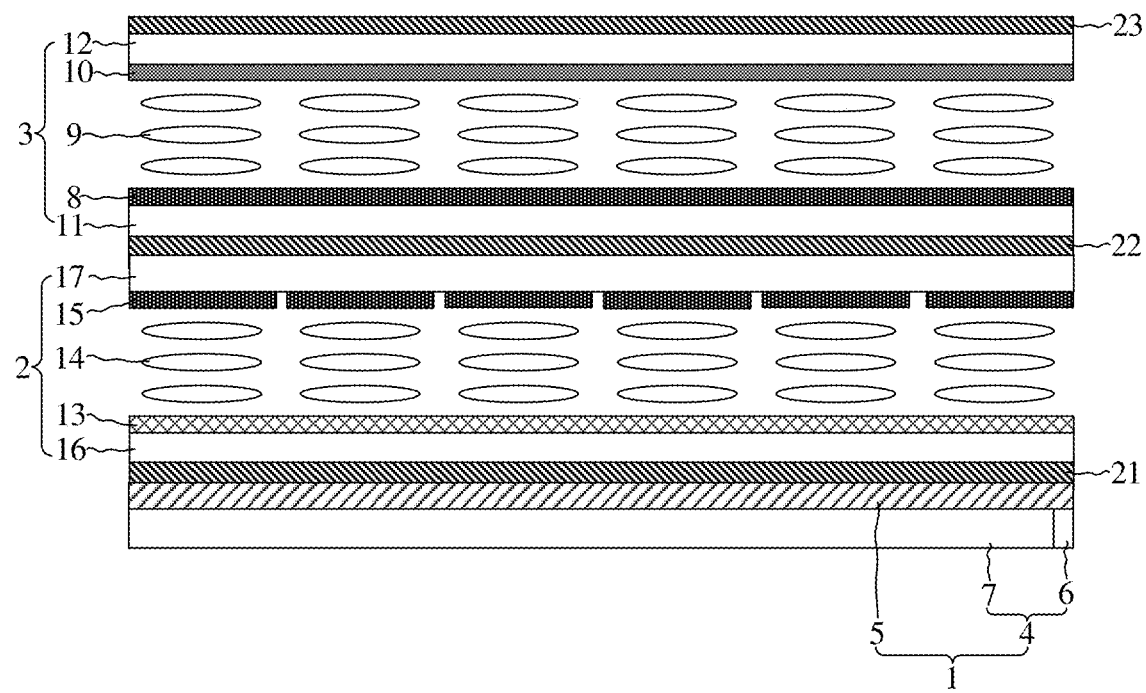
FIG. 16 is a schematic diagram of a display module according to another embodiment of the present disclosure.
Figure 17:
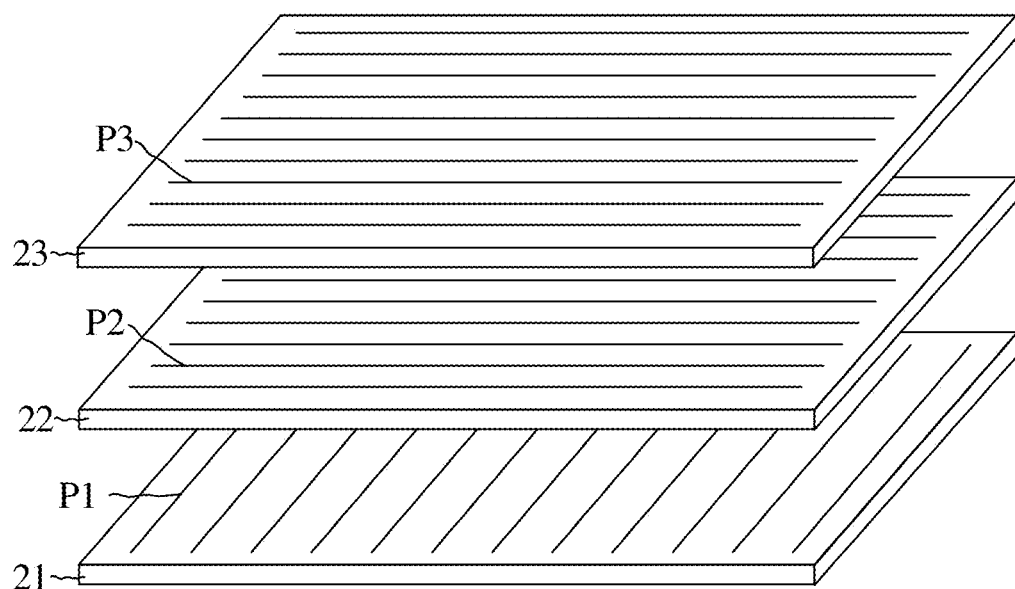
FIG. 17 is a schematic diagram showing an absorption axis of a polarizer according to an embodiment of the present disclosure.
Figure 18:
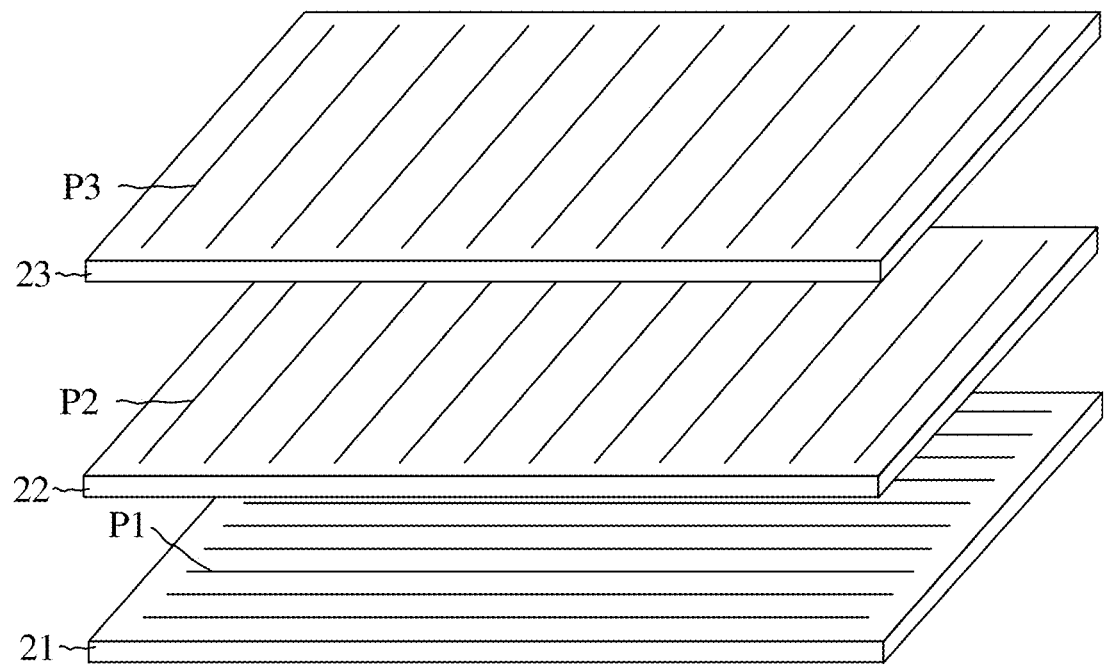
FIG. 18 is a schematic diagram showing an absorption axis of a polarizer according to another embodiment of the present disclosure.

FIG. 16 is a schematic diagram of a display module according to another embodiment of the present disclosure, FIG. 17 is a schematic diagram showing an absorption axis of a polarizer according to an embodiment of the present disclosure, and FIG. 18 is a schematic diagram showing an absorption axis of a polarizer according to another embodiment of the present disclosure. In an embodiment of the present disclosure, as shown in FIG. 16 to FIG. 18, the display module can include a first polarizer 21, a second polarizer 22, and a third polarizer 23. The first polarizer 21 is located on a side of the display component 2 facing away from the light-adjusting component 3, and has a first absorption axis P1. The second polarizer 22 is located between the display component 2 and the light-adjusting component 3, and has a second absorption axis P2 perpendicular to the first absorption axis P1. The third polarizer 23 is located on a side of the light-adjusting component 3 facing away from the display component 2, and has a third absorption axis P3 parallel to the second absorption axis P2.

In an embodiment of the present disclosure, the light-adjusting component 3 is located on a side of the display component 2 facing away from the backlight component 1. That is, the first polarizer 21 is located between the display component 2 and the backlight component 1, the second polarizer 22 is located between the display component 2 and the light-adjusting component 3, and the third polarizer 23 is located on a side of the light-adjusting component 3 facing away from the display component 2. Referring to FIG. 17 again, the absorption axis P1 extends horizontally, and the absorption axis P2 and the third absorption axis P3 extend vertically, so that the second absorption axis P2 is perpendicular to the first absorption axis P1, and the third absorption axis P3 is parallel to the second absorption axis P2. In another embodiment of the present disclosure, referring to FIG. 18 again, the first absorption axis P1 extends vertically, and the second absorption axis P2 and the third absorption axis P3 extend horizontally, so that the second absorption axis P2 is perpendicular to the first absorption axis P1, and the third absorption axis P3 is parallel to the second absorption axis P2.

Two polarizers with absorption axes perpendicular to each other are disposed at both sides of the display component 2, so that the luminance of the light emitted by the display component 2 can be controlled based on the cooperation of the two polarizers, thereby controlling the display component 2 to display images. The absorption axes of the polarizers at both sides of the light-adjusting component 3 are parallel to each other, so that the cooperation of the two polarizers can achieve the sharing and anti-peeping effects. The working principle will be described in detail in combination with following embodiments.

Figure 19:
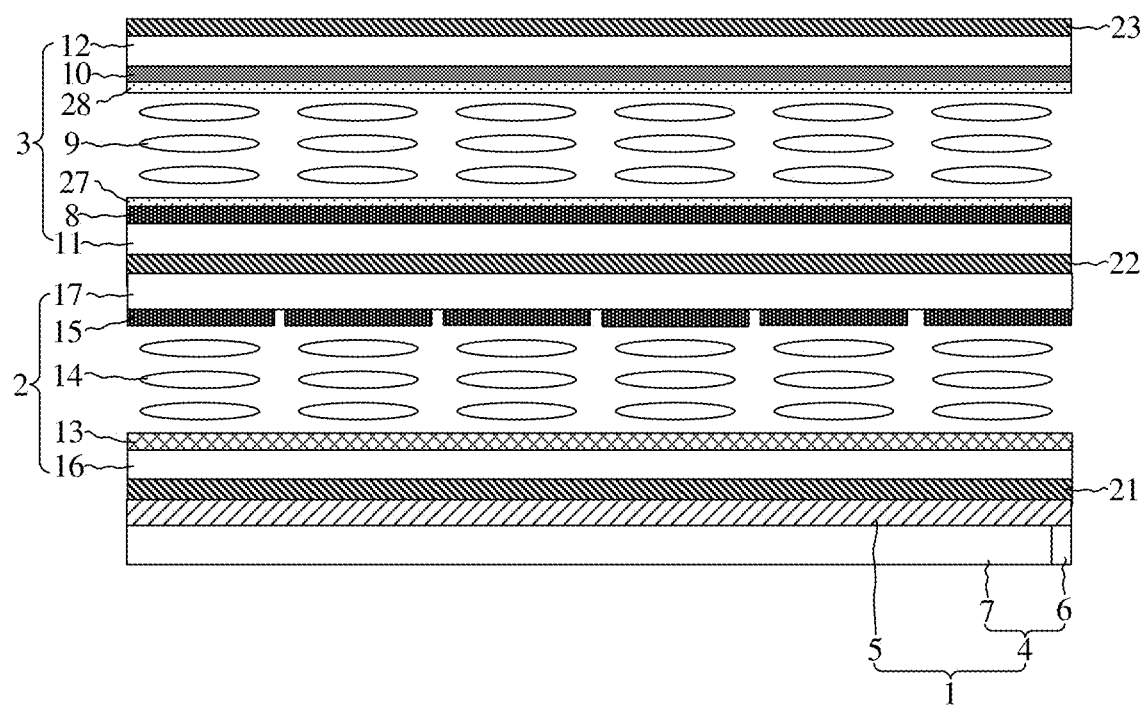
FIG. 19 is a schematic diagram of a display module according to another embodiment of the present disclosure.

FIG. 19 is a schematic diagram of a display module according to another embodiment of the present disclosure. In an embodiment of the present disclosure, as shown in FIG. 19, the first liquid crystal 9 is a positive liquid crystal, e.g., a single optical axis positive liquid crystal, a pretilt angle A1 of the first liquid crystal 9 satisfies: $0°≤A1≤10°$, that is, in the initial state of the first liquid crystal, an angle formed between the optical axis of the first liquid crystal 9 and a plane of the display module is in a range from 0° to 10°. The light-adjusting component 3 can include a first alignment film 27 and a second alignment film 28. The first alignment film 27 is located at a side of the first liquid crystal 9 facing toward the display component 2, and the second alignment film 28 is located on a side of the first liquid crystal 9 facing away from the display component 2. The first alignment film 27 and the second alignment film 28 have a same alignment direction that is parallel or perpendicular to the second absorption axis P2 and that is parallel to the extending direction of the edge of the display module.

Figure 25:
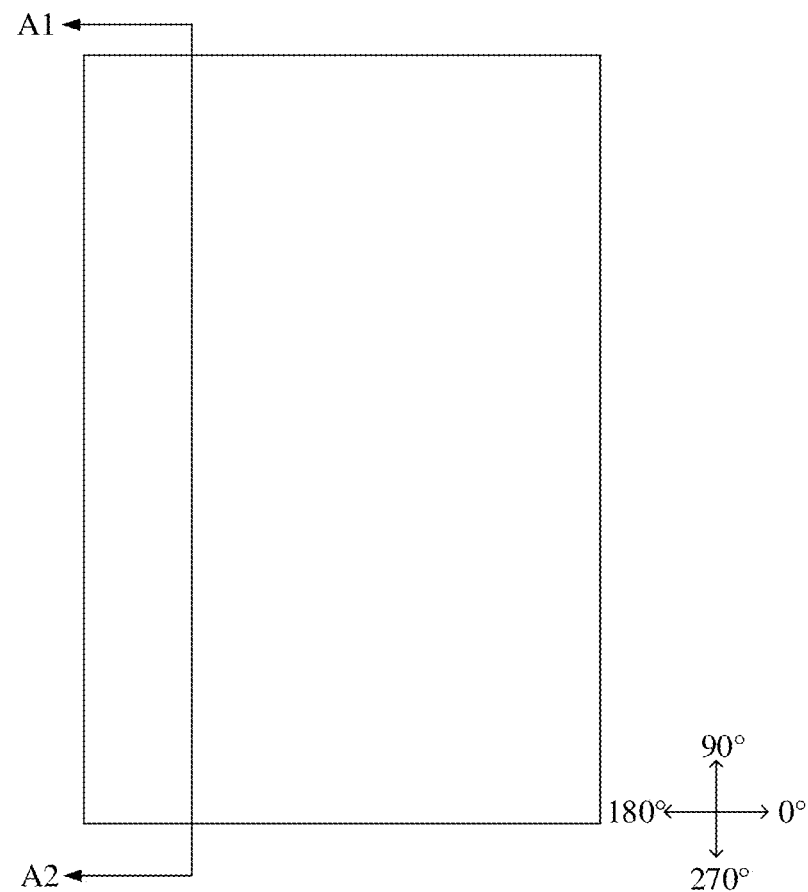
FIG. 25 is a top view of a display module according to an embodiment of the present disclosure.

The alignment directions of the first alignment film 27 and the second alignment film 28 are perpendicular to a light converging direction of the light-adjusting component 3. In an embodiment of the present disclosure, referring to FIG. 10 and FIG. 25, the top view of the display module shown in FIG. 25 is understood to be a layout view of the display module when the user's body was facing toward the display module. When the display module is performing anti-peeping at the left viewing angle and or at the right viewing angle, the light-adjusting component 3 converges the light emitting along the X and −X directions, and the alignment directions of the first alignment film 27 and the second alignment film 28 are 90° or 270°. When the display module is performing anti-peeping at the upper viewing angle and the lower viewing angle, the light-adjusting component 3 converges the light in the Y and −Y directions, and the alignment directions of the first alignment film 27 and the second alignment film 28 are 0° or 180°.

Next, taking the light-adjusting component 3 being located on a side of the display component 2 facing away from the backlight component 1 (i.e., the first polarizer 21 is located between the display component 2 and the backlight component 1, the second polarizer 22 is located between the display component 2 and the light-adjusting component 3, and the third polarizer 23 is located on a side of the light-adjusting component 3 facing away from the display component 2) as an example, the principle of dimming will be described below.

It should be understood that the light emitted from the second polarizer 22 is linear polarization light. When the linear polarization light is transmitted along a direction parallel or perpendicular to the optical axis of the first liquid crystal 9, the first liquid crystal 9 cannot affect the optical performance of the polarizing light. Two mutually orthogonal light waves decomposed by the linear polarization light have a same travelling speed when passing through the first liquid crystal 9, and there is no phase delay, so that the polarization direction of the linear polarization light after recombination will not be changed. When an angle formed between the linear polarization light and the optical axis of the first liquid crystal 9 is not 0° or 90°, there is a phase delay when the light wave passes through liquid crystal molecules, so that the polarization state of the linear polarization light after recombination will be changed.

The light emitted from the second polarizer 22 and transmitted along the front viewing angle direction is a first linear polarization light W1, and the light emitted from the second polarizer 22 and transmitted along the oblique viewing angle direction is a second linear polarization light W2. The polarization direction of the first linear polarization light W1 and the polarization direction of the second linear polarization light W2 each are parallel to the second absorption axis P2.

Figure 20:
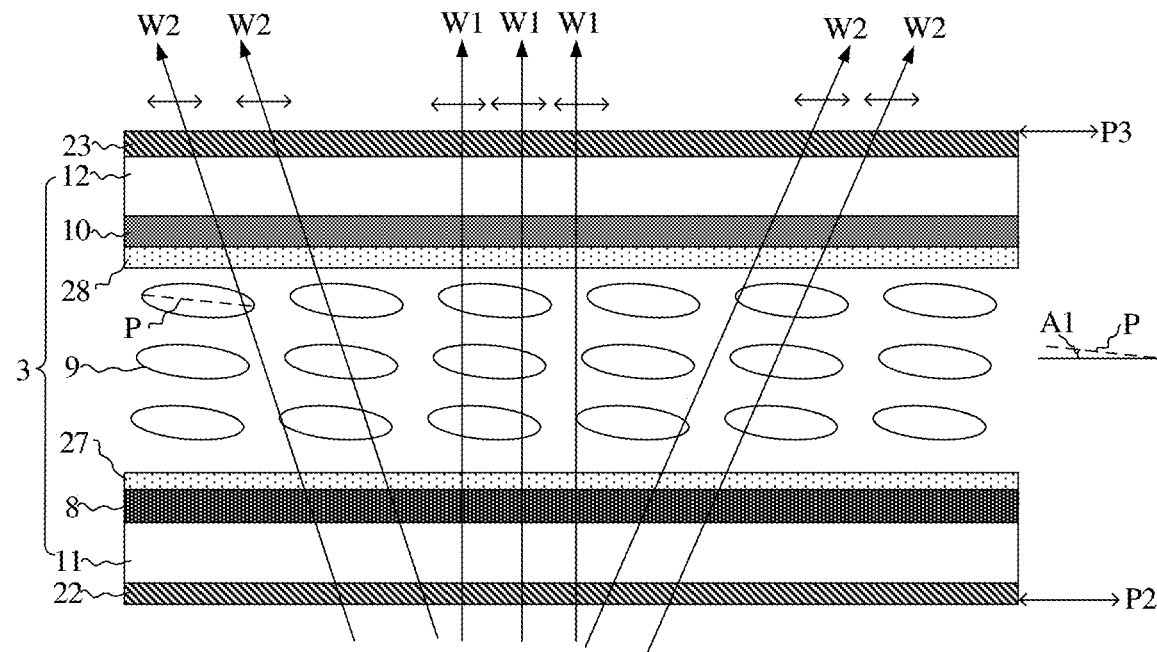
FIG. 20 is a light transmission diagram in a sharing mode according to an embodiment of the present disclosure.

FIG. 20 is a light transmission diagram in a sharing mode according to an embodiment of the present disclosure. As shown in FIG. 20, when the display module is in the sharing mode, the first electrode 8 and the second electrode 10 are not energized, the first liquid crystal 9 is in a wide viewing angle state (initial state), in which an angle formed between the optical axis P of the first liquid crystal 9 and a plane of the display module is a pretilt angle A1, and the first liquid crystal 9 is close to a lying state in which the first liquid crystal 9 is substantially parallel to the plane of the display module.

In such a mode, the first liquid crystal 9 tends to be in a completely lying sate, so that the optical axis P of the first liquid crystal 9 can be regarded as to be parallel to a plane of the display module and parallel or perpendicular to the second absorption axis. Therefore, the first linear polarization light W1 transmitted along the front viewing angle direction and the second linear polarization light W2 transmitted along the oblique viewing direction each are transmitted along the direction parallel or perpendicular to the optical axis P of the first liquid crystal 9. The polarization directions of the first linear polarization light W1 and the second linear polarization light W2 are not changed after the first linear polarization light W1 and the second linear polarization light W2 pass through the first liquid crystal 9, and are still parallel to the second absorption axis P2 and the third absorption axis P3, so that the first linear polarization light W1 and the second linear polarization light W2 each can emit through the third polarizer 23. Therefore, high luminance can be obtained under the front viewing angle and the oblique viewing angle, and no luminance loss is generated.

Figure 21:
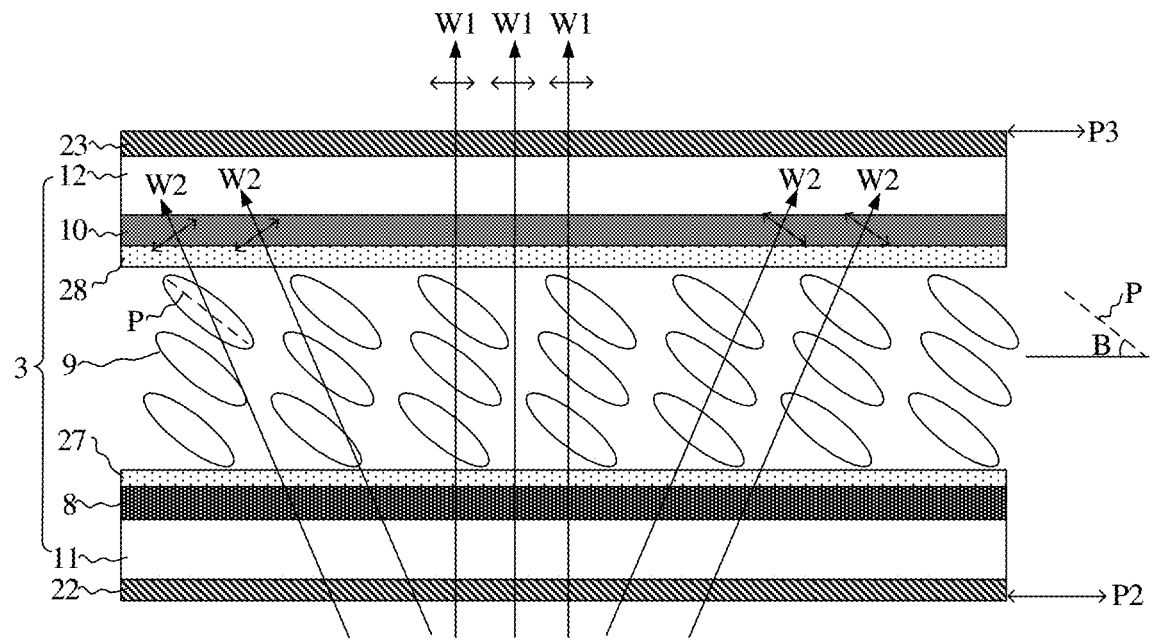
FIG. 21 is a light transmission diagram in an anti-peeping mode according to an embodiment of the present disclosure.

FIG. 21 is a light transmission diagram in an anti-peeping mode according to an embodiment of the present disclosure. As shown in FIG. 21, when the display module is in the anti-peeping mode, the first electrode 8 and the second electrode 10 are energized to generate a vertical electric field, and the first liquid crystal 9 is in a narrow viewing angle state. Since the first liquid crystal 9 is a positive liquid crystal, the optical axis P of the first liquid crystal 9 rotates along a direction parallel to the direction of the electric field, i.e., rotates relative to a plane of the display module. An angle B formed between the optical axis P of the rotated first liquid crystal 9 and the plane of the display module is greater than A1, and is not equal to 90°.

In such a mode, since the first liquid crystal 9 is rotated relative to the plane of the display module, an orthographic projection of the optical axis P of the first liquid crystal 9 is still parallel to the plane of the display module, and parallel or perpendicular to the second absorption axis under the front viewing angle. In this way, the first linear polarization light W1 is still transmitted along a direction parallel or perpendicular to the optical axis P of the first liquid crystal 9 under the front viewing angle, and the polarization direction of the first linear polarization light W1 is not changed after the first linear polarization light W1 passes through the first liquid crystal. The first linear polarization light W1 can be emitted through the third polarizer 23, and no luminance loss is generated under the front viewing angle. Under the oblique viewing angle, since an angle B is formed between the optical axis P of the first liquid crystal 9 and the plane of the display module, different degree of phase retardation can be generated when the second linear polarization light W2 passes through the first liquid crystal 9 under the oblique viewing angle. The polarization state of the second linear polarization light W2 is changed after the second linear polarization light W2 passes through the first liquid crystal 9, so that the polarization direction of the second linear polarization light W2 is no longer parallel to the second absorption axis P2 and the third absorption axis P3, which causes the second linear polarization light W2 not to be emitted through the third polarizer 23, thereby reducing the luminance of the light emitted from the oblique viewing angle.

It can be seen that based on the above structure of the light-adjusting component 3, when the display module is in the sharing mode, the light-adjusting component 3 can be controlled not to generate luminance attenuation under the front viewing angle and the oblique viewing angle, so that a larger luminance can be obtained under the front viewing angle and the oblique viewing angle, thereby improving the user's viewing experience under a large viewing angle. When the display module is in the anti-peeping mode, the light-adjusting component 3 can be controlled to attenuate only the luminance under the oblique viewing angle to achieve the anti-peeping effect without attenuating the luminance under the front viewing angle, so that no luminance loss is generated under the front viewing angle.

In the related art, in order to achieve an anti-peeping effect, a louver grating is usually used to cut off the light in the oblique viewing angle direction, but the louver grating can affect the light transmittance in the front viewing angle direction, so that the maximum light transmittance under the front viewing angle is only 75%. With the viewing angle dimming structure according to the embodiments of the present disclosure, the light transmittance under the front viewing angle cannot be affected in the anti-peeping mode. No matter the display module is in the sharing mode or the anti-peeping mode, a higher luminance can be obtained under the front viewing angle. Therefore, the effect is better than the related art, and the user experience is better.

In an embodiment of the present disclosure, A1=0°, so that the first liquid crystal 9 is in a completely lying state under the initial state, thereby avoiding luminance degradation in the sharing mode to a greater extent. In another embodiment of the present disclosure, 0°<A1≤10°. With such configuration, when the display module is switched from the sharing mode to the anti-peeping mode, the first liquid crystal 9 can be rotated on the basis of A1, and can be rotated more quickly to the angle required for the anti-peeping mode.

Figure 22:
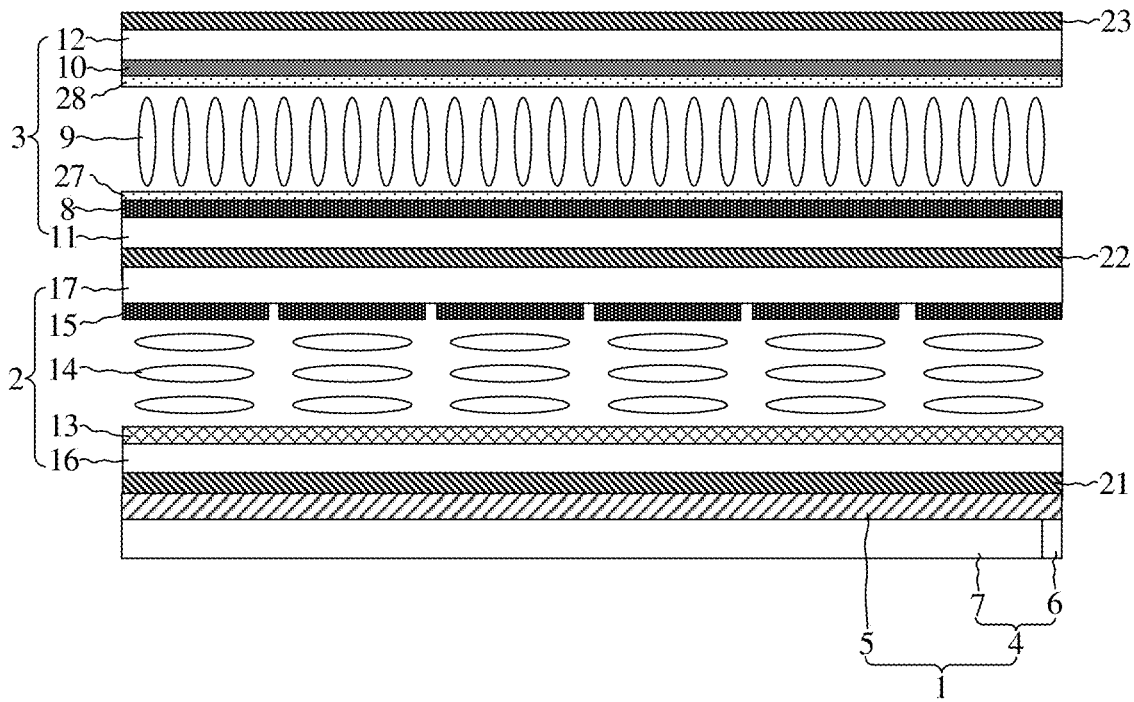
FIG. 22 is a schematic diagram of a display module according to another embodiment of the present disclosure.

FIG. 22 is a schematic diagram of a display module according to another embodiment of the present disclosure. In another embodiment of the present disclosure, as shown in FIG. 22, the first liquid crystal 9 is a negative liquid crystal, e.g., a single light axial negative liquid crystal. A pretilt angle A2 of the first liquid crystal 9 satisfies 85°≤A2≤95°. That is, in the initial state of the first liquid crystal, an angle ranging from 85° to 95° is formed between the optical axis of the first liquid crystal 9 and a plane of the display module. The light-adjusting component 3 also includes a first alignment film 27 and a second alignment film 28. The first alignment film 27 is located on a side of the first liquid crystal 9 facing toward the display component 2, and the second alignment film 28 is located on a side of the first liquid crystal 9 facing away from the display component 2. The first alignment film 27 and the second alignment film 28 have a same alignment direction that is parallel or perpendicular to the second absorption axis P2 and that is parallel to the extending direction of the edge of the display module.

Figure 23:
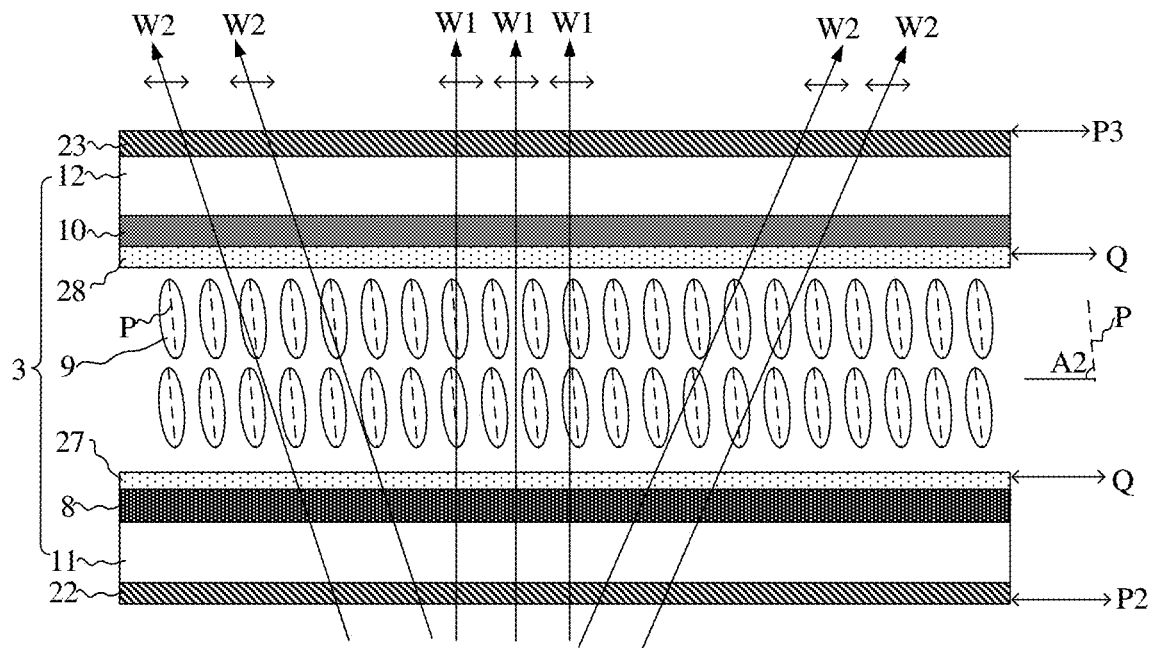
FIG. 23 is a light transmission diagram in a sharing mode according to another embodiment of the present disclosure.

FIG. 23 is a light transmission diagram in a sharing mode according to another embodiment of the present disclosure. As shown in FIG. 23, when the display module is in the sharing mode, the first electrode 8 and the second electrode 10 are not energized, and the first liquid crystal 9 is in a wide viewing angle state (initial state), in which a pretilt angle A2 is formed between the optical axis P of the first liquid crystal 9 and a plane of the display module, and the first liquid crystal 9 is close to an upright state.

In such a mode, the first liquid crystal 9 tends to be a completely upright state, and the optical axis P of the first liquid crystal 9 can be regarded as the plane of the vertical display module. Therefore, the first linear polarizing light W1 transmitted in the front viewing angle direction and the second linear polarization light W2 transmitted in the oblique viewing angle direction are transmitted along a direction parallel or perpendicular to the optical axis P of the first liquid crystal 9. The polarization directions of the first linear polarization light W1 and the second linear polarization light W2 are not changed after the first linear polarization light W1 and the second linear polarization light W2 pass through the first liquid crystal 9, and are still parallel to the second absorption axis P2 and the third absorption axis P3. Therefore, the first linear polarization light W1 and the second linear polarization light W2 each are emitted through the third polarizer 23, so that a higher viewing angle are obtained under the front viewing angle and the oblique viewing angle, and no luminance loss is generated.

Figure 24:
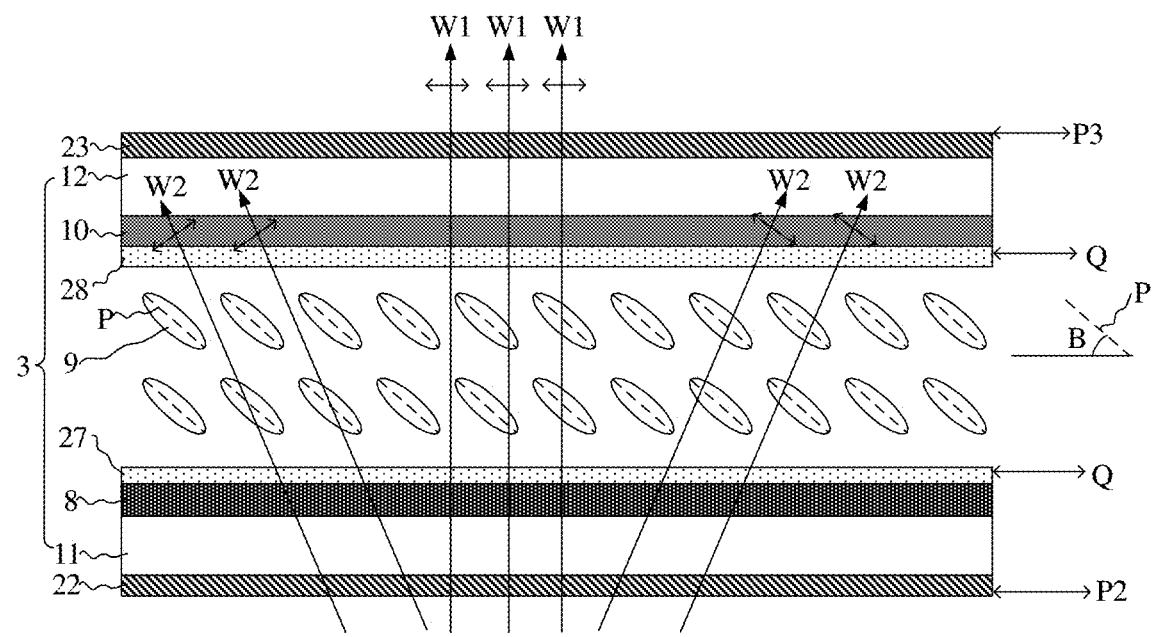
FIG. 24 is a light transmission diagram in an anti-peeping mode according to another embodiment of the present disclosure.

FIG. 24 is a light transmission diagram in an anti-peeping mode according to another embodiment of the present disclosure. As shown in FIG. 24, when the display module is in the anti-peeping mode, the first electrode 8 and the second electrode 10 are energized to generate a vertical electric field, the first liquid crystal 9 is in a narrow viewing angle state. Since the first liquid crystal 9 is a negative liquid crystal, the optical axis P of the first liquid crystal 9 rotates along a direction perpendicular to the direction of the electric field, that is, rotates relative to a plane of the display mode. An angle B is formed between the optical axis P of the first liquid crystal 9 after rotation and the plane of the display module is smaller than A2 and is not equal to 0°.

In such a mode, since the first liquid crystal 9 is rotated relative to the plane of the display module, an orthographic projection of the optical axis P of the first liquid crystal 9 is still parallel to the plane of the display module and parallel or perpendicular to the second absorption axis P2 under the front viewing angle. In this way, the first linear polarization light W1 is still transmitted along a direction parallel or perpendicular to the optical axis P of the first liquid crystal 9 under the front viewing angle. The polarization direction of the first linear polarization light W1 is not changed after the first linear polarization light W1 passes through the first liquid crystal 9, and is still parallel to the second absorption axis P2 and the third absorption axis P3, so that the first linear polarization light W1 can be emitted through the third polarizer 23, and no luminance loss is generated under the front viewing angle. In the oblique viewing angle, an angle B is formed between the optical axis P of the first liquid crystal 9 and the plane of the display module, so that different degree of phase retardation can be generated when the second linear polarization light W2 passes through the first liquid crystal 9 under the oblique viewing angle. The polarization state of the second linear polarization light W2 is changed after the second linear polarization light W2 passes through the first liquid crystal 9, so that the polarization direction of the second linear polarization light W2 is no longer parallel to the second absorption axis P2 and the third absorption axis P3, which causes the second linear polarization light W2 not to be emitted through the third polarizer 23, thereby reducing the luminance of the light emitted from the oblique viewing angle.

It can be seen that based on the above structure of the light-adjusting component 3, when the display module is in the sharing mode, the light-adjusting component 3 can be controlled not to generate luminance attenuation under the front viewing angle and the oblique viewing angle, so that a larger luminance can be obtained under the front viewing angle and the oblique viewing angle, thereby improving the user's viewing experience under a large viewing angle. When the display module is in the anti-peeping mode, the light-adjusting component 3 can be controlled to attenuate only the luminance under the oblique viewing angle to achieve the anti-peeping effect without attenuating the luminance under the front viewing angle, so that no luminance loss is generated under the front viewing angle, and a larger luminance is achieved.

In an embodiment of the present disclosure, A2=90°, so that the first liquid crystal 9 is in a completely upright state under the initial state, thereby avoiding luminance degradation in the sharing mode to a greater extent. In another embodiment of the present disclosure, 85°≤A2≤95° and A2≠90°. With such configuration, when the display module is switched from the sharing mode to the anti-peeping mode, the first liquid crystal 9 can be rotated on the basis of A2, and can be rotated more quickly to the angle required for the anti-peeping mode.

In an embodiment of the present disclosure, referring to FIG. 21 and FIG. 24 again, when the first liquid crystal 9 is in the narrow viewing angle state, an angle B formed between the optical axis P of the first liquid crystal 9 and the plane of the display module satisfies 40°≤B≤50°. At this time, the angle formed between the optical axis P of the first liquid crystal 9 and the plane of the display module is close to 45°, the influence of the first liquid crystal 9 on the optical characteristics of the second linear polarizing light W2 under the oblique viewing angle tends to be the greatest, and the polarization state of the second polarizing light W2 after passing through the first liquid crystal 9 has been changed to a greater extent, so that more second polarizing light cannot be emitted through the third polarizer 23, thereby increasing the luminance attenuation under the oblique viewing angle and improving the anti-peeping effect.

In an embodiment, B=45°, so that the luminance of the light under the oblique viewing angle in the anti-peeping mode is minimized.

It should be understood that, based on an XY coordinate system, when the alignment directions of the first alignment film 27 and the second alignment film 28 are parallel to the edge of the display module, it can be parallel to the edge of the display module extending along the X axis, and also be parallel to the edge of the display module extending along the Y axis.

Taking the display module applied in a mobile phone as an example, in daily life, users usually access bank accounts, pay bills, or enter personal information when operating the mobile phone in a vertical screen, it is more necessary to prevent peeping from the left and right viewing angles. For this purpose, in combination with the top view of the display module shown in FIG. 25, the top view can be understood as a layout view of the display module when the user's body is facing toward the display module. The pointing direction of the X axis of the first quadrant in the coordinate quadrant is 0° as a reference, the alignment directions of the first alignment film 27 and the second alignment film 28 can be set to be 90° or 270°, that is, the alignment direction is parallel to a long side direction of the display module. At this time, FIG. 19 to FIG. 24 each are a cross-sectional view along the A1-A2 direction of FIG. 25, Therefore, anti-peeping from the left and right angles can be effectively achieved. Such configuration is more suitable for the anti-peeping scenes that are required in daily life.

In an embodiment of the present disclosure, referring to FIG. 11 again, in a direction perpendicular to a plane of the display module, a cell gap d1 of the first liquid crystal 9 is greater than a cell gap d2 of the second liquid crystal 14, i.e., d1>d2.

If the cell gap of the first liquid crystal 9 is small, the phase retardation efficiency of the light wave decomposed by the second linear polarization light W2 under the oblique viewing angle when the second linear polarization light W2 passes through the first liquid crystal 9 in the anti-peeping mode is small, resulting in non-obvious luminance attenuation under the oblique viewing angle. The cell gap of the first liquid crystal 9 is set to be larger than the cell gap of the second liquid crystal 14, the phase retardation efficiency of the second linear polarization light W2 can be improved, so that greater luminance attenuation under oblique viewing angles is obtained, thereby achieving a more significant anti-peeping effect.

In an embodiment of the present disclosure, in a direction perpendicular to a plane of the display module, a cell gap d1 of the first liquid crystal 9 satisfies 5 μm≤d1≤8 μm.

By setting the minimum cell gap of the first liquid crystal 9 to be 5 μm, the first liquid crystal 9 can have a sufficient cell gap to achieve greater influence of the first liquid crystal 9 on the polarization state of the second linear polarization light W2 under an oblique viewing angle, thereby increasing the luminance attenuation under the oblique viewing angle. By setting the maximum cell gap of the first liquid crystal 9 to be 8 μm, the cell gap of the first liquid crystal 9 can be prevented from being too large, so that the cell gap of the first liquid crystal 9 is approximately the thickness of a half wave plate, thereby achieving better anti-peeping effect, and avoiding affecting the overall thickness of the display module.

In an embodiment of the present disclosure, in the anti-peeping mode, V=5.095−1.479×((ln(Δε)−ln(d1)+1)), where V denotes a voltage difference between the first electrode 8 and the second electrode 10, Δε denotes a difference between a dielectric constant σ// and a dielectric constant ε⊥, a dielectric constant σ// denotes a horizontal dielectric constant, and a dielectric constant ε⊥denotes a vertical dielectric constant, and d1 denotes a cell gap of the first liquid crystal 9 in a direction perpendicular to a plane of the display module.

In order to use the light-adjusting component 3 to achieve a better anti-peeping effect, several sets of data tests under the conditions of different parameters V and different parameters d1 are conducted, and the test data is shown in Table 4. Based on several sets of test data, the above fitting formula can be obtained between the parameter V and the parameter d1. In this way, when the structure of the display module is designed, no matter what cell gap the first liquid crystal 9 has, a voltage difference matching with the cell gap can be obtained according to the formula, so that the first liquid crystal 9 driven by the electric field formed by the voltage difference is rotated to the angle required by the anti-peeping mode, thereby achieving a better anti-peeping effect.

Table 4

TABLE 4

| ε//(F/m) | ε⊥ (F/m) | Δε (F/m) | d1 (μm) | V (V) |
|---|---|---|---|---|
| 6.8 | 2.8 | 4 | 5.5 | 4.12 |
| 6.8 | 2.8 | 4 | 5.6 | 4.14 |
| 6.8 | 2.8 | 4 | 5.7 | 4.18 |
| 6.8 | 2.8 | 4 | 5.8 | 4.21 |
| 6.8 | 2.8 | 4 | 5.9 | 4.23 |
| 6.8 | 2.8 | 4 | 6 | 4.25 |
| 6.8 | 2.8 | 4 | 6.1 | 4.28 |
| 6.8 | 2.8 | 4 | 6.2 | 4.3 |
| 6.8 | 2.8 | 4 | 6.3 | 4.32 |
| 6.8 | 2.8 | 4 | 6.4 | 4.34 |
| 6.8 | 2.8 | 4 | 6.5 | 4.36 |
| 6.8 | 2.8 | 4 | 6.6 | 4.38 |
| 6.8 | 2.8 | 4 | 6.7 | 4.4 |
| 6.8 | 2.8 | 4 | 6.8 | 4.42 |
| 6.8 | 2.8 | 4 | 6.9 | 4.44 |
| 6.8 | 2.8 | 4 | 7 | 4.46 |
| 8.8 | 2.8 | 6 | 5.5 | 3.48 |
| 8.8 | 2.8 | 6 | 5.6 | 3.51 |
| 8.8 | 2.8 | 6 | 5.7 | 3.53 |
| 8.8 | 2.8 | 6 | 5.8 | 3.55 |
| 8.8 | 2.8 | 6 | 5.9 | 3.57 |
| 8.8 | 2.8 | 6 | 6 | 3.59 |
| 8.8 | 2.8 | 6 | 6.1 | 3.61 |
| 8.8 | 2.8 | 6 | 6.2 | 3.63 |
| 8.8 | 2.8 | 6 | 6.3 | 3.65 |
| 8.8 | 2.8 | 6 | 6.4 | 3.66 |
| 8.8 | 2.8 | 6 | 6.5 | 3.68 |
| 8.8 | 2.8 | 6 | 6.6 | 3.7 |
| 8.8 | 2.8 | 6 | 6.7 | 3.72 |
| 8.8 | 2.8 | 6 | 6.8 | 3.73 |
| 8.8 | 2.8 | 6 | 6.9 | 3.75 |
| 8.8 | 2.8 | 6 | 7 | 3.77 |
| 10.8 | 2.8 | 8 | 5 | 3.02 |
| 10.8 | 2.8 | 8 | 5.1 | 3.04 |
| 10.8 | 2.8 | 8 | 5.2 | 3.06 |
| 10.8 | 2.8 | 8 | 5.3 | 3.07 |
| 10.8 | 2.8 | 8 | 5.4 | 3.09 |
| 10.8 | 2.8 | 8 | 5.5 | 3.11 |
| 10.8 | 2.8 | 8 | 5.6 | 3.13 |
| 10.8 | 2.8 | 8 | 5.7 | 3.14 |
| 10.8 | 2.8 | 8 | 5.8 | 3.16 |
| 10.8 | 2.8 | 8 | 5.9 | 3.18 |
| 10.8 | 2.8 | 8 | 6 | 3.19 |
| 10.8 | 2.8 | 8 | 6.1 | 3.21 |
| 10.8 | 2.8 | 8 | 6.2 | 3.23 |
| 10.8 | 2.8 | 8 | 6.3 | 3.24 |
| 10.8 | 2.8 | 8 | 6.4 | 3.26 |
| 10.8 | 2.8 | 8 | 6.5 | 3.27 |
| 10.8 | 2.8 | 8 | 6.6 | 3.28 |
| 10.8 | 2.8 | 8 | 6.7 | 3.30 |
| 10.8 | 2.8 | 8 | 6.8 | 3.32 |
| 10.8 | 2.8 | 8 | 6.9 | 3.33 |
| 10.8 | 2.8 | 8 | 7 | 3.35 |

In an embodiment of the present disclosure, referring to FIG. 1 and FIG. 2 again, the first electrode 8 and the second electrode 10 each cover the first liquid crystal 9 in a direction perpendicular to a plane of the display module. At this time, the first electrode 8 and the second electrode 10 are a planar electrode. After the first electrode 8 and the second electrode 10 are energized, the first electrode 8 and the second electrode 10 can form a more uniformly distributed vertical electric field in a liquid crystal cell of the first liquid crystal 9. The first liquid crystal 9 in various regions can be rotated to an angle required for anti-peeping under the action of the vertical electric field, thereby achieving a high regulation accuracy of the first liquid crystal 9.

Figure 26:
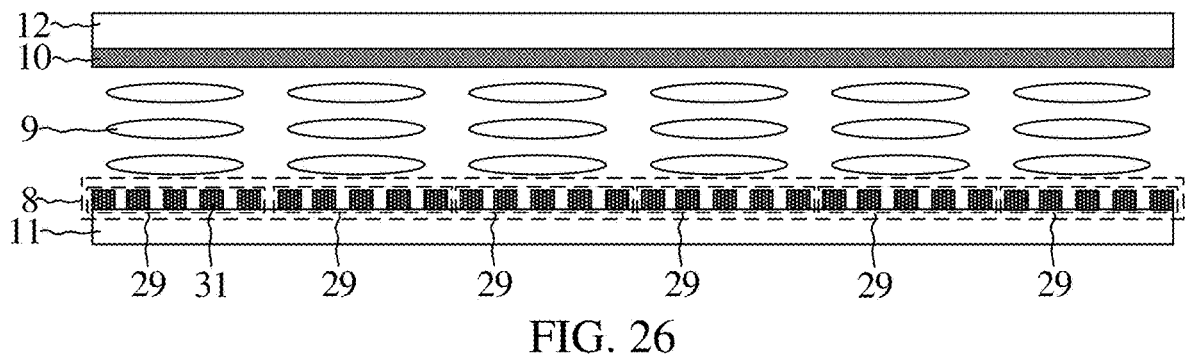
FIG. 26 is a schematic diagram of a light-adjusting component according to an embodiment of the present disclosure.
Figure 27:
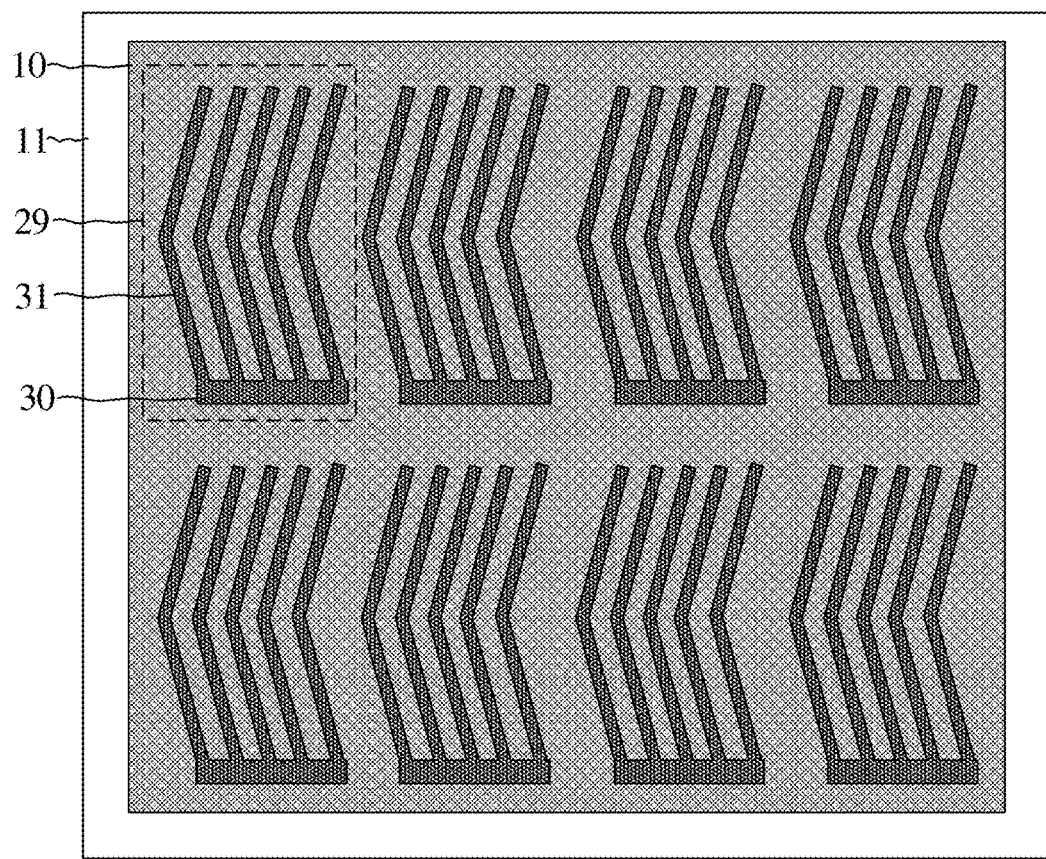
FIG. 27 is a top view of the first electrode and the second electrode corresponding to FIG. 26 according to an embodiment of the present disclosure.

FIG. 26 is a schematic diagram of a light-adjusting component 3 according to another embodiment of the present disclosure, and FIG. 27 is a top view of the first electrode 8 and the second electrode 10 corresponding to FIG. 26 according to another embodiment of the present disclosure. In another embodiment of the present disclosure, as shown in FIG. 26 and FIG. 27, the first electrode 8 includes at least one first sub-electrode 29. The first sub-electrode 29 includes a first main electrode strip 30 and a plurality of first toothed electrode strips 31. The first toothed electrode strips 31 are connected to the first main electrode strip 30 and parallel to each other. The second electrode 10 covers the first liquid crystal 9 in a direction perpendicular to a plane of the display module while the second electrode 10 and the first electrode 8 are a planar electrode and a grid electrode, respectively.

Figure 28:
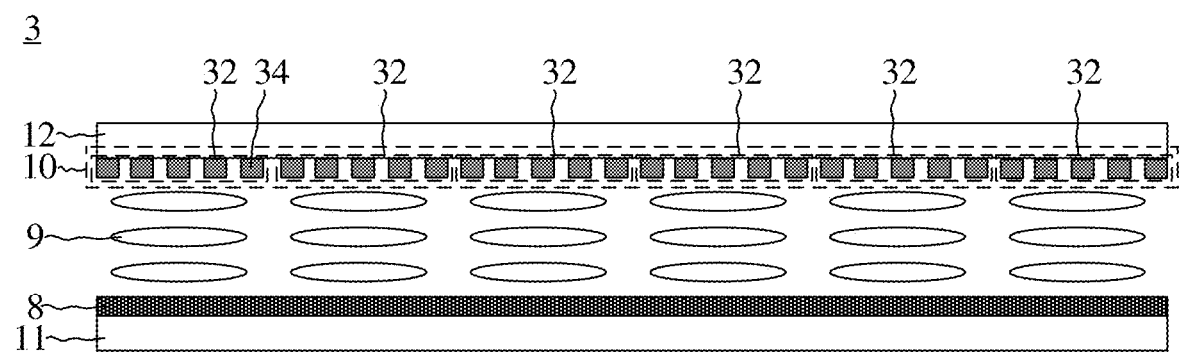
FIG. 28 is a schematic diagram of a light-adjusting component according to another embodiment of the present disclosure.
Figure 29:
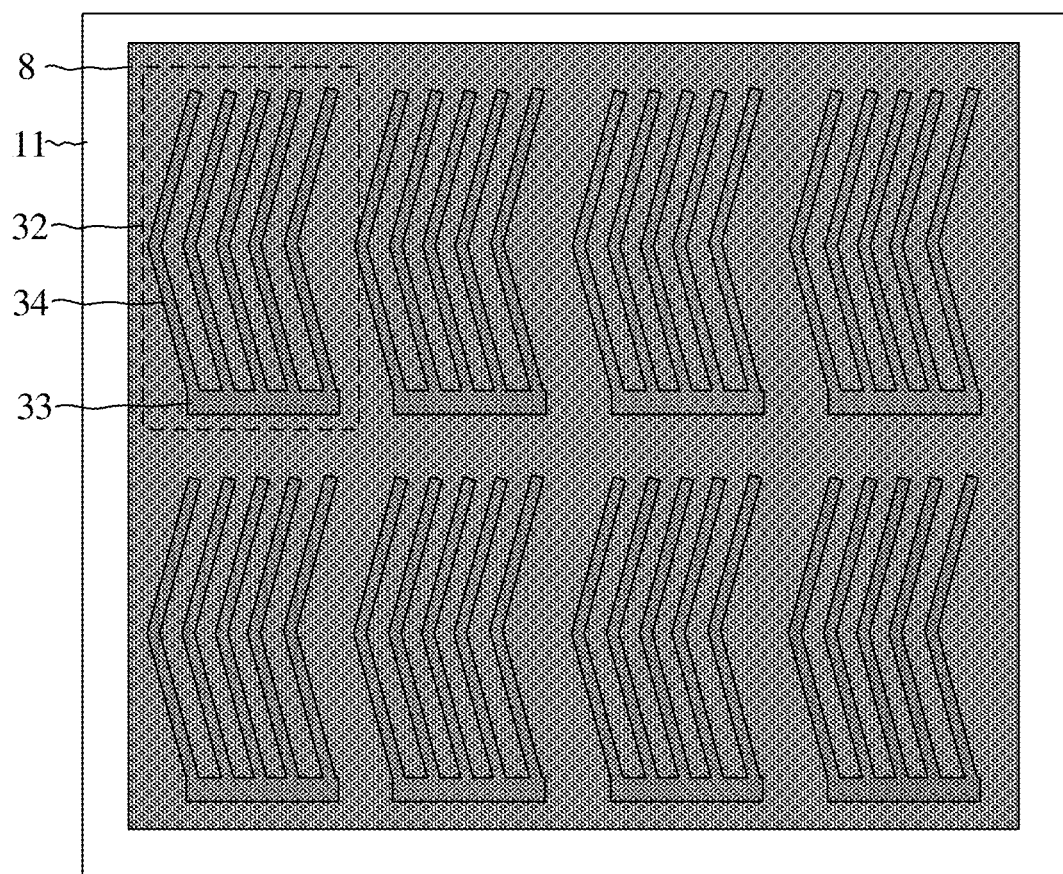
FIG. 29 is a top view of the first electrode and the second electrode corresponding to FIG. 28 according to an embodiment of the present disclosure.

FIG. 28 is a schematic diagram of a light-adjusting component 3 according to another embodiment of the present disclosure, and FIG. 29 is a top view of the first electrode 8 and the second electrode 10 corresponding to FIG. 28 according to an embodiment of the present disclosure. As shown in FIGS. 28 and 29, in a direction perpendicular to a plane of the display module, the first electrode 8 covers the first liquid crystal 9. The second electrode 10 includes at least one second sub-electrode 32. The second sub-electrode 32 includes a second main electrode strip 33 and a plurality of second toothed electrode strips 34. The second toothed electrode strips 34 are connected to the second main electrode strip 33 and parallel to each other while the first electrode 8 and the second electrode 10 are a planar electrode and a grid electrode, respectively.

Figure 30:
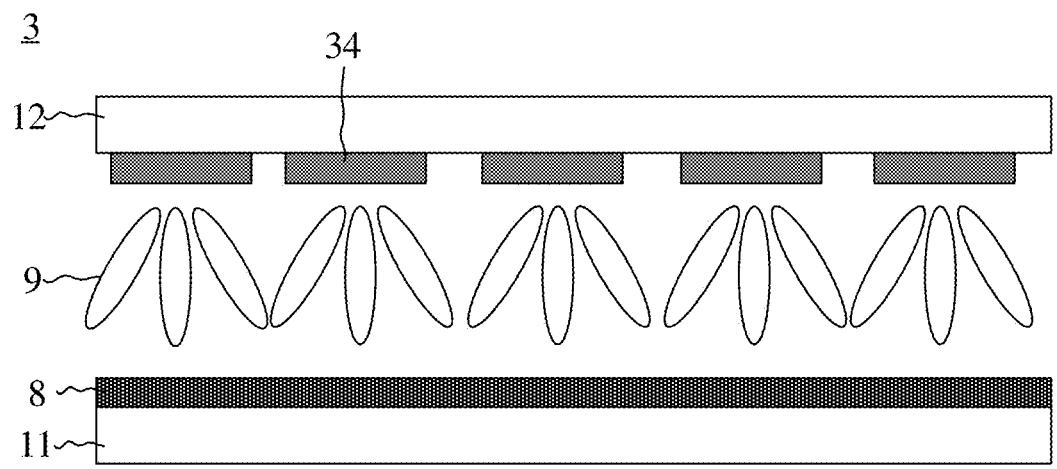
FIG. 30 is a schematic diagram showing rotation of a first liquid crystal when the first electrode and the second electrode corresponding to FIG. 28 are energized according to an embodiment of the present disclosure.

When one of the first electrode 8 and the second electrode 10 is a planar electrode, and the other of the first electrode 8 and the second electrode 10 is a grid electrode, as shown in FIG. 30, FIG. 30 is a schematic diagram showing rotation of a first liquid crystal 9 when the first electrode 8 and the second electrode 10 corresponding to FIG. 28 are energized according to an embodiment of the present disclosure, a relatively uniform vertical electric field can be formed after the first electrode 8 and the second electrode 10 are energized, the first liquid crystal 9 is rotated under the action of the vertical electric field, so that the optical property of the second polarization light W2 under the oblique viewing angle is adjusted. Moreover, by setting one of the first electrode 8 and the second electrode 10 as a grid electrode, there is a gap between the toothed electrode strips of grid electrode, so that the degree of light shielding is small, thereby improving the light emission rate of the display module.

Figure 31:
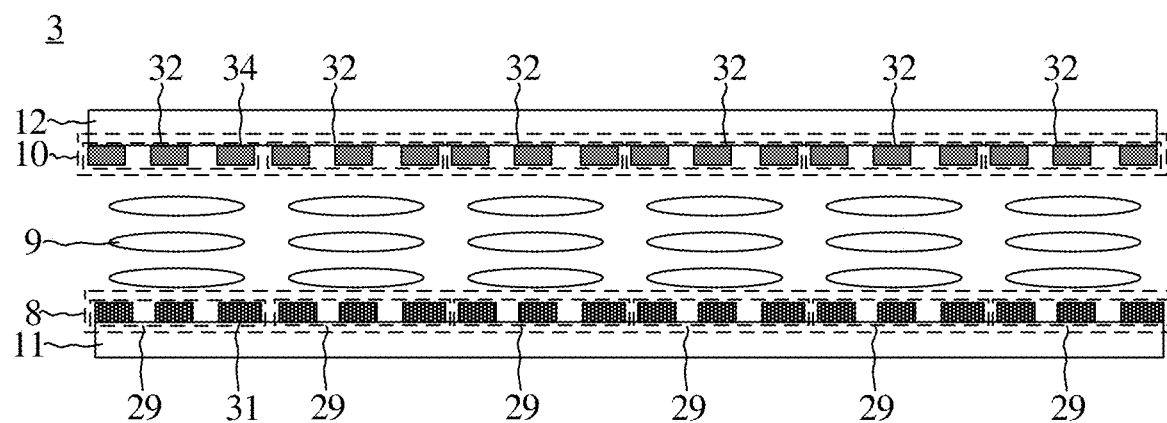
FIG. 31 is a schematic diagram of a light-adjusting component according to another embodiment of the present disclosure.
Figure 32:
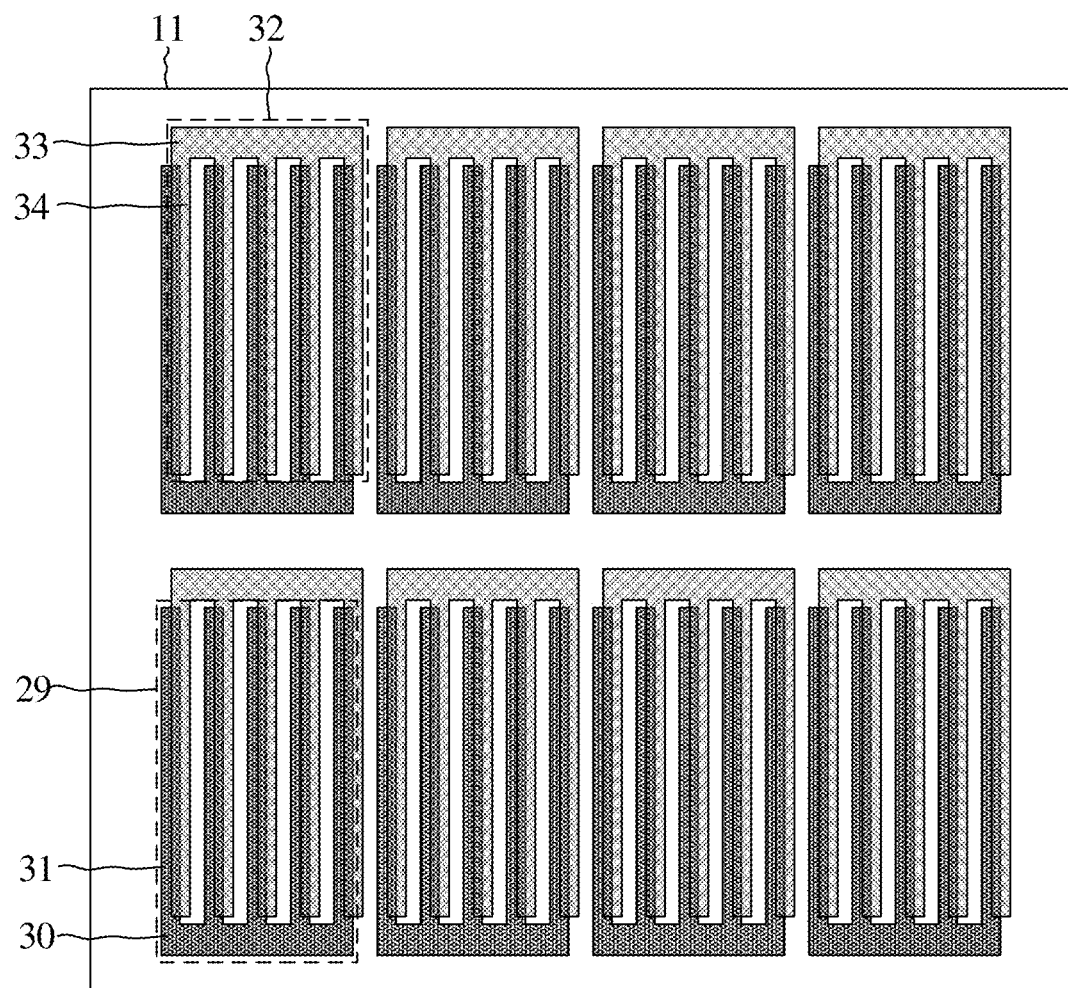
FIG. 32 is a top view of the first electrode and the second electrode corresponding to FIG. 31 according to an embodiment of the present disclosure.

FIG. 31 is a schematic diagram of a light-adjusting component 3 according to another embodiment of the present disclosure, and FIG. 32 is a top view of the first electrode 8 and the second electrode 10 corresponding to FIG. 31 according to an embodiment of the present disclosure, the first electrode 8 includes at least one first sub-electrode 29. In another embodiment, as shown in FIGS. 31 and 32, the first sub-electrode 29 includes a first main electrode strip 30 and a plurality of first toothed electrode strips 31 that is connected to the first main electrode strip 30 and parallel to each other. The second electrode 10 includes at least one second sub-electrode 32. The second sub-electrode 32 includes a second main electrode strip 33 and a plurality of second toothed electrode strips 34 that is connected to the second main electrode strip 33 and parallel to each other. Referring to FIG. 31 and FIG. 32 again, the first electrode 8 at least partially overlaps with the second electrode 10 in a direction perpendicular to a plane of the display module. At this time, the first electrode 8 and the second electrode 10 each are a grid electrode. By making the first electrode 8 at least partially overlap with the second electrode 10, the area of the first electrode 8 facing toward the second electrode 10 can be increased, thereby forming a stronger and more uniform vertical electric field, and improving the rotation accuracy of the first liquid crystal 9.

Figure 33:
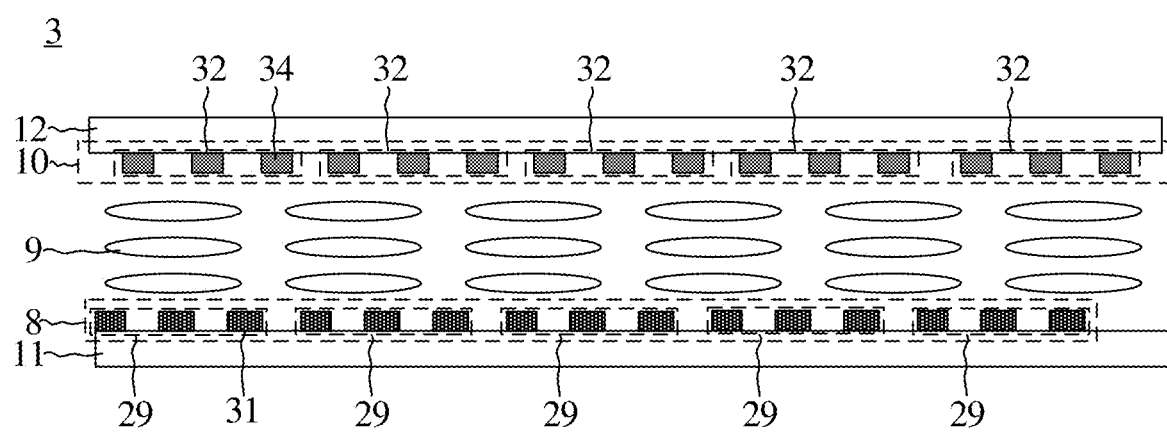
FIG. 33 is a schematic diagram of a light-adjusting component according to another embodiment of the present disclosure.
Figure 34:
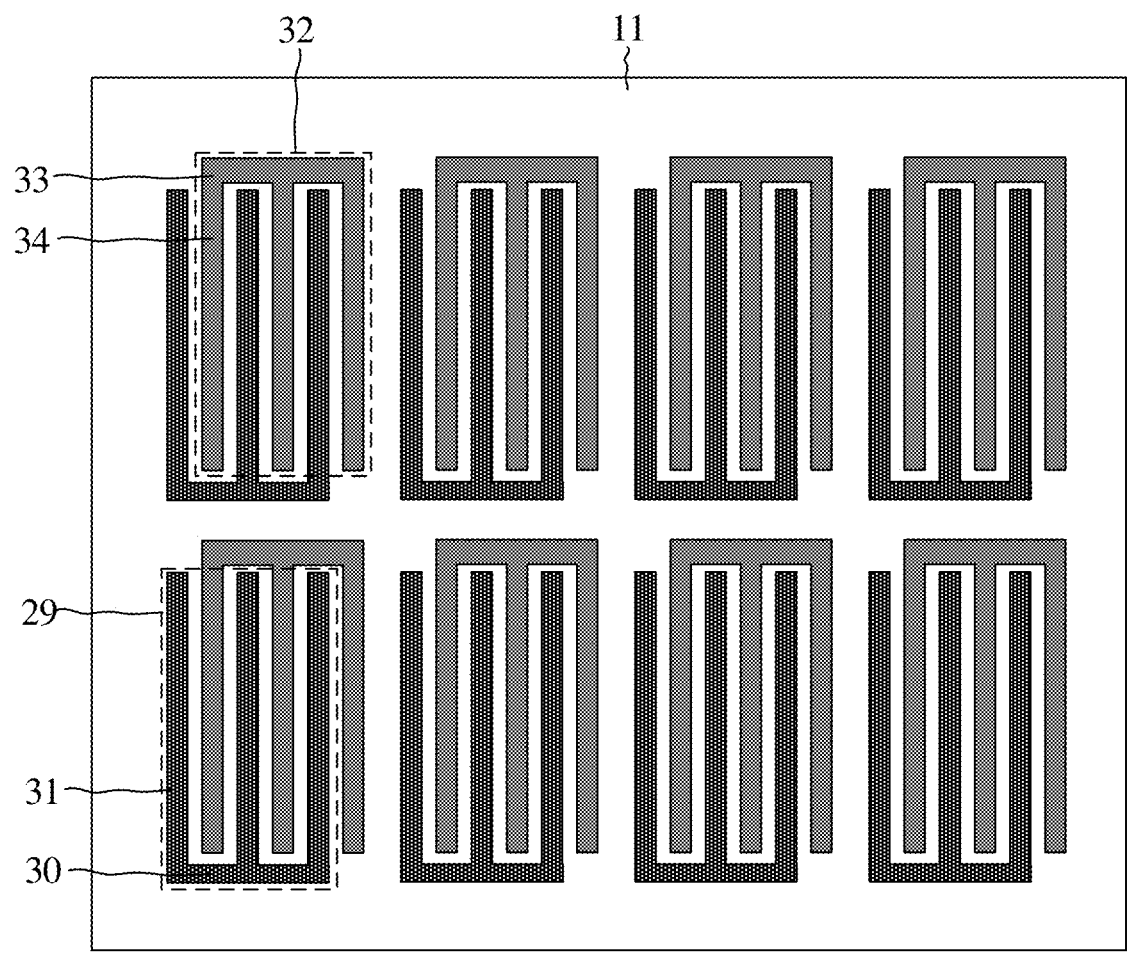
FIG. 34 is a top view of the first electrode and the second electrode corresponding to FIG. 33 according to an embodiment of the present disclosure.
Figure 35:
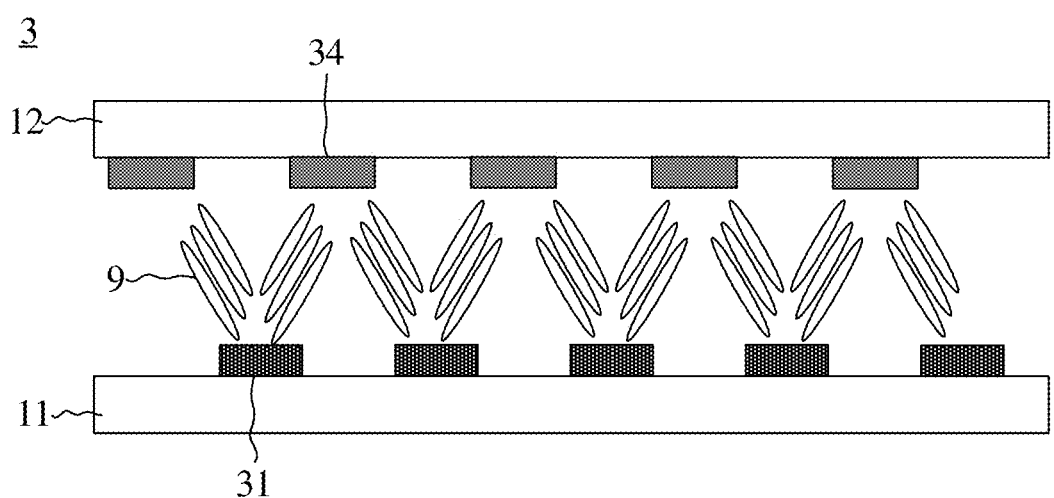
FIG. 35 is a schematic diagram showing rotation of a first liquid crystal when the first electrode and the second electrode corresponding to FIG. 33 are energized according to an embodiment of the present disclosure.

FIG. 33 is a schematic diagram of a light-adjusting component 3 according to another embodiment of the present disclosure, FIG. 34 is a top view of the first electrode 8 and the second electrode 10 corresponding to FIG. 33 according to an embodiment of the present disclosure, and FIG. 35 is a schematic diagram showing rotation of a first liquid crystal 9 when the first electrode 9 and the second electrode 10 corresponding to FIG. 33 are energized according to an embodiment of the present disclosure. As shown in FIG. 33 to FIG. 35, in a direction perpendicular to a plane of the display module, the plurality of toothed electrode strips 31 of the first electrode 8 is engaged with the plurality of second toothed electrode strips 34 of the second electrode 10, so that the toothed electrode strips of the first electrode 8 are staggered with the toothed electrode strips of the second electrode 10, thereby improving the light emission rate of the display module.

It should be understood that, in combination with FIG. 25, based on the pointing direction 0° of the X-axis of the first quadrant in the coordinate quadrant as a baseline, referring to FIG. 32 and FIG. 34 again, the first toothed electrode strip 31 and the second toothed electrode strip 34 have an extending direction of 90° or 270°, so that the formed electric field and the anti-peeping direction are matched with each other, thereby achieving anti-peeping at left and right viewing angles. In some embodiments of the present disclosure, the alignment direction of the alignment film can be 0° or 180°, and the extending direction of the first toothed electrode strip 31 and the second toothed electrode strip 34 can be 0° or 180°, thereby achieving the better anti-peeping at upper and lower viewing angles.

In an embodiment of the present disclosure, in order to reduce the light shielding by the first electrode 8 and the second electrode 10, the first electrode 8 and the second electrode 10 each are a transparent electrode. Exemplarily, the first electrode 8 and the second electrode 10 are respectively formed of a light-transmitting conductive material such as indium tin oxide (ITO).

Figure 36:
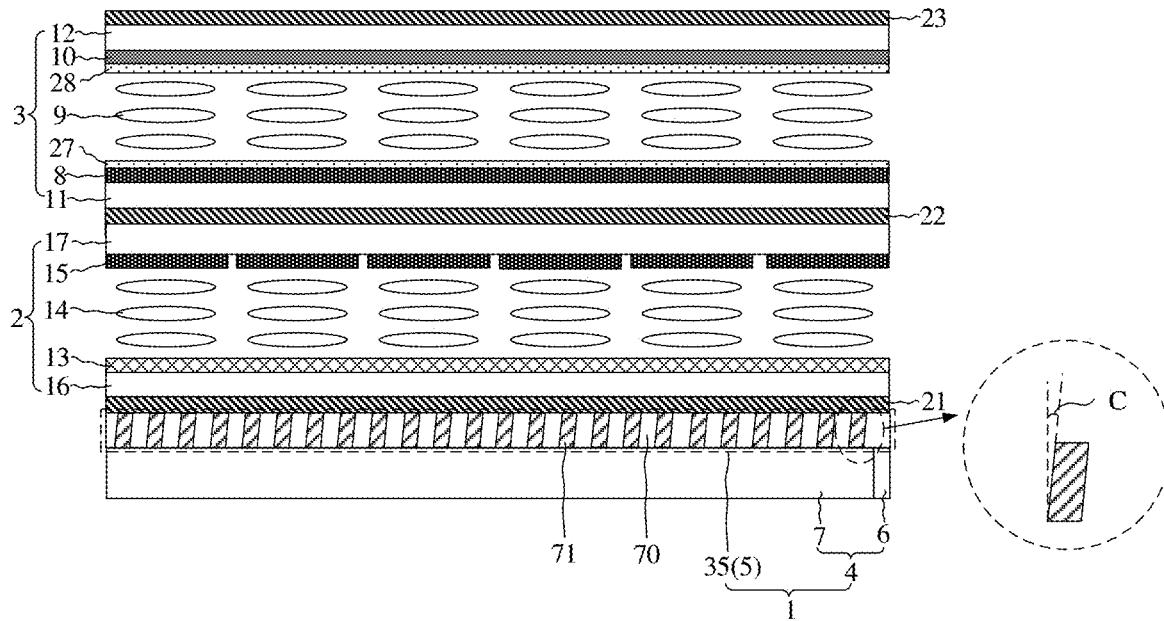
FIG. 36 is a schematic diagram of a light regulating structure according to another embodiment of the present disclosure.

FIG. 36 is a schematic diagram of a light regulating structure 5 according to another embodiment of the present disclosure. In an embodiment of the present disclosure, as shown in FIG. 36, the light regulating structure 5 includes a grating 35. The grating 35 includes transparent portions 70 and non-transparent portions 71 that are alternately arranged, an angle C formed between the non-transparent portion 71 and the normal line satisfies $5° \leq C \leq 10°$, and the normal line is perpendicular to a plane of the display module.

With such configuration, the grating 35 can use the transparent portion 70 and non-transparent portion 71 to adjust the transmission angle of the light emitted from the first light guide plate 7, and convert at least part of light into collimating light transmitted in a specific direction. By further setting the non-transparent portion 71 to be an inclined structure, the non-transparent portion 71 is deviated from the normal direction by 5° to 10°. After the grating 35 corrects the transmission direction of the light emitted from the first light guide plate 7, at least part of light is also transmitted in a direction oblique to the normal direction. Taking the application of display modules in the field of on-board display as an example, when an on-board display screen displays an entertainment image, in order to ensure driving safety, it is hoped to reduce the interference of the displayed screen to the driver. At this time, by inclining the non-transparent part 71 toward the front passenger seat by 5° to 10°, the light emitted from the on-board display screen can tend to be transmitted toward the front passenger seat, thereby reducing the amount of light transmitted toward the main driver seat. Therefore, by matching the light-adjusting component, the luminance of the light under the oblique viewing angle in a direction of the main driver seat is reduced to a greater extent, so that the anti-peeping effect in the main driver seat is further improved.

In some embodiments of the present disclosure, the light regulating structure 5 can also be a structure such as a light control film that can adjust the transmission direction of light. Exemplarily, the light control film is provided with a microstructure. The microstructure is configured to regulate the transmission direction of light.

Figure 37:
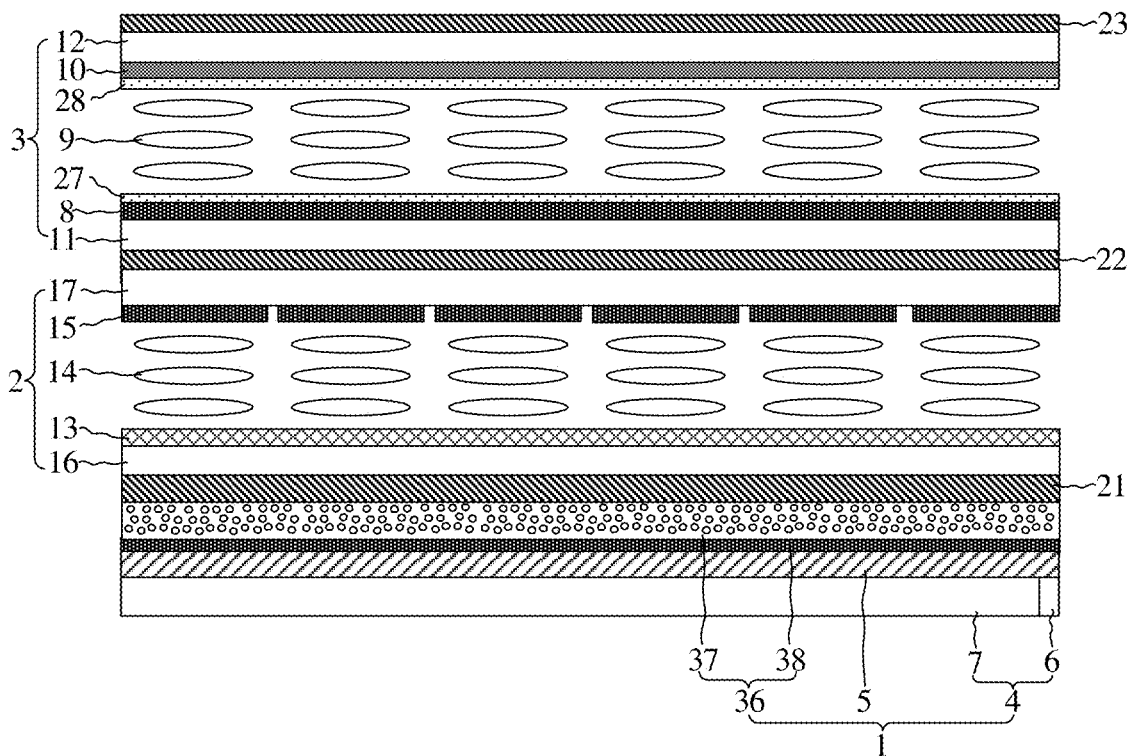
FIG. 37 is a schematic diagram of a backlight component according to an embodiment of the present disclosure.

FIG. 37 is a schematic diagram of a backlight component according to an embodiment of the present disclosure. In an embodiment, as shown in FIG. 37, the backlight component 1 includes a polymer liquid crystal film 36 located on a side of the light regulating structure 5 facing away from the first light guide plate 7. The polymer liquid crystal film 36 includes a polymer liquid crystal film 37 and an electrode layer 38 located on at least one side of the polymer liquid crystal film 37.

In an embodiment of the present disclosure, the polymer liquid crystal film 37 includes a polymer and liquid crystal droplets uniformly dispersed in the polymer. When the display module is in the sharing mode, the electrode layer 38 is not energized, so that the liquid crystal droplets are arranged irregularly. At this time, the refractive index of the liquid crystal droplets does not match with the refractive index of the polymer, and the polymer liquid crystal film 37 is in a foggy state, so that the range of the light transmission angle is increased, thereby achieving a larger viewing angle. At this time, the luminous power of the first light source 6 can be increased to increase the final luminance of the backlight component 1. When the display module is in the anti-peeping mode, the electrode layer 38 is energized, and the electric field formed by the electrode layer 38 drives the optical axis of the liquid crystal droplet to rotate along the direction of the electric field. At this time, the refractive index of the liquid crystal droplet matches with the refractive index of the polymer, and the polymer liquid crystal film 37 is in a transparent state, so that the polymer liquid crystal film 37 no longer has a scattering effect for light. The light emitted from the light regulating structure 5 does not change the transmission direction when it is emitted through the polymer liquid crystal film 37, which is more conducive to achieving a narrow viewing angle. It can be seen that, in the embodiments of the present disclosure, the light-adjusting component 3 can further cooperate with the polymer liquid crystal film 36 while having an anti-peep effect, thereby achieving a better effect.

It should be understood that, in the embodiments of the present disclosure, the backlight component 1 further includes a first flexible circuit board. The pins of the first flexible circuit board are bound to the electrode layer 38. The first flexible circuit board is configured to transmit a voltage signal to the electrode layer 38. The voltage signal is used to drive the rotation of the liquid crystal droplets to rotate. In an embodiment, the backlight component 1 includes a second flexible circuit board. The pins of the second flexible circuit board are bound to the power lead-out line or power lead-out terminal of the first light source 6. The second flexible circuit board is configured to transmit a power signal to the first light source 6 to control the first light source 6 to turn on.

Figure 38:
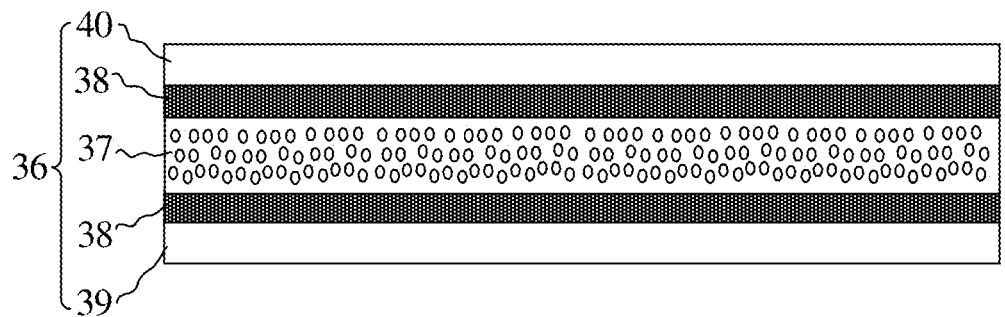
FIG. 38 is a schematic diagram of a polymer liquid crystal film according to an embodiment of the present disclosure.
Figure 39:
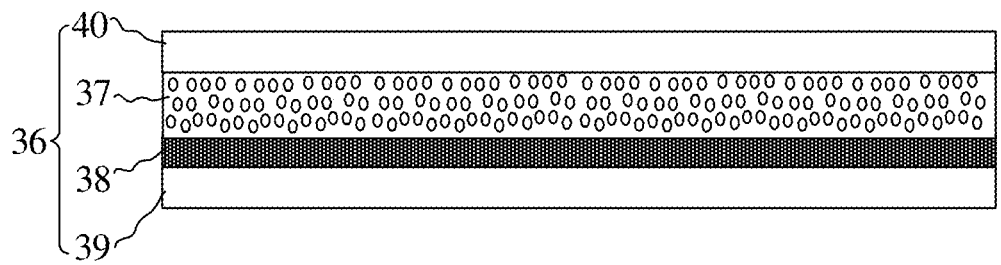
FIG. 39 is a schematic diagram of a polymer liquid crystal film according to another embodiment of the present disclosure.
Figure 40:
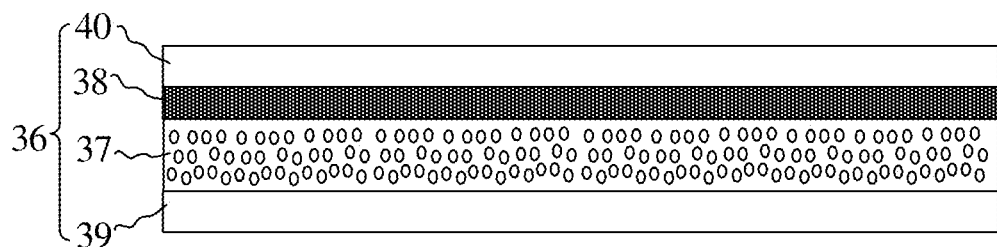
FIG. 40 is a schematic diagram of a polymer liquid crystal film according to another embodiment of the present disclosure.

FIG. 38 is a schematic diagram of a polymer liquid crystal film 36 according to an embodiment of the present disclosure, FIG. 39 is a schematic diagram of a polymer liquid crystal film 36 according to another embodiment of the present disclosure, and FIG. 40 is a schematic diagram of a polymer liquid crystal film 36 according to another embodiment of the present disclosure. As shown in FIG. 38 to FIG. 40, the polymer liquid crystal film 36 can include a first base 39 and a second base 40. The polymer liquid crystal film 37 is located between the first base 39 and the second base 40. The electrode layer 38 is located between the first base 39 and the polymer liquid crystal film 37, and/or, located between the second base 40 and the polymer liquid crystal film 37. Exemplarily, referring to FIG. 38 again, the electrode layer 38 is located between the first base 39 and the polymer liquid crystal film 37, and located between the second base 40 and the polymer liquid crystal film 37. In an embodiment, referring to FIG. 39 again, the electrode layer 38 is located between the first base 39 and the polymer liquid crystal film 37. In an embodiment, referring to FIG. 40 again, the electrode layer 38 is located between the second base 40 and the polymer liquid crystal film 37.

It should be understood that the first base 39 and the second base 40 can be formed of transparent materials, such as polyethylene terephthalate (PET). By providing the first base 39 and the second base 40, in the manufacturing process of the polymer liquid crystal film 36, the electrode layer 38 can be formed on the first base 39 and/or the second base 40 instead of directly forming on the polymer liquid crystal film 37, so that the manufacturing process of the electrode layer 38 does not affect the structural characteristics of the polymer liquid crystal film 37, thereby improving its reliability.

Figure 41:
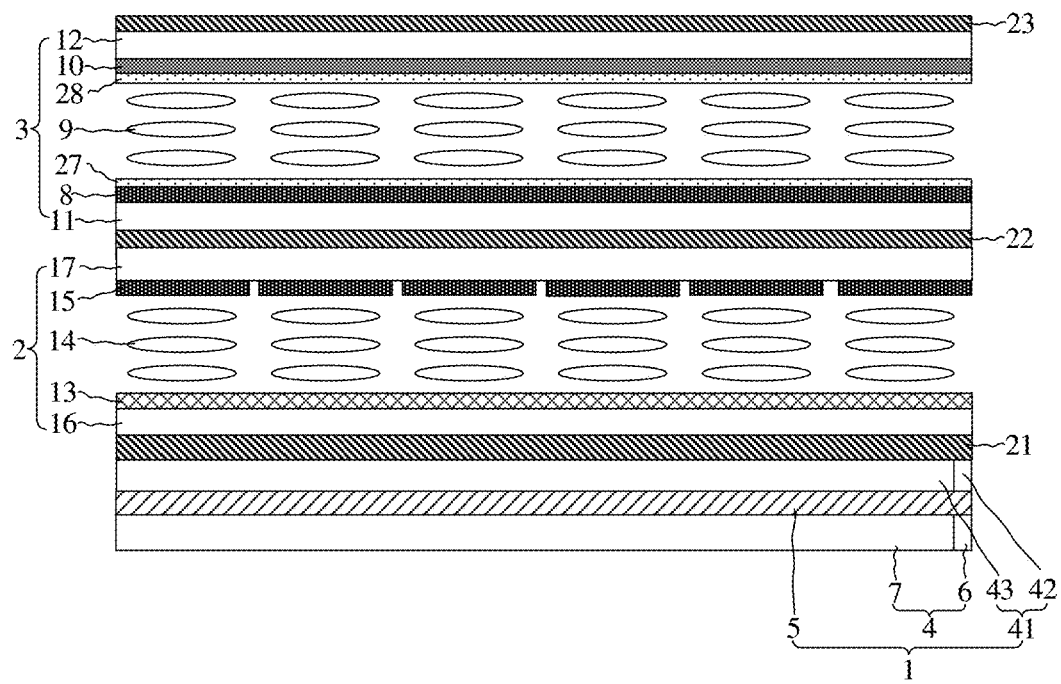
FIG. 41 is a schematic diagram of a backlight component according to another embodiment of the present disclosure.

FIG. 41 is a schematic diagram of a backlight component 1 according to another embodiment of the present disclosure. In an embodiment, as shown in FIG. 41, the backlight component 1 includes a second light guide structure 41. The second light guide structure 41 includes a second light source 42 and a second light guide plate 43. The second light source 42 is side-emitting light as shown in FIG. 41. The second light guide plate 43 is located on a side of the light regulating structure 5 facing away from the first light guide plate 7. In the sharing mode, the second light source 42 is turned on. In the anti-peeping mode, the second light source 42 is turned off.

In an embodiment of the present disclosure, in the sharing mode, the second light source 42 is turned on, and the light emitted by the second light source 42 is emitted through the top of the second light guide plate 43 to form an area light source having a large range. In the anti-peeping mode, the second light source 42 is turned off, only the light emitted from the first light guide plate 7 is used as the light for displaying. The light for displaying first passes through the light regulating structure 5 to regulate the transmission direction of the light, so that the light is transmitted in a specific direction, and then the light-adjusting component 3 is used to re-regulate the light to directionally control the light-emitting angle, thereby reducing the light output amount under the oblique viewing angle, and achieving low luminance under the oblique viewing angle.

Figure 42:
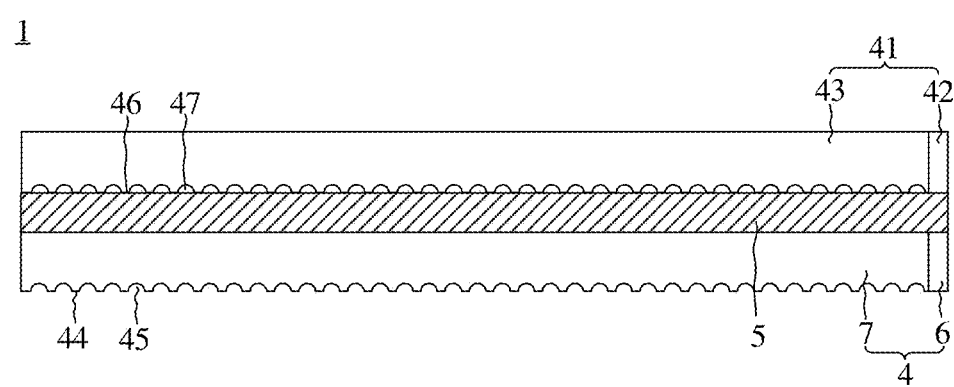
FIG. 42 is a schematic diagram of a backlight component according to another embodiment of the present disclosure.
Figure 43:
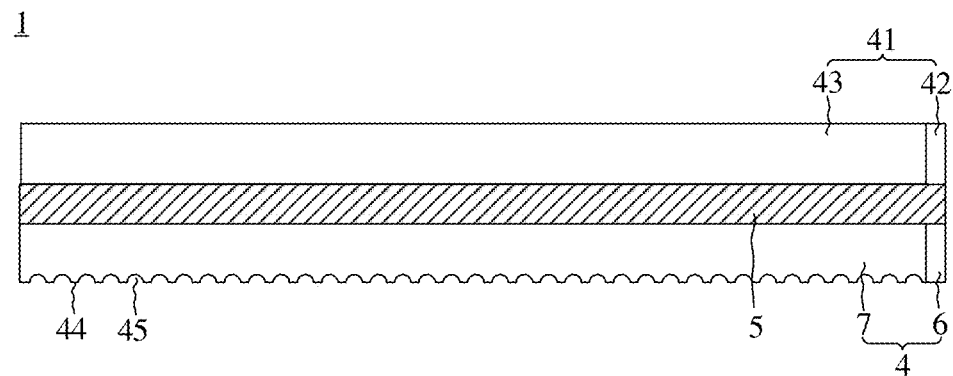
FIG. 43 is a schematic diagram of a backlight component according to another embodiment of the present disclosure.
Figure 44:
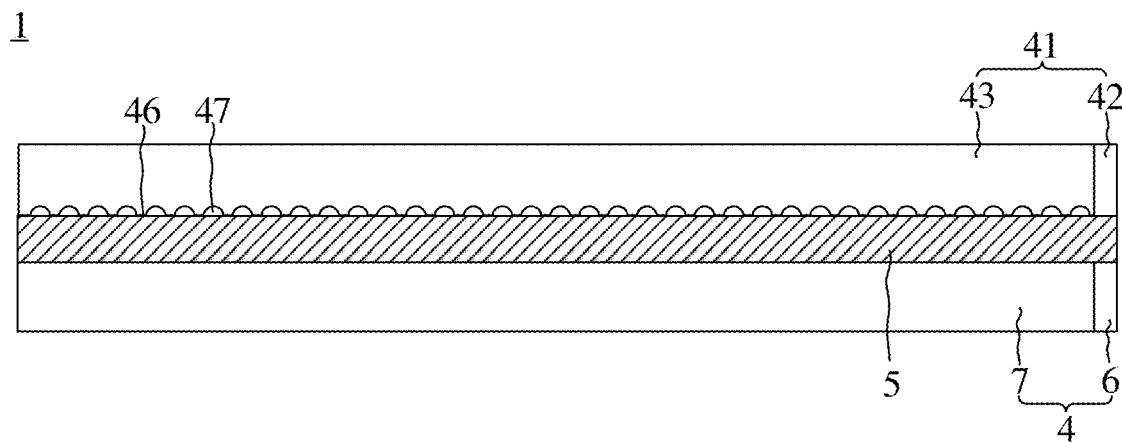
FIG. 44 is a schematic diagram of a backlight component according to another embodiment of the present disclosure.

FIG. 42 is a schematic diagram of a backlight component 1 according to another embodiment of the present disclosure, FIG. 43 is a schematic diagram of a backlight component 1 according to another embodiment of the present disclosure, and FIG. 44 is a schematic diagram of a backlight component 1 according to another embodiment of the present disclosure. In an embodiment, as shown in FIGS. 42 to 44, a surface of the first light guide plate 7 facing away from the display component 2 is a first bottom surface 44 having a plurality of first microstructure 45, and the first microstructure 45 is recessed toward the display component 2, and/or, a surface of the second light guide plate 43 facing away from the display component 2 is a second bottom surface 46 including a plurality of second microstructures 47, and the second microstructure 47 is recessed toward the display component 2.

Exemplarily, referring to FIG. 42 again, the first light guide plate 7 is provided with the first microstructure 45. Meanwhile, the second light guide plate 43 is provided with a second microstructure 47. In an embodiment, referring to FIG. 43 again, only the first light guide plate 7 is provided with the first microstructure 45. In an embodiment, referring to FIG. 44 again, only the second light guide plate 43 is provided with the second microstructure 47.

It should be understood that the light guide plate is mainly an optical grade acrylic sheet or polycarbonate (PC) sheet. The above microstructure can be formed by laser engraving, V-shaped cross grid engraving, or ultraviolet (UV) screen printing. By arranging microstructures on the light guide plate, the light emitted by the light source can be reflected on each microstructure when it is transmitted in the light guide plate. The reflected light will diffuse toward various angles, and then be emitted through the top of the light guide plate. Reflecting light by the microstructure can increase a light output angle range, so that the light distribution in the light guide plate is more uniform, thereby achieving a larger light output viewing angle range of the display module.

Figure 45:
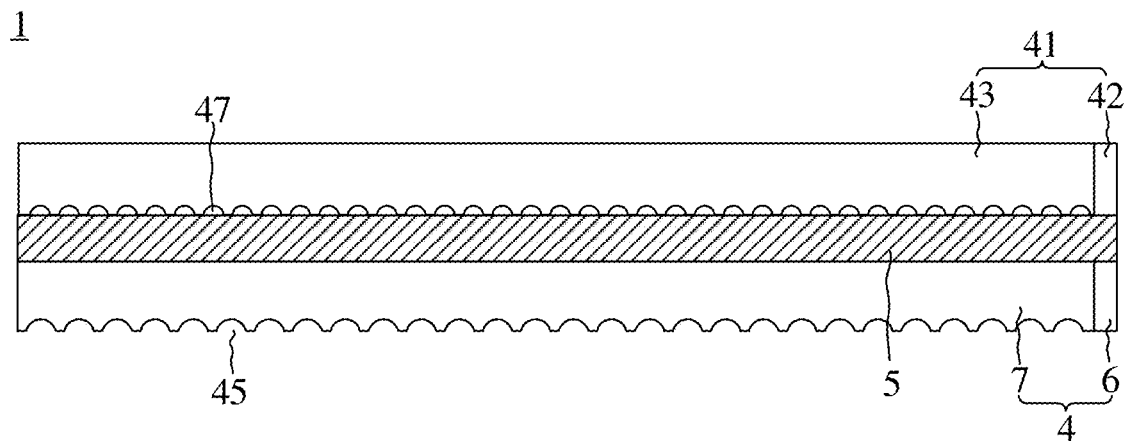
FIG. 45 is a schematic diagram showing comparison of sizes of microstructures according to an embodiment of the present disclosure.

FIG. 45 is a schematic diagram showing comparison of sizes of microstructures according to an embodiment of the present disclosure. Furthermore, as shown in FIG. 45, a size of the second microstructure 47 is smaller than a size of the first microstructure 45.

Since the second light guide plate 43 is located at a side of the first light guide plate 7 close to the display component 2, when the second light source 42 is turned on, the light emitted through the second light guide plate 43 can directly incident to the display component 2. If the size of the second microstructure 47 is excessively large, there will be many obvious bright spots on the second light guide plate 43, which are difficult to convert into divergent area light sources. Therefore, in the embodiments of the present disclosure, the size of the second microstructure 47 is set to be smaller than the size of the first microstructure 45, for example, the size of the first microstructure 45 is set to be a millimeter level, and the size of the second microstructure 47 is set to a nanometer level. In this way, there are no obvious bright spots in the second light guide plate 43, the second light guide plate 43 can more easily convert light into divergent area light sources, thereby improving the light output effect.

Figure 46:
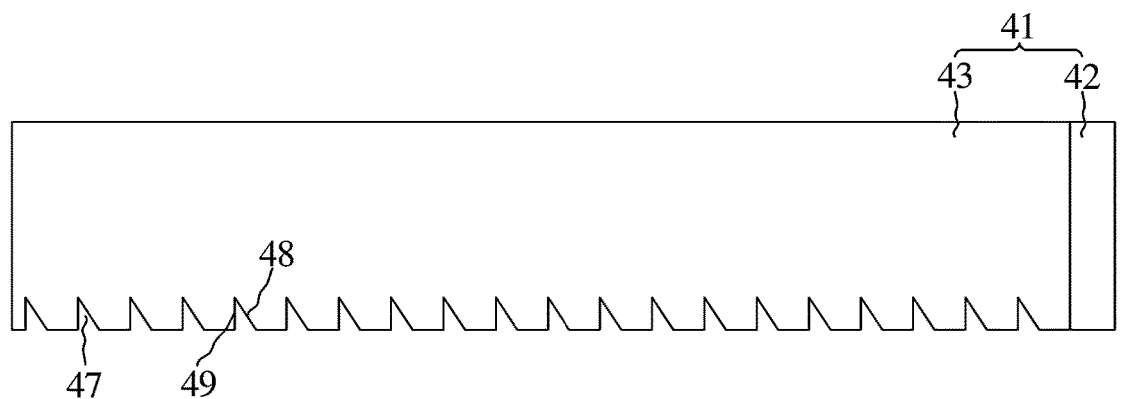
FIG. 46 is a schematic diagram of a second microstructure according to an embodiment of the present disclosure.
Figure 47:
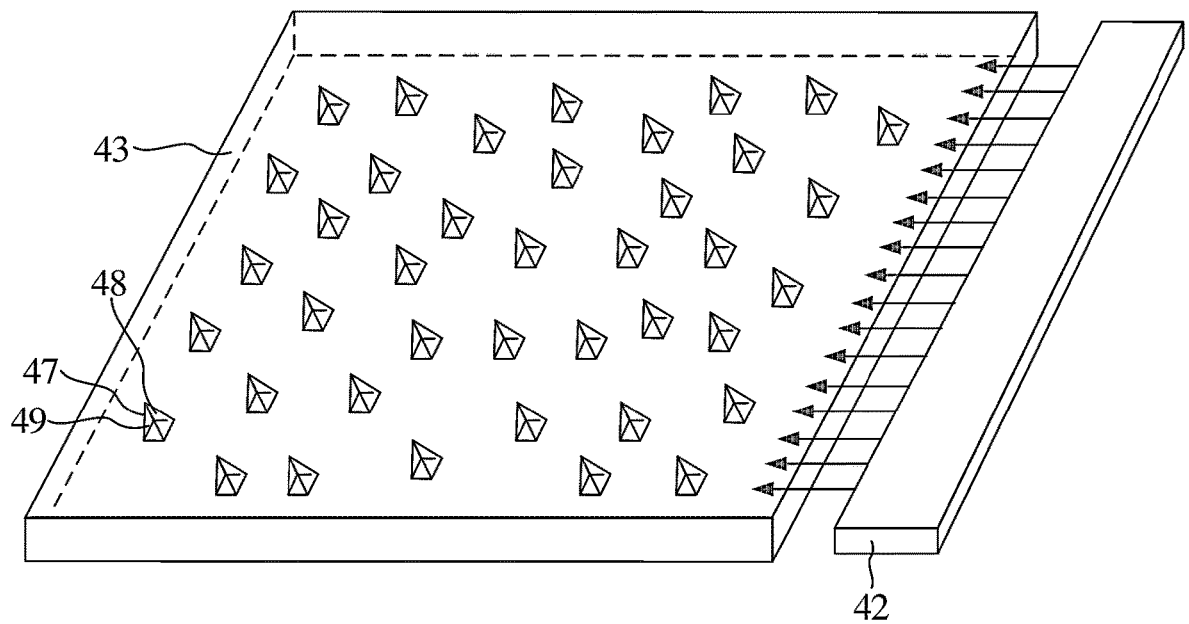
FIG. 47 is a top view of a second light guide plate according to an embodiment of the present disclosure.
Figure 48:
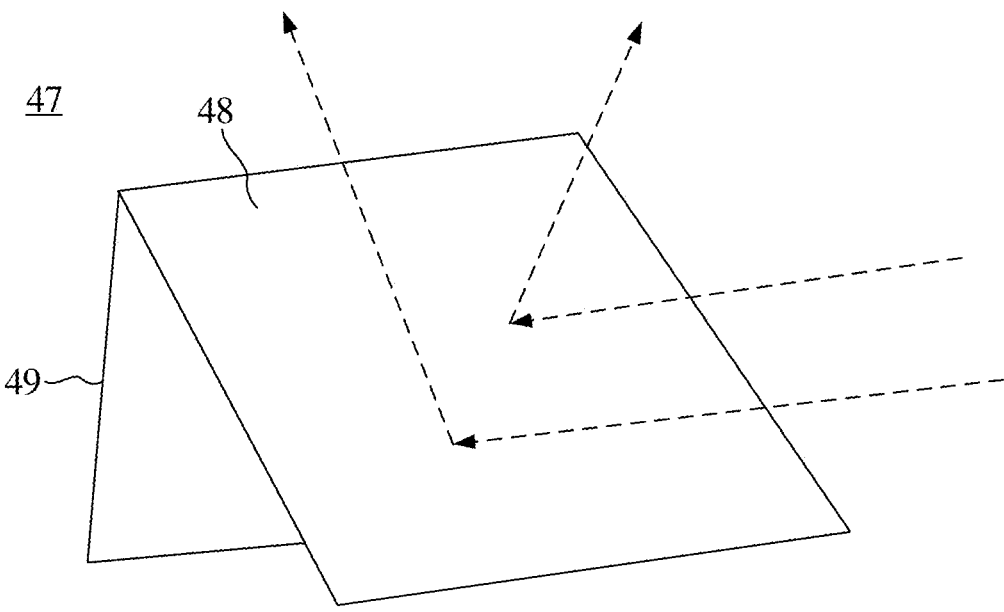
FIG. 48 is a light transmission diagram according to another embodiment of the present disclosure.

FIG. 46 is a schematic diagram of a second microstructure according to an embodiment of the present disclosure, FIG. 47 is a top view of a second light guide plate according to an embodiment of the present disclosure, and FIG. 48 is a light transmission diagram according to another embodiment of the present disclosure. In an embodiment, as shown in FIG. 46 to FIG. 48, the second light source 42 is located on a side surface of the second light guide plate 43, that is, the second light source 42 emits light from a side. The second microstructure 47 has a first surface 48 and a second surface 49. The slope of the first surface 48 is smaller than the slope of the second surface 49. The first surface 48 is located on a side of the second surface 49 close to the second light source 42. In an embodiment of the present disclosure, the second surface 49 is a vertical surface and the first surface 48 is an inclination surface. Alternatively, in another feasible embodiment, the first surface 48 and the second surface 49 each are inclination surfaces, but the inclination angle of the first face 48 is larger. It should be noted that the slope and the inclination angle each refer to an angle relative to the normal line perpendicular to a plane of the display module. With such configuration, the first surface 48 of the second microstructure 47 that is closer to the second light source 42 is an inclination surface, and the light emitted by the second light source 42 is transmitted to the first surface 48 of the second microstructure 47 after being reflected by the first surface 48, the transmission angle of the reflected light is more divergent, thereby increasing the viewing angle range in the sharing mode.

Since the inclined first surface 48 of the second microstructure 47 faces the second light source 42, the second microstructure 47 of such a structure can significantly regulate the light path of the side light emitted by the second light source 42. However, such a second microstructure 47 has little effect on the light path of the light incident from the bottom. The size of the second microstructure 47 is very small. Therefore, in the anti-peeping mode, when the light emitted from the first light guide plate 7 emits through the second light guide plate 43, the second light guide plate 43 hardly diverges the light emitted from the first light guide plate 7.

It should be understood that the backlight component 1 can include a third flexible circuit board, and the pins of the third flexible circuit board are bound to the power lead-out line or power lead-out terminal of the second light source 42, and the second flexible circuit board is configured to transmit a power signal to the second light source 42 so as to control the second light source 42 to turn on.

In the sharing mode, the first light source 6 is turned on, that is, when the display module is in the sharing mode, the first light source 6 and the second light source 42 are turned on at the same time, so that the amount of light emitted by the backlight component 1 is effectively increased, and the luminance of the display module is improved, thereby optimizing the display effect.

Figure 49:
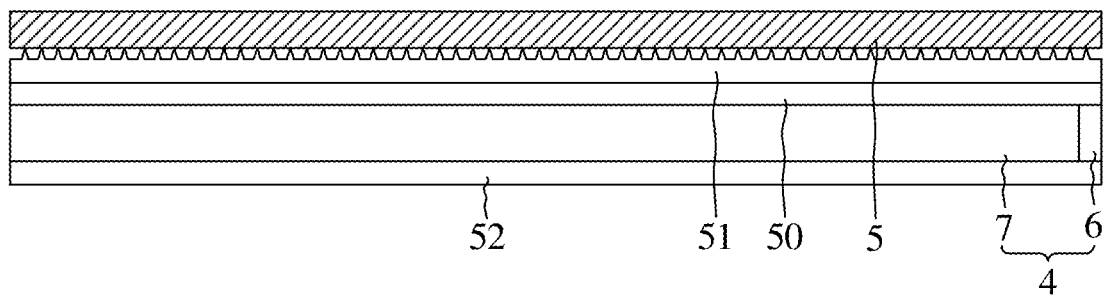
FIG. 49 is a schematic diagram of a backlight component according to an embodiment of the present disclosure.

FIG. 49 is a schematic diagram of a backlight component according to an embodiment of the present disclosure. In an embodiment, as shown in FIG. 49, the backlight component 1 includes at least one of a diffusion sheet 50, a prism sheet 51, or a reflective sheet 52. The diffusion sheet 50 is located between the first light guide plate 7 and the light regulating structure 5. The prism sheet 51 is located between the first light guide plate 7 and the light regulating structure 5, e.g., the prism sheet 51 can be located on a side of the diffusion sheet 50 facing away from the first light guide plate 7. The reflective sheet 52 is located on a side of the first light guide plate 7 facing away from the display component 2.

In an embodiment of the present disclosure, the light emitted from the first light guide plate 7 is incident to the prism sheet 51 after diverging through the diffusion sheet 50, and then is converged by the prism sheet 51 to achieve a brightening effect. The reflective sheet 52 is located on a side of the first light guide plate 7 facing away from the display component 2, so that the reflective sheet 52 can reflect the light emitted from the bottom of the first light guide plate 7 back, thereby improving the light utilization rate and the luminance of the light.

Figure 50:
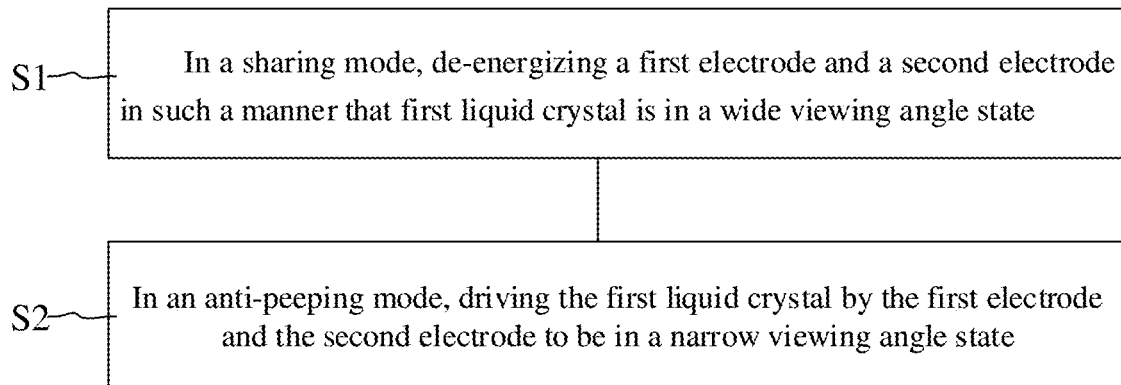
FIG. 50 is a flowchart showing a method for driving a display module according to an embodiment of the present disclosure.

Based on the same inventive concept, the present disclosure provides a method for driving a display module, which is applied to the above display modules. With reference to FIG. 1 and FIG. 2, the display module has a sharing mode and an anti-peeping mode. FIG. 50 is a flowchart showing a method for driving a display module according to an embodiment of the present disclosure. As shown in FIG. 50, the method includes following steps.

At step S1, in the sharing mode, the first electrode 8 and the second electrode 10 are not energized, and the first liquid crystal 9 is in a wide viewing angle state.

At step S2, in the anti-peeping mode, the first electrode 8 and the second electrode 10 drive the first liquid crystal 9 to be in a narrow viewing angle state.

Combining the analysis of the above embodiments, with the method for driving the display module according to the present disclosure, the display module can achieve the viewing angle switching between the sharing mode and the anti-peeping mode. When a user is in an environment without requiring privacy protection, the display module can be controlled to be at the sharing mode to allow the user to enjoy a large viewing angle of the viewing experience. When the user is in an environment requiring anti-peeping, the display module can be controlled to be in the anti-peeping mode to achieve an anti-peeping effect in which it is invisible when observing under an oblique viewing angle, thereby effectively protecting the user's privacy from being leaked.

Figure 51:
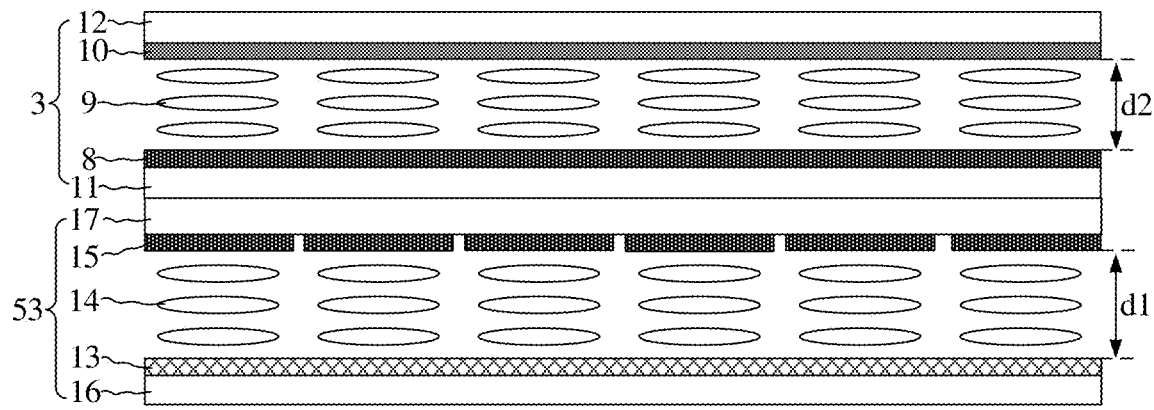
FIG. 51 is a schematic diagram of a display module in a sharing mode according to another embodiment of the present disclosure.
Figure 52:
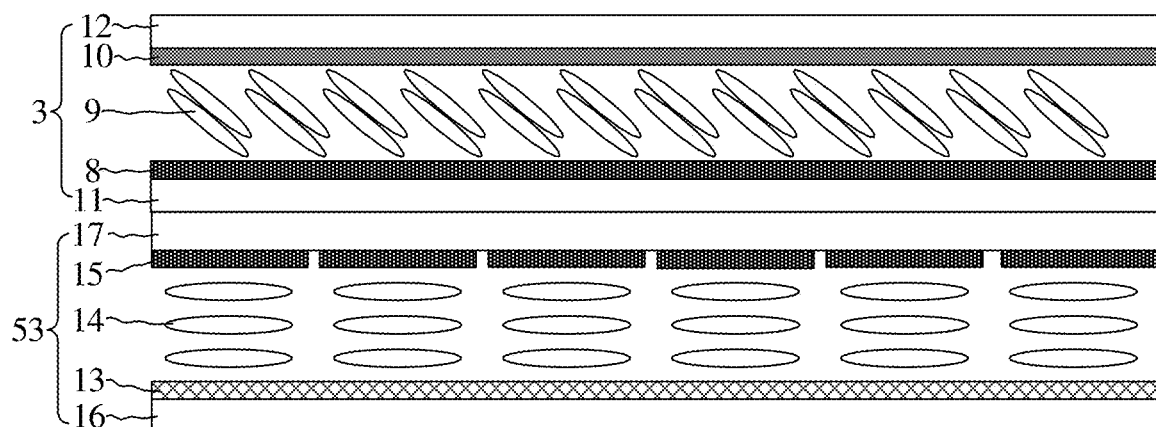
FIG. 52 is a schematic diagram of a display module in an anti-peeping mode according to another embodiment of the present disclosure.

The present disclosure provides another display module. FIG. 51 is a schematic diagram of a display module in a sharing mode according to another embodiment of the present disclosure, and FIG. 52 is a schematic diagram of a display module in an anti-peeping mode according to another embodiment of the present disclosure. As shown in FIG. 51 and FIG. 52, the display module includes a liquid crystal display component 53 and a light-adjusting component 3. The light-adjusting component 3 is located at a side of the liquid crystal display component 53 facing toward the light-emitting direction of the display module. The light-adjusting component 3 includes a first electrode 8, a first liquid crystal 9 located at a side of the first electrode 8 facing away from the liquid crystal display component 53, and a second electrode 10 located at a side of the first liquid crystal 9 facing away from the display component 2.

The display module has a sharing mode and an anti-peeping mode. In the sharing mode, the first electrode 8 and the second electrode 10 are not energized, and the first liquid crystal 9 is in a wide viewing angle state. In the anti-peeping mode, the first electrode 8 and the second electrode 10 drive the first liquid crystal 9 to be in a narrow viewing angle state, and $V=5.095-1.479\times((\ln(\Delta\varepsilon)-\ln(d1)+1))$ is satisfied, where V denotes a difference between a voltage of the first electrode 8 and a voltage of the second electrode 10, $\Delta\varepsilon$ denotes a difference between a dielectric constant $\sigma//$ and a dielectric constant $\varepsilon\perp$, and d1 denotes a cell gap of the first liquid crystal 9 in a direction perpendicular to the plane of the display module.

When the display module performs image display, the light emitted from the liquid crystal display component 53 is further incident to the light-adjusting component 3.

Referring to FIG. 51 again, when the display module is in the sharing mode, the first electrode 8 and the second electrode 10 in the light-adjusting component 3 are not energized, and no electric field is formed between the first electrode 8 and the second electrode 10, so that the first liquid crystal 9 is in a wide viewing angle state. In the wide viewing angle state, the first liquid crystal 9 does not have an optical effect on the light transmitted in various viewing angle directions, and the light in the front viewing angle direction and the light in the oblique viewing angle direction can be emitted from the display module, and a high luminance can be achieved at the front viewing angle and at the oblique viewing angle, so that the display module has a wide viewing angle range.

Referring to FIG. 52 again, when the display module is in the anti-peeping mode, the first electrode 8 and the second electrode 10 in the light-adjusting component 3 are energized, and an electric field is formed between the first electrode 8 and the second electrode 10, so that the liquid crystal 9 is rotated under the action of the electric field and is in a narrow viewing angle state. In this narrow viewing angle state, the first liquid crystal 9 has an optical effect on the light in the oblique viewing angle direction, and changes the polarization state of the light in the oblique viewing angle direction, so that most of the light in the oblique viewing angle direction cannot be emitted from the display module, thereby reducing the luminance at the oblique viewing angle, and achieving the anti-peeping effect in which it is invisible under the oblique viewing angle. In the anti-peeping mode, high luminance is achieved under the front viewing angle while low luminance is obtained under the left and right oblique viewing angles, so that the display module has a narrow viewing angle range.

It can be seen that the viewing angle switching between the sharing mode and the anti-peeping mode can be achieved by setting the light-adjusting component 3 and using the principle of liquid crystal birefringence to directionally control the light-emitting angle. When anti-peeping is not required, the display module is controlled to be in the sharing mode, so that the user can enjoy the viewing experience with a large viewing angle. When anti-peeping is required, the display module is controlled to be in the anti-peeping mode to achieve an invisible anti-peeping effect when observing under an oblique viewing angle, thereby effectively protecting user privacy from being leaked.

In order to use the light-adjusting component 3 to achieve a better anti-peeping effect, several sets of data tests under the conditions of different parameters V and d1 are conducted. The test data is shown in Table 4 above and is based on the fitting formula between the parameter V and the parameter d1. In this way, when designing the structure of the display module, no matter what cell gap the first liquid crystal 9 has, a voltage difference matching the cell gap can be obtained according to the formula, so that the first liquid crystal 9 is driven by the electrical field formed by the voltage difference to rotate to the angle required by the anti-peeping mode, thereby achieving a better anti-peeping effect.

It should be noted that, referring to FIG. 51 and FIG. 52 again, the light-adjusting component 3 can include a first substrate 11 and a second substrate 12 that are opposite to each other. The first electrode 8 is located at a side of the first substrate 11 facing toward the second substrate 12. The second electrode 10 is located at a side of the second substrate 12 facing toward the first substrate 11. The liquid crystal display component 53 includes a third electrode 13, a second liquid crystal 14 and a fourth electrode 15. The second liquid crystal 14 is located between the third electrode 13 and the fourth electrode 15, or, located at a side of the third electrode 13 and the fourth electrode 15 facing toward the viewing angle dimming member 3. FIG. 51 schematically shows that the second liquid crystal 14 is located between the third electrode 13 and the fourth electrode 15. In addition, the liquid crystal display component 53 further includes a third substrate 16 and a fourth substrate 17 that are opposite to each other. The fourth substrate 17 is located at a side of the third substrate 16 close to the first substrate 11.

Figure 53:
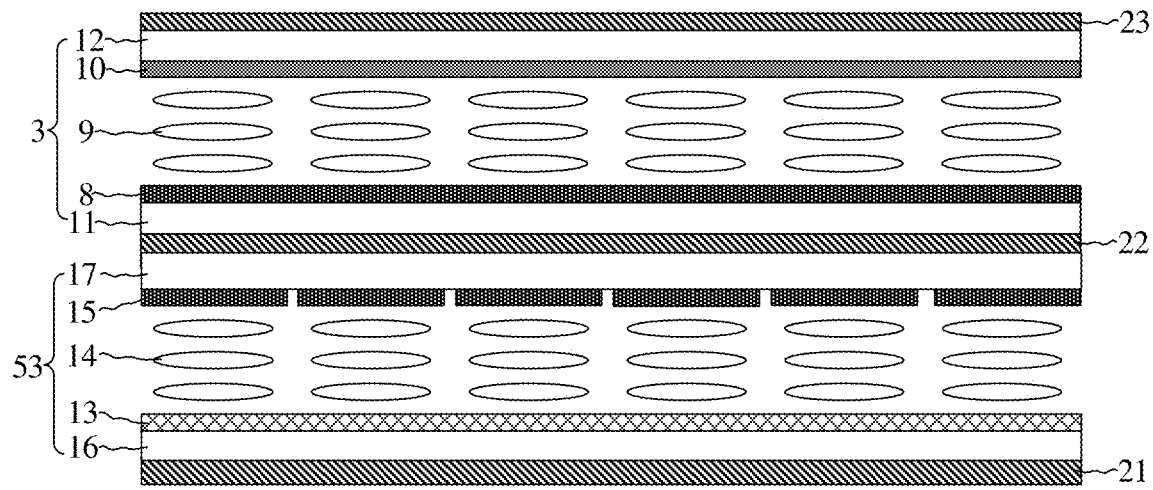
FIG. 53 is a schematic diagram of a display module according to another embodiment of the present disclosure.

FIG. 53 is a schematic diagram of a display module according to another embodiment of the present disclosure. In an embodiment, as shown in FIG. 17, FIG. 18, and FIG. 53, the display module can include a first polarizer 21, a second polarizer 22, and a third polarizer 23. The first polarizer 21 is located at a side of the display component 2 facing away from the light-adjusting component 3, and has a first absorption axis P1. The second polarizer 22 is located between the display component 2 and the light-adjusting component 3, and has a second absorption axis P2. The second absorption axis P2 is perpendicular to the first absorption axis P1. The third polarizer 23 is located at a side of the light-adjusting component 3 facing away from the display component 2, and has a third absorption axis P3. The third absorption axis P3 is parallel to the second absorption axis P2.

Two polarizers with absorption axes perpendicular to each other are arranged at two sides of the liquid crystal display component 53, the luminance of the display component 2 can be controlled based on mutual cooperation of the two polarizers, thereby controlling the display component 2 to display images. By making the absorption axes of the polarizers at both sides of the light-adjusting component 3 be parallel to each other, mutual cooperation of the two polarizers can be used to achieve the sharing and anti-peeping effect. The operating principle will be described in detail in combination with subsequent embodiments.

Figure 54:
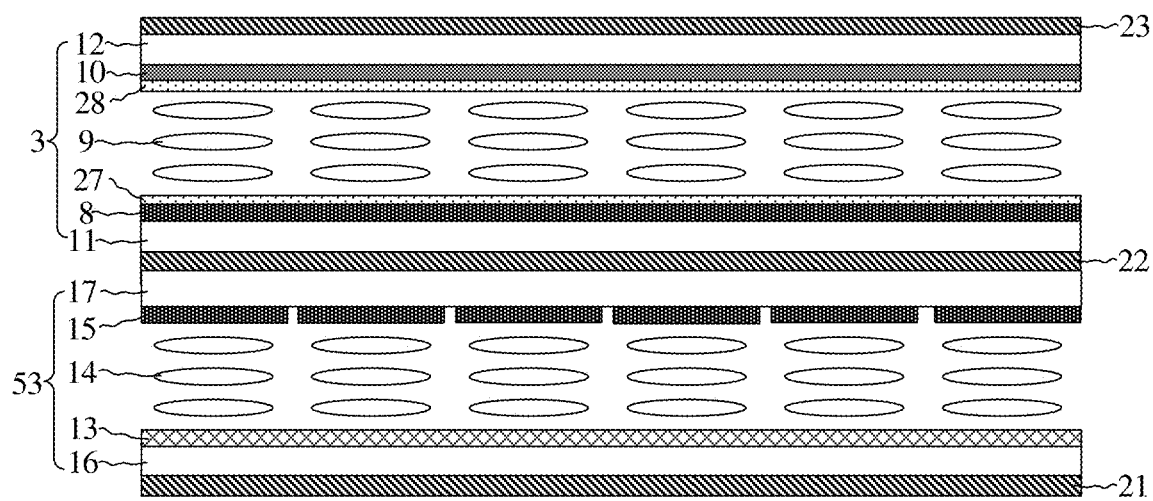
FIG. 54 is a schematic diagram of a display module according to another embodiment of the present disclosure.

FIG. 54 is a schematic diagram of a display module according to another embodiment of the present disclosure. In an embodiment, as shown in FIG. 54, the first liquid crystal 9 is a positive liquid crystal, e.g., a single optical axis positive liquid crystal. A pretilt angle A1 of the first liquid crystal 9 satisfies $0°≤A1≤10°$, that is, in the initial state of the first liquid crystal, an angle ranging from 0° to 10° is formed between the optical axis of the first liquid crystal 9 and a plane of the display module. The light-adjusting component 3 can include a first alignment film 27 and a second alignment film 28. The first alignment film 27 is located at a side of the first liquid crystal 9 facing toward the display component 2, and the second alignment film 28 is located at a side of the first liquid crystal 9 facing toward the display component 2. The alignment directions of the first alignment film 27 and the second alignment film 28 are the same, are parallel or perpendicular to the second absorption axis P2, and parallel to the extending direction of the edge of the display module.

The light emitted through the second polarizer 22 and transmitted along the front viewing angle direction is a first linear polarization light W1, and the light emitted through the second polarizer 22 and transmitted along the oblique viewing angle direction is a second linear polarization light W2. The polarization directions of the first linear polarization light W1 and the second linear polarization light W2 each are parallel to the second absorption axis P2.

Referring to FIG. 20, when the display module is in the shared mode, the first electrode 8 and the second electrode 10 are not energized, and the first liquid crystal 9 is in a wide viewing angle state. A pretilt angle A1 is formed between the optical axis P of the first liquid crystal 9 and a plane of the display module. The first liquid crystal 9 is close to a lying state. In this mode, the first linear polarization light W1 and the second linear polarization light W2 emits through the third polarizer 23, so that high luminance can be achieved under the front viewing angle and the oblique viewing angle, and no luminance loss is generated.

Referring to FIG. 21, when the display module is in the anti-peeping mode, the first electrode 8 and the second electrode 10 are energized to generate a vertical electric field, and the first liquid crystal 9 is in a narrow viewing angle state. Since the first liquid crystal 9 is a positive liquid crystal, the optical axis P of the first liquid crystal 9 rotates along a direction parallel to the direction of the electric field, that is, it rotates relative to a plane of the display module. The angle B is formed between the optical axis P of the first liquid crystal 9 after being rotated and a plane of the display module, where B>A1, and B≠90°. In this mode, the first linear polarization light W1 can be emitted through the third polarizer 23, and no luminance loss is generated under the front viewing angle. After the second linear polarization light W2 passes through the first liquid crystal 9, the polarization state is changed, so that the polarization direction of the second linear polarization light W2 is no longer parallel to the second absorption axis P2 and the third absorption axis P3, which causes the second linear polarization light W2 cannot be emitted through the third polarizer 23, thereby further reducing the luminance under the oblique viewing angle.

The analysis process has been described in detail in the foregoing embodiments, and will not be repeated herein.

It can be seen that based on the above structure of the light-adjusting component 3, when the display module is in the sharing mode, the light-adjusting component 3 can be controlled to no luminance attenuation under the front viewing angle and the oblique viewing angle, so that a larger luminance can be achieved under the front viewing angle and the oblique viewing angle have, thereby enhancing the user's viewing experience under a large viewing angle. When the display module is in the anti-peeping mode, the light-adjusting component 3 can control to attenuate only the luminance of the light under the oblique viewing angle to achieve the anti-peeping effect, and not attenuate the luminance of the light under the front viewing angle to achieve no luminance loss under the front viewing angle. Therefore, the effect is better than the related art, and the user experience is better.

In an embodiment of the present disclosure, A1=0°, so that the first liquid crystal 9 is in a completely lying state under the initial state, thereby avoiding luminance degradation in the sharing mode to a greater extent. In another embodiment of the present disclosure, $0°<A1≤10°$. With such a configuration, when the display module is switched from the sharing mode to the anti-peeping mode, the first liquid crystal 9 can be rotated on the basis of A1, and be rotated more quickly to the angle required for the anti-peeping mode.

Figure 55:
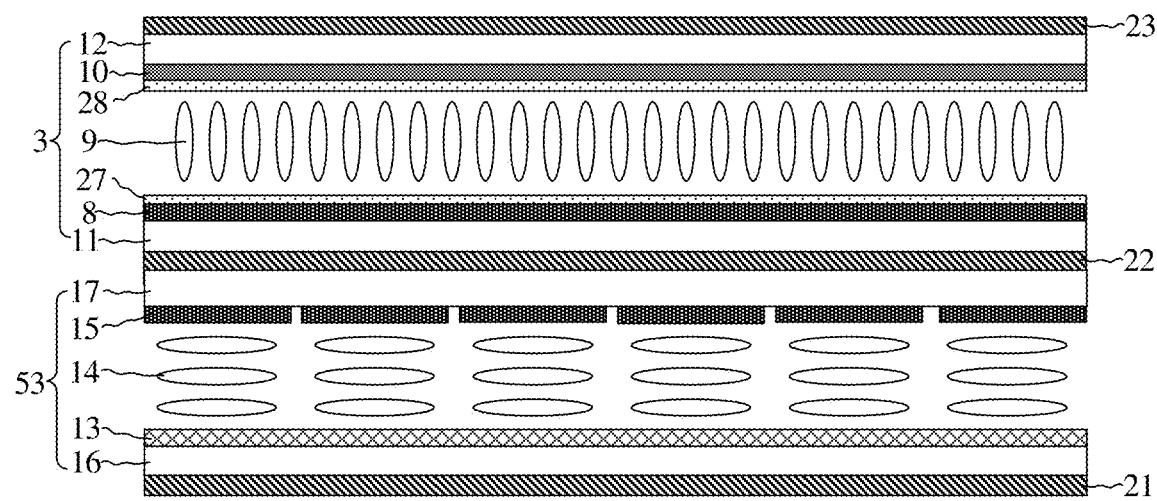
FIG. 55 is a schematic diagram of a display module according to another embodiment of the present disclosure.

FIG. 55 is a schematic diagram of a display module according to another embodiment of the present disclosure. In another embodiment, as shown in FIG. 55, the first liquid crystal 9 is a negative liquid crystal, e.g., a single optical axis negative liquid crystal. A pretilt angle A2 of the first liquid crystal 9 satisfies $85°≤A2≤95°$, that is, in the initial state of the first liquid crystal, an angle of 85° to 95° is formed between the optical axis of the first liquid crystal 9 and a plane of the display module. The light-adjusting component 3 also includes a first alignment film 27 and a second alignment film 28. The first alignment film 27 is located on a side of the first liquid crystal 9 facing toward the display component 2, and the second alignment film 28 is located on a side of the first liquid crystal 9 facing away from the display component 2. The alignment directions of the first alignment film 27 and the second alignment film 28 are the same, and are parallel or perpendicular to the second absorption axis P2, and parallel to the extending direction of the edge of the display module.

Referring to FIG. 23, when the display module is in the sharing mode, the first electrode 8 and the second electrode 10 are not energized, and the first liquid crystal 9 is in a wide viewing angle state (initial state), in which a pretilt angle A2 is formed between the optical axis P of the first liquid crystal 9 and a plane of the display module, and the first liquid crystal 9 is close to an upright state. The polarization directions of the first linear polarization light W1 and the second linear polarization light W2 are not changed after the first linear polarization light W1 and the second linear polarization light W2 pass through the first liquid crystal 9, and are still parallel to the second absorption axis P2 and the third absorption axis P3. Therefore, the first linear polarization light W1 and the second linear polarization light W2 each are emitted through the third polarizer 23, so that a higher viewing angle are obtained under the front viewing angle and the oblique viewing angle, and no luminance loss is generated.

With reference to FIG. 24, when the display module is in the anti-peeping mode, the first electrode 8 and the second electrode 10 are energized to generate a vertical electric field, the first liquid crystal 9 is in a narrow viewing angle state. Since the first liquid crystal 9 is a negative liquid crystal, the optical axis P of the first liquid crystal 9 rotates along a direction perpendicular to the direction of the electric field, that is, rotates relative to a plane of the display mode. An angle B is formed between the optical axis P of the first liquid crystal 9 after rotation and the plane of the display module is smaller than A2 and is not equal to 0°, i.e., B<A2, and B≠0°. The first linear polarization light W1 can be emitted through the third polarizer 23, and no luminance loss is generated under the front viewing angle. The polarization state of the second linear polarization light W2 is changed after passing through the first liquid crystal 9 and cannot be emitted through the third polarizer 23, thereby reducing the luminance of the light under the oblique viewing angle.

The specific analysis process has been described in detail in the foregoing embodiments, and will not be repeated herein.

It can be seen that based on the above structure of the light-adjusting component 3, when the display module is in the sharing mode, the light-adjusting component 3 can be controlled not to generate luminance attenuation under the front viewing angle and the oblique viewing angle, so that a larger luminance can be obtained under the front viewing angle and the oblique viewing angle, thereby improving the user's viewing experience under a large viewing angle. When the display module is in the anti-peeping mode, the light-adjusting component 3 can be controlled to attenuate only the luminance under the oblique viewing angle to achieve the anti-peeping effect without attenuating the luminance under the front viewing angle, so that no luminance loss is generated under the front viewing angle, and a larger luminance is achieved.

In an embodiment of the present disclosure, A2=90°, so that the first liquid crystal 9 is in a completely upright state under the initial state, thereby avoiding luminance degradation in the sharing mode to a greater extent. In an embodiment, in another embodiment of the present disclosure, 85°≤A2≤95° and A2≠90°. With such configuration, when the display module is switched from the sharing mode to the anti-peeping mode, the first liquid crystal 9 can be rotated on the basis of A2, and be rotated more quickly to the angle required for the anti-peeping mode.

In an embodiment of the present disclosure, referring to FIG. 21 and FIG. 24 again, when the first liquid crystal 9 is in the narrow viewing angle state, an angle B formed between the optical axis P of the first liquid crystal 9 and the plane of the display module satisfies 40°≤B≤50°. At this time, the angle formed between the optical axis P of the first liquid crystal 9 and the plane of the display module is close to 45°, the influence of the first liquid crystal 9 on the optical characteristics of the second linear polarizing light W2 under the oblique viewing angle tends to be the greatest, and the polarization state of the second polarizing light W2 after passing through the first liquid crystal 9 has been changed to a greater extent, so that more second polarizing light cannot be emitted through the third polarizer 23, thereby increasing the luminance attenuation under the oblique viewing angle, and improving the anti-peeping effect.

In an embodiment, B=45°, so that the luminance of the light under the oblique viewing angle in the anti-peeping mode is minimized.

In an embodiment of the present disclosure, referring to FIG. 51 again, the liquid crystal display component 53 includes a second liquid crystal 14. In a direction perpendicular to a plane of the display module, a cell gap d1 of the first liquid crystal 9 is greater than a cell gap d2 of the second liquid crystal 14.

If the cell gap of the first liquid crystal 9 is small, the phase retardation efficiency of the light wave decomposed by the second linear polarization light W2 under the oblique viewing angle when the second linear polarization light W2 passes through the first liquid crystal 9 in the anti-peeping mode is small, resulting in non-obvious luminance attenuation under the oblique viewing angle. The cell gap of the first liquid crystal 9 is set to be larger than the cell gap of the second liquid crystal 14, the phase retardation efficiency of the second linear polarization light W2 can be improved, so that greater luminance attenuation under oblique viewing angles is obtained, thereby achieving a more significant anti-peeping effect.

In an embodiment of the present disclosure, in a direction perpendicular to a plane of the display module, a cell gap d1 of the first liquid crystal 9 satisfies 5 μm≤d1≤8 μm.

By setting the minimum cell gap of the first liquid crystal 9 to be 5 μm, the first liquid crystal 9 can have a sufficient cell gap to achieve greater influence of the first liquid crystal 9 on the polarization state of the second linear polarization light W2 under an oblique viewing angle, thereby further increasing the luminance attenuation under the oblique viewing angle. By setting the maximum cell gap of the first liquid crystal 9 to be 8 μm, the cell gap of the first liquid crystal 9 can be prevented from being too large, so that the cell gap of the first liquid crystal 9 is approximately the thickness of a half wave plate, thereby achieving better anti-peeping effect, and avoiding affecting the overall thickness of the display module.

In an embodiment of the present disclosure, referring to FIG. 51 and FIG. 52 again, the first electrode 8 and the second electrode 10 each cover the first liquid crystal 9 in a direction perpendicular to a plane of the display module. At this time, the first electrode 8 and the second electrode 10 each are a planar electrode. After the first electrode 8 and the second electrode 10 are energized, the first electrode 8 and the second electrode 10 can form a more uniformly distributed vertical electric field in a liquid crystal cell of the first liquid crystal 9. The first liquid crystal 9 in various regions can be rotated to an angle required for anti-peeping under the action of the vertical electric field, thereby achieving a high regulation accuracy of the first liquid crystal 9.

In another embodiment, referring to FIGS. 26 and 27 again, the first electrode 8 includes at least one first sub-electrode 29. The first sub-electrode 29 includes a first main electrode strip 30 and multiple first toothed electrode strips 31. The first toothed electrode strips 31 are connected to the first main electrode strip 30 and parallel to each other. The second electrode 10 covers the first liquid crystal 9 in a direction perpendicular to a plane of the first polarizer 21. At this time, the second electrode 10 is a planar electrode, and the first electrode 8 is a grid electrode.

Referring to FIGS. 28 and 29 again, in a direction perpendicular to a plane of the first polarizer 21, the first electrode 8 covers the first liquid crystal 9. The second electrode 10 includes at least one second sub-electrode 32. The second sub-electrode 32 includes a second main electrode strip 33 and multiple second toothed electrode strips 34. The second toothed electrode strips 34 are connected to the second main electrode strip 33 and parallel to each other. At this time, the first electrode 8 is a planar electrode, and the second electrode 10 is a grid electrode.

When one of the first electrode 8 and the second electrode 10 is a planar electrode, and the other of the first electrode 8 and the second electrode 10 is a grid electrode, a relatively uniform vertical electric field can be formed after the first electrode 8 and the second electrode 10 are energized, the first liquid crystal 9 is rotated under the action of the vertical electric field, so that the optical property of the second polarization light W2 under the oblique viewing angle is adjusted. By setting one of the first electrode 8 and the second electrode 10 as a grid electrode, there is a gap between the toothed electrode strips of grid electrode, so that the degree of light shielding is small, thereby improving the light emission rate of the display module.

In another embodiment, referring to FIGS. 31 and 32 again, the first electrode 8 includes at least one first sub-electrode 29. The first sub-electrode 29 includes a first main electrode strip 30 and multiple first toothed electrode strips 31 connected to the bars 30 and parallel to each other. The second electrode 10 includes at least one second sub-electrode 32. The second sub-electrode 32 includes a second main electrode strip 33 and multiple second toothed electrode strips 34 connected to the second main electrode strip 33 and parallel to each other. The first electrode 8 at least partially overlaps with the second electrode 10 in a direction perpendicular to a plane of the first polarizer 21. At this time, the first electrode 8 and the second electrode 10 each are a grid electrode. By making the first electrode 8 at least partially overlap with the second electrode 10, an area of the first electrode 8 facing toward the second electrode 10 can be increased, thereby forming a stronger and more uniform vertical electric field, and improving the rotation accuracy of the first liquid crystal 9.

Referring to FIGS. 30 and 31 again, in the direction perpendicular to the plane of the first polarizer 21, multiple first toothed electrode strips 31 of the first electrode 8 are engaged with the plurality of second toothed electrode strips 34 of the second electrode 10, so that the toothed electrode strips of the first electrode 8 are staggered with the toothed electrode strips of the second electrode 10, and the electrode shields less light, thereby improving the light emission rate of the display module.

In an embodiment of the present disclosure, in order to reduce the light shielding by the first electrode 8 and the second electrode 10, the first electrode 8 and the second electrode 10 are respectively transparent electrodes. Exemplarily, the first electrode 8 and the second electrode 10 are formed of a transparent conductive material such as indium tin oxide (ITO), respectively.

Figure 56:
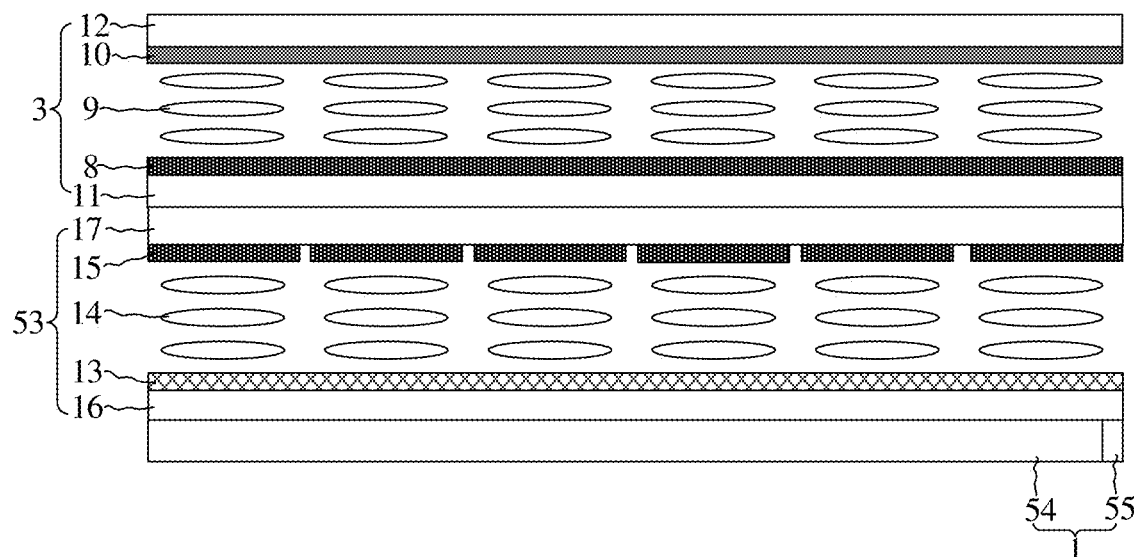
FIG. 56 is a schematic diagram of a display module according to another embodiment of the present disclosure.

FIG. 56 is a schematic diagram of a display module according to another embodiment of the present disclosure. In an embodiment, as shown in FIG. 56, the display module further includes a backlight component 1 located at a side of the liquid crystal display component 53 facing away from the light-adjusting component 3. The backlight component 1 includes a light guide plate 54 and a light source 55. The light source can be emitted from bottom, or emitted from side as shown in FIG. 56. When the display module performs image display, the light source 55 is turned on. The light emitted by the light source 55 is transmitted in the light guide plate 54 and emitted through the top of the light guide plate 54, and then incident to the liquid crystal display component 53.

Based on the same inventive concept, the present disclosure further provides a method for driving a display module, which is applied to the above display modules. Referring to FIG. 51 and FIG. 52, the display module has a sharing mode and an anti-peeping mode. FIG. 57 is flowchart showing a method for driving a display module according to another embodiment of the present disclosure. As shown in FIG. 57, the method includes following steps.

In step K1: In the sharing mode, the first electrode 8 and the second electrode 10 are not energized, and the first liquid crystal 9 is in a wide viewing angle state.

In step K2: In the anti-peeping mode, the first electrode 8 and the second electrode 10 drive the first liquid crystal 9 to be in a narrow viewing angle state, and $V=5.095-1.479 \times ((\ln(\Delta\varepsilon)-\ln(d1)+1))$ is satisfied, where V denotes a difference between a voltage of the first electrode 8 and a voltage of the second electrode 10, $\Delta\varepsilon$ denotes a difference between a dielectric constant $\sigma //$ and a dielectric constant $\varepsilon\perp$, and d1 denotes a cell gap of the first liquid crystal 9 in a direction perpendicular to a plane of the display module.

In combination with the analysis of the foregoing embodiments, with the driving method provided in the embodiments of the present disclosure, the display module can switch under wide and narrow viewing angles according to different application scenarios. When the cell gap of the first liquid crystal 9 in the display module is designed to a certain fixed value, a voltage difference matching the cell gap can be obtained according to the formula, so that the first liquid crystal 9 is driven by the electrical field formed by the voltage difference to rotate to the angle required by the anti-peeping mode, thereby achieving a better anti-peeping effect.

Figure 59:
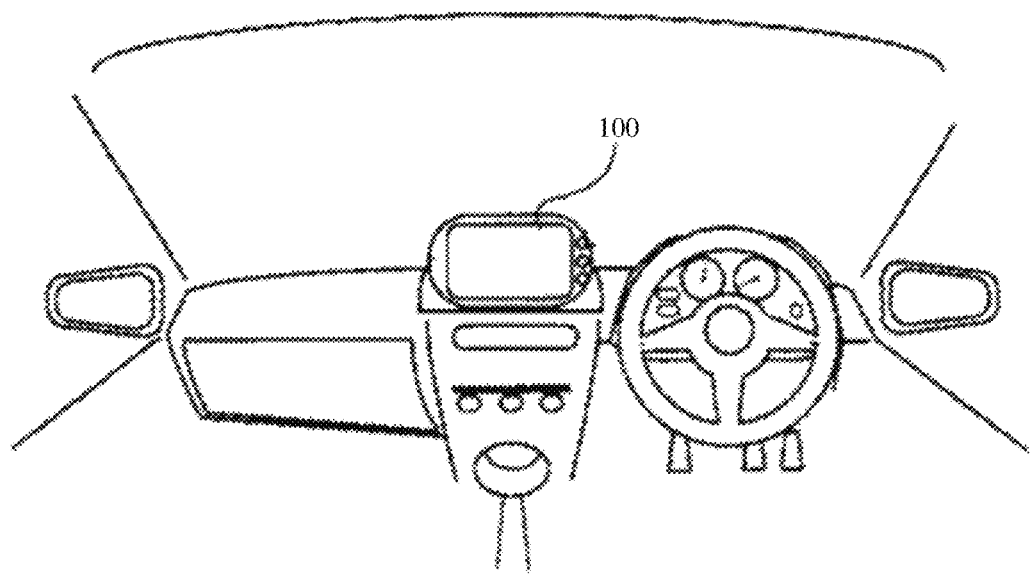
FIG. 59 is a schematic diagram of a display apparatus according to another embodiment of the present disclosure.

Based on the same inventive concept, an embodiment of the present disclosure further provides a display apparatus. FIG. 58 is a schematic diagram of a display apparatus according to an embodiment of the present disclosure, and FIG. 59 is a schematic diagram of a display apparatus according to another embodiment of the present disclosure. As shown in FIG. 58 and FIG. 59, the display apparatus includes the display module 100 as shown in FIG. 1 to FIG. 49 or as shown in FIG. 51 to FIG. 56. The structure of the display module 100 has been described in detail in the above embodiments, and will not be repeated herein.

It should be understood that the display apparatus can be an electronic display apparatus such as a vehicle display screen, a mobile phone, a computer, or a TV. When the liquid crystal display apparatus is used as a vehicle display screen, it can be used in transportation vehicles such as automobiles, high speed trains, submarines, ships, or airplanes. Taking the liquid crystal display apparatus applied in a car as an example, the display apparatus can be an inherent structure independent of the car, or it can be integrated with other structures in the car, such as integrated with the front windshield or the countertop at the periphery of the dashboard, which are not limited in the embodiments of the present disclosure.

Figure 60:
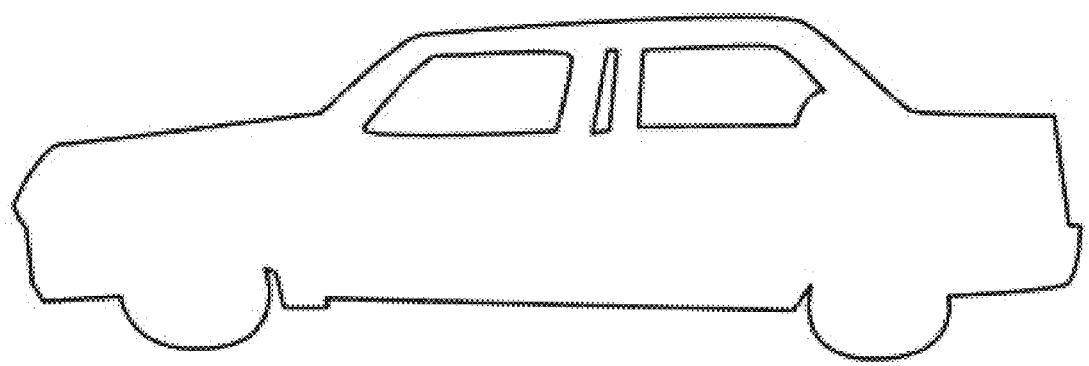
FIG. 60 is a schematic diagram of a vehicle according to an embodiment of the present disclosure.

Based on the same inventive concept, the present disclosure further provides a vehicle. FIG. 60 is a schematic diagram of a vehicle according to an embodiment of the present disclosure. As shown in FIG. 60, the vehicle includes the above display apparatus. The vehicle shown in FIG. 60 is only a schematic illustration. The vehicle can be a car, a high-speed rail, a submarine, a boat, or an airplane.

The above are merely some embodiments of the present disclosure, which, as mentioned above, are not intended to limit the present disclosure. Within the principles of the present disclosure, any modification, equivalent substitution, improvement shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various obvious modifications, readjustments, and substitutions without departing from the scope of the present disclosure.

The embodiments of the invention in which an exclusive property or privilege is claimed are defined as follows:

1. A display module, comprising:
    a backlight component;
    a display component located at a side of the backlight component facing toward a light-emitting direction of the display module; and
    a light-adjusting component located at the side of the backlight component facing toward the light-emitting direction of the display module,
    wherein the backlight component comprises a first light guide structure and a light regulating structure, the first light guide structure comprises a first light source and a first light guide plate, and the light regulating structure is located at a side of the first light guide plate facing toward the display component and is configured to regulate a transmission direction of light emitted from the first light guide plate;
    wherein the light-adjusting component comprises a first electrode, a first liquid crystal located at a side of the first electrode facing away from the backlight component, and a second electrode located at a side of the first liquid crystal facing away from the backlight component; and the light-adjusting component and the light regulating structure are configured to have uniformity in the regulating direction of light;
    wherein the display module has a sharing mode and an anti-peeping mode, wherein, in the sharing mode, the first electrode and the second electrode are not energized, and the first liquid crystal is in a wide viewing angle state; and, in the anti-peeping mode, the first electrode and the second electrode drive the first liquid crystal to be in a narrow viewing angle state;
    wherein the backlight component further comprises a second light guide structure, wherein the second light guide structure comprises a second light source and a second light guide plate located at a side of the light regulating structure facing away from the first light guide plate; and
    wherein the second light source is turned on in the sharing mode, and the second light source is turned off in the anti-peeping mode.

2. The display module according to claim 1, wherein the display component comprises a third electrode, a second liquid crystal, and a fourth electrode, wherein the second liquid crystal is located between the third electrode and the fourth electrode, or the second liquid crystal is located at a side of the third electrode facing away from the backlight component and a side of the fourth electrode facing away from the backlight component.

3. The display module according to claim 1, wherein the display component comprises a quantum dot layer.

4. The display module according to claim 1, wherein the light-adjusting component is located at a side of the display component facing away from the backlight component.

5. The display module according to claim 1, wherein the display component is located at a side of the light-adjusting component facing away from the backlight component.

6. The display module according to claim 1, further comprising:
    a first polarizer located at a side of the display component facing away from the light-adjusting component, wherein the first polarizer has a first absorption axis;
    a second polarizer located between the display component and the light-adjusting component, wherein the second polarizer has a second absorption axis perpendicular to the first absorption axis; and
    a third polarizer is located at a side of the light-adjusting component facing away from the display component, wherein the third polarizer has a third absorption axis parallel to the second absorption axis.

7. The display module according to claim 6, wherein the first liquid crystal is a positive liquid crystal and has a pretilt angle A1, where $0°≤A1≤10°$; and
    the light-adjusting component further comprises a first alignment film located at a side of the first liquid crystal facing toward the display component, and a second alignment film located at a side of the first liquid crystal facing away from the display component, wherein the first alignment film and the second alignment film have a same alignment direction, and the alignment direction is parallel to or perpendicular to the second absorption axis, and parallel to an extending direction of an edge of the display module.

8. The display module according to claim 6, wherein the first liquid crystal is a negative liquid crystal and has a pretilt angle A2, where $85°≤A2≤95°$; and
    the light-adjusting component further comprises a first alignment film located at a side of the first liquid crystal facing toward the display component, and a second alignment film located at a side of the first liquid crystal facing away from the display component, wherein the first alignment film and the second alignment film have a same alignment direction, and the alignment direction is parallel or perpendicular to the second absorption axis, and parallel to an extending direction of an edge of the display module.

9. The display module according to claim 1, wherein when the first liquid crystal is in the narrow viewing angle state, an angle B formed between an optical axis of the first liquid crystal and a plane of the display module satisfies 40°≤B≤50°.

10. The display module according to claim 9, wherein B=45°.

11. The display module according to claim 2, wherein in a direction perpendicular to a plane of the display module, a cell gap d1 of the first liquid crystal and a cell gap d2 of the second liquid crystal satisfy: d1>d2.

12. The display module according to claim 1, wherein in a direction perpendicular to a plane of the display module, a cell gap d1 of the first liquid crystal satisfies: 5 µm≤d1≤8 µm.

13. The display module according to claim 1, wherein, in the anti-peeping mode, V=5.095−1.479×((ln(Δε)−ln(d1)+1)), where V denotes a voltage difference between the first electrode and the second electrode, Δε denotes a difference between a dielectric constant ε// and a dielectric constant ε⊥, and d1 denotes a cell gap of the first liquid crystal in a direction perpendicular to a plane of the display module.

14. The display module according to claim 1, wherein the first electrode and the second electrode each cover the first liquid crystal in a direction perpendicular to a plane of the display module.

15. The display module according to claim 1, wherein the first electrode comprises at least one first sub-electrode, wherein one of the at least one first sub-electrode comprises a first main electrode strip and a plurality of first toothed electrode strips, the plurality of first toothed electrode strips is connected to the first main electrode strip and parallel to each other, and the second electrode covers the first liquid crystal in a direction perpendicular to a plane of the display module; or
the first electrode covers the first liquid crystal in a direction perpendicular to a plane of the display module, the second electrode comprises at least one second sub-electrode, wherein one of the at least one second sub-electrode comprises a second main electrode strip and a plurality of second toothed electrode strips connected to the second main electrode strip and parallel to each other.

16. The display module according to claim 1, wherein the first electrode comprises at least one first sub-electrode, wherein one of the at least one first sub-electrode comprises a first main electrode strip and a plurality of first toothed electrode strips connected to the first main electrode strip and parallel to each other;
the second electrode comprises at least one second sub-electrode, wherein one of the at least one second sub-electrode comprises a second main electrode strip and a plurality of second toothed electrode strips connected to the second main electrode strip and parallel to each other; and
the first electrode at least partially overlaps with the second electrode in a direction perpendicular to a plane of the display module, or the plurality of first toothed electrode strips of the first electrode is engaged with the plurality of second toothed electrode strips of the second electrode in the direction perpendicular to the plane of the display module.

17. The display module according to claim 1, wherein one of the first electrode and the second electrode is a transparent electrode.

18. The display module according to claim 1, wherein the light regulating structure comprises a grating, wherein the grating comprises transparent portions and non-transparent portions, the transparent portions and the non-transparent portions are alternately arranged, and an angle C formed between one of the non-transparent portions and a normal line perpendicular to a plane of the display module satisfies: 5°≤C≤10°.

19. The display module according to claim 1, wherein the backlight component further comprises a polymer liquid crystal film located at a side of the light regulating structure facing away from the first light guide plate, the polymer liquid crystal film comprises a polymer liquid crystal film, and an electrode layer located at each of at least one side of the polymer liquid crystal film.

20. The display module according to claim 19, wherein the polymer liquid crystal film further comprises a first base and a second base, wherein the polymer liquid crystal film is located between the first base and the second base; and the electrode layer is located between the polymer liquid crystal film and at least one of the first base or the second base.

21. The display module according to claim 1, wherein a surface of the first light guide plate facing away from the display component is a first bottom surface, and the first bottom surface has a plurality of first microstructures recessed toward the display component; and/or,
a surface of the second light guide plate facing away from the display component is a second bottom surface, and the second bottom surface has a plurality of second microstructures recessed toward the display component.

22. The display module according to claim 21, wherein a size of one of the plurality of second microstructures is smaller than a size of one of the plurality of first microstructures.

23. The display module according to claim 21, wherein the second light source is located on a side surface of the second light guide plate, one of the plurality of second microstructures has a first surface and a second surface, a slope of the first surface is smaller than a slope of the second surface, and the first surface is located at a side of the second surface close to the second light source.

24. The display module according to claim 1, wherein the first light source is turned on in the sharing mode.

25. The display module according to claim 1, wherein the backlight component further comprises at least one of a diffusion sheet located between the first light guide plate and the light regulating structure, a prism sheet located between the first light guide plate and the light regulating structure, or a reflective sheet located at a side of the first light guide plate facing away from the display component.

26. A method for driving the display module according to claim 1, wherein the display module is a liquid crystal display component and has a sharing mode and an anti-peeping mode; and
wherein the method comprises:
in the sharing mode, de-energizing the first electrode and the second electrode in such a manner that the first liquid crystal is in a wide viewing angle state; and
in the anti-peeping mode, driving the first liquid crystal by the first electrode and the second electrode to be in a narrow viewing angle state.

27. A display module, comprising:
a liquid crystal display component; and
a light-adjusting component located at a side of the liquid crystal display component facing toward a light-emitting direction of the display module,
wherein the light-adjusting component comprises a first electrode, a first liquid crystal located at a side of the first electrode facing away from the liquid crystal display component, and a second electrode located at a side of the first liquid crystal facing away from the display component;

the display module has a sharing mode and an anti-peeping mode;

in the sharing mode, the first electrode and the second electrode are not energized, and the first liquid crystal is in a wide viewing angle state; and in the anti-peeping mode, the first electrode and the second electrode drive the first liquid crystal to be in a narrow viewing angle state, wherein V=5.095−1.479×((ln(Δε)−ln(d1)+1)), where V denotes a voltage difference between the first electrode and the second electrode, Δε denotes a difference between a dielectric constant ε// and a dielectric constant ε⊥, and d1 denotes a cell gap of the first liquid crystal in a direction perpendicular to a plane of the display module.

28. The display module according to claim 27, further comprising:
a first polarizer located at a side of the display component facing away from the light-adjusting component, wherein the first polarizer has a first absorption axis;
a second polarizer located between the display component and the light-adjusting component, wherein the second polarizer has a second absorption axis perpendicular to the first absorption axis; and
a third polarizer located at a side of the light-adjusting component facing away from the display component, wherein the third polarizer has a third absorption axis parallel to the second absorption axis.

29. The display module according to claim 28, wherein the first liquid crystal is a positive liquid crystal, and the first liquid crystal has a pretilt angle A1, where 0°≤A1≤10°; and
wherein the light-adjusting component further comprises a first alignment film located at a side of the first liquid crystal facing toward the display component, and a second alignment film located at a side of the first liquid crystal facing away from the display component, wherein the first alignment film and the second alignment film have a same alignment direction, and the alignment direction is parallel or perpendicular to the second absorption axis, and parallel to an extending direction of an edge of the display module.

30. The display module according to claim 28, wherein the first liquid crystal is a negative liquid crystal, and the first liquid crystal has a pretilt angle A2, where 85°≤A2≤95°; and
wherein the light-adjusting component further comprises a first alignment film located at a side of the first liquid crystal facing toward the display component, and a second alignment film located at a side of the first liquid crystal facing away from the display component, wherein the first alignment film and the second alignment film have a same alignment direction, and the alignment direction is parallel or perpendicular to the second absorption axis, and parallel to an extending direction of an edge of the display module.

31. The display module according to claim 27, wherein when the first liquid crystal is in the narrow viewing angle state, an angle B formed between an optical axis of the first liquid crystal and the plane of the display module satisfies 40°≤B≤50°.

32. The display module according to claim 27, wherein B=45°.

33. The display module according to claim 27, wherein the liquid crystal display component comprises a second liquid crystal; and in the direction perpendicular to the plane of the display module, a cell gap d1 of the first liquid crystal and a cell gap d2 of the second liquid crystal satisfy d1>d2.

34. The display module according to claim 27, wherein in the direction perpendicular to the plane of the display module, a cell gap d1 of the first liquid crystal satisfies: 5 μm≤d1≤8 μm.

35. The display module according to claim 27, wherein the first electrode and the second electrode each cover the first liquid crystal in the direction perpendicular to the plane of the display module.

36. The display module according to claim 27, wherein the first electrode comprises at least one first sub-electrode, wherein one of the at least one first sub-electrode comprises a first main electrode strip and a plurality of first toothed electrode strips connected to the first main electrode strip and parallel to each other, and the second electrode covers the first liquid crystal in a direction perpendicular to a plane of the display module; or
the first electrode covers the first liquid crystal in a direction perpendicular to a plane of the display module, the second electrode comprises at least one second sub-electrode, wherein one of the at least one second sub-electrode comprises a second main electrode strip and a plurality of second toothed electrode strips connected to the second main electrode strip and parallel to each other.

37. The display module according to claim 27, wherein the first electrode comprises at least one first sub-electrode, wherein one of the first sub-electrode comprises a first main electrode strip and a plurality of first toothed electrode strips connected to the first main electrode strip and parallel to each other, the second electrode comprises at least one second sub-electrode, wherein one of the at least one second sub-electrode comprises a second main electrode strip and a plurality of second toothed electrode strips connected to the second main electrode strip and parallel to each other; and
the first electrode at least partially overlaps with the second electrode in a direction perpendicular to a plane of the display module, or the plurality of first toothed electrode strips of the first electrode is engaged with the plurality of second toothed electrode strips of the second electrode in the direction perpendicular to the plane of the display module.

38. The display module according to claim 27, wherein each of the first electrode and the second electrode is a transparent electrode.

39. The display module according to claim 27, further comprising:
a backlight component located at a side of the liquid crystal display component facing away from the light-adjusting component, wherein the backlight component comprises a light guide plate and a light source.

40. A method for driving a display module according to claim 27, the display module having a sharing mode and an anti-peeping mode, and the method comprising:
in the sharing mode, de-energizing the first electrode and the second electrode in such a manner that the first liquid crystal is in a wide viewing angle state; and
in the anti-peeping mode, driving the first liquid crystal by the first electrode and the second electrode to be in a narrow viewing angle state, wherein V=5.095−1.479×((ln(Δε)−ln(d1)+1)), where V denotes a voltage difference between the first electrode and the second electrode, Δε denotes a difference between a dielectric constant ε// and a dielectric constant ε⊥, and d1 denotes a cell gap of the first liquid crystal in a direction perpendicular to a plane of the display module.

41. A display apparatus, wherein the display apparatus comprises a display module, wherein the display module comprises a backlight component, a display component located at a side of the backlight component facing toward a light-emitting direction of the display module, and a light-adjusting component located at the side of the backlight component facing toward the light-emitting direction of the display module, wherein the backlight component comprises a first light guide structure and a light regulating structure, the first light guide structure comprises a first light source and a first light guide plate, and the light regulating structure is located at a side of the first light guide plate facing toward the display component and is configured to regulate a transmission direction of light emitted from the first light guide plate; the light-adjusting component comprises a first electrode, a first liquid crystal located at a side of the first electrode facing away from the backlight component, and a second electrode located at a side of the first liquid crystal facing away from the backlight component; and the light-adjusting component and the light regulating structure are configured to have uniformity in the regulating direction of light; or, wherein the display apparatus comprises a display module, wherein the display module comprises a liquid crystal display component and a light-adjusting component located at a side of the liquid crystal display component facing toward a light-emitting direction of the display module, wherein the light-adjusting component comprises a first electrode, a first liquid crystal located at a side of the first electrode facing away from the liquid crystal display component, and a second electrode located at a side of the first liquid crystal facing away from the display component; the display module has a sharing mode and an anti-peeping mode; in the sharing mode, the first electrode and the second electrode are not energized, and the first liquid crystal is in a wide viewing angle state; and in the anti-peeping mode, the first electrode and the second electrode drive the first liquid crystal to be in a narrow viewing angle state, wherein $V=5.095-1.479\times((\ln(\Delta\varepsilon)-\ln(d1)+1))$, where V denotes a voltage difference between the first electrode and the second electrode, $\Delta\varepsilon$ denotes a difference between a dielectric constant $\varepsilon//$ and a dielectric constant $\varepsilon\perp$, and d1 denotes a cell gap of the first liquid crystal in a direction perpendicular to a plane of the display module.

42. A vehicle comprising the display apparatus according to claim 41.

* * * * *